(12) United States Patent
Hanzawa

(10) Patent No.: US 11,671,728 B2
(45) Date of Patent: Jun. 6, 2023

(54) SENSING DEVICE, ELECTRONIC APPARATUS, AND METHOD FOR CONTROLLING SENSING DEVICE

(71) Applicant: Sony Semiconductor Solutions Corporation, Kanagawa (JP)

(72) Inventor: Katsuhiko Hanzawa, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 17/642,929

(22) PCT Filed: Jul. 21, 2020

(86) PCT No.: PCT/JP2020/028246
§ 371 (c)(1),
(2) Date: Mar. 14, 2022

(87) PCT Pub. No.: WO2021/090538
PCT Pub. Date: May 14, 2021

(65) Prior Publication Data
US 2022/0368849 A1 Nov. 17, 2022

(30) Foreign Application Priority Data
Nov. 7, 2019 (JP) .............................. JP2019-202506

(51) Int. Cl.
*H04N 25/76* (2023.01)
*H04N 25/772* (2023.01)
*H04N 25/42* (2023.01)

(52) U.S. Cl.
CPC ........... *H04N 25/772* (2023.01); *H04N 25/42* (2023.01)

(58) Field of Classification Search
None
See application file for complete search history.

(56) References Cited

U.S. PATENT DOCUMENTS

2019/0319056 A1 * 10/2019 Yamashita ........... H04N 23/672

FOREIGN PATENT DOCUMENTS

| JP | 05-219440 A | 8/1993 |
| JP | 11-225289 A | 8/1999 |
| JP | 2003-348459 A | 12/2003 |
| JP | 2009-130828 A | 6/2009 |
| JP | 2011-188140 A | 9/2011 |
| WO | 2019/150917 A1 | 8/2019 |

OTHER PUBLICATIONS

International Search Report (PCT/ISA/210), International Application No. PCT/JP2020/028246, dated Oct. 2, 2020.

* cited by examiner

*Primary Examiner* — Mark T Monk
(74) *Attorney, Agent, or Firm* — Michael Best & Friedrich LLP

(57) ABSTRACT

A sensing device that detects whether an edge is present or absent achieves improved accuracy in detection of an edge. The sensing device includes a level control circuit, a comparison circuit, and an edge determination circuit. In this sensing device, the level control circuit amplifies or attenuates the signal level of one of a pair of pixel signals by a predetermined gain. The comparison circuit compares the pair of pixel signals with the signal level of the one pixel signal amplified or attenuated with each other, and outputs a result of the comparison. The edge determination circuit determines whether an edge is present or absent in reference to the comparison result.

20 Claims, 39 Drawing Sheets

FIG.6

| CMP0 (COMPARISON RESULT) | CMP1 (COMPARISON RESULT) | EG (EDGE DETERMINATION RESULT) |
|---|---|---|
| 0 (SIG0≦SIG1*g) | 1 (SIG1>SIG0*g) | 1 (SIG0<<SIG1) |
| 0 (SIG0≦SIG1*g) | 0 (SIG1≦SIG0*g) | 0 (SIG0>SIG1 or SIG0<SIG1) |
| 1 (SIG0>SIG1*g) | 1 (SIG1>SIG0*g) | 0 (SIG0>SIG1 or SIG0<SIG1) |
| 1 (SIG0>SIG1*g) | 0 (SIG1≦SIG0*g) | 1 (SIG0>>SIG1) |

FIG. 9
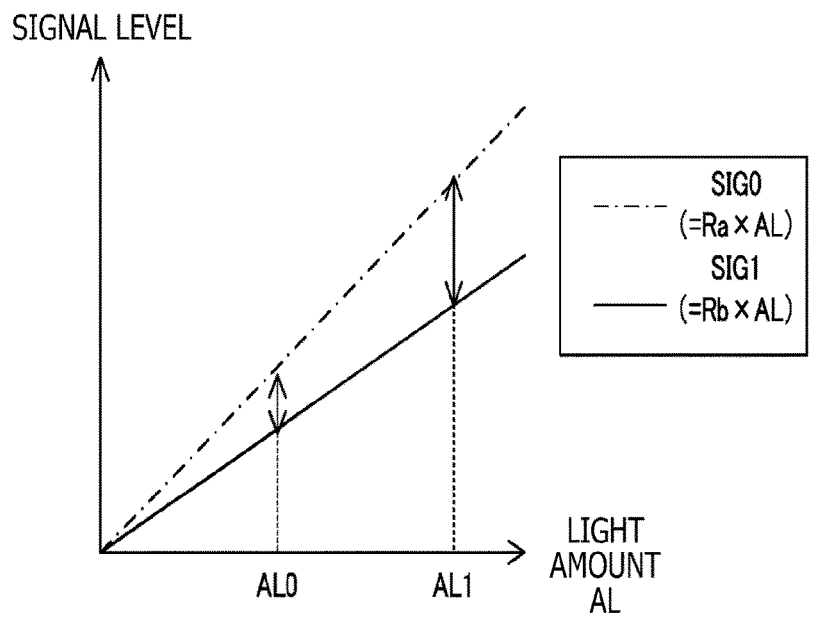
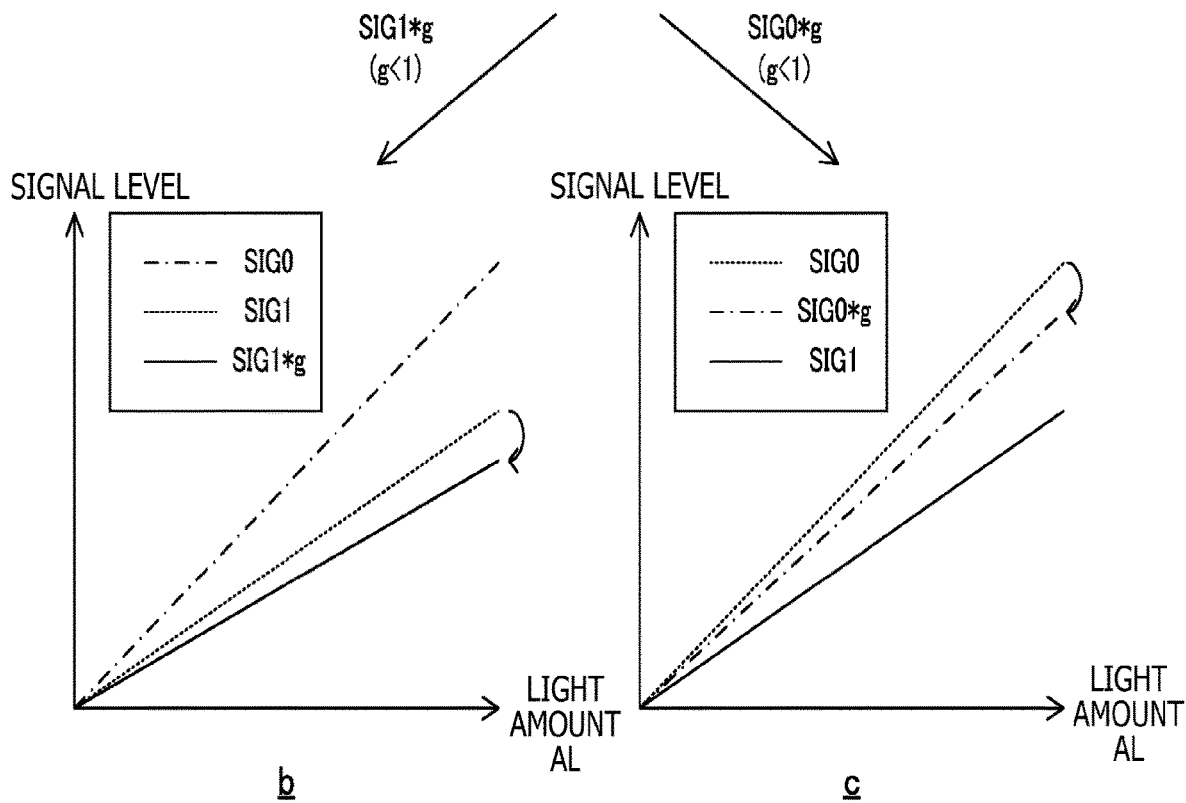

FIG. 18

| RmpEN | DiffEN | INPUT OF COMPARATOR | OUTPUT OF COMPARATOR |
|---|---|---|---|
| 0<br>(DISABLE) | 1<br>(ENABLE) | SIG0 AND SIG1*g | EDGE DETERMINATION CIRCUIT |
| 1<br>(ENABLE) | 0<br>(DISABLE) | SIG0 AND RMP | COUNTER |

FIG.29
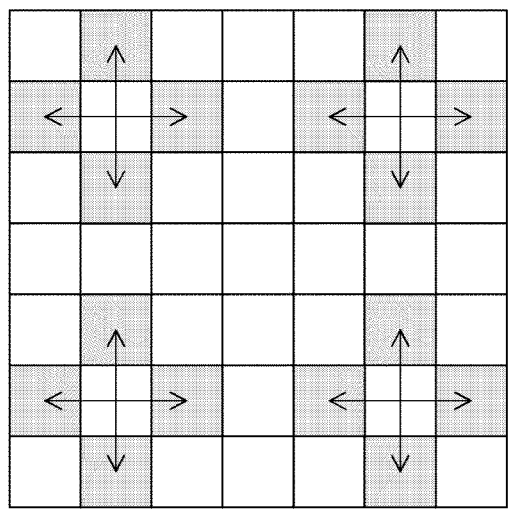
a
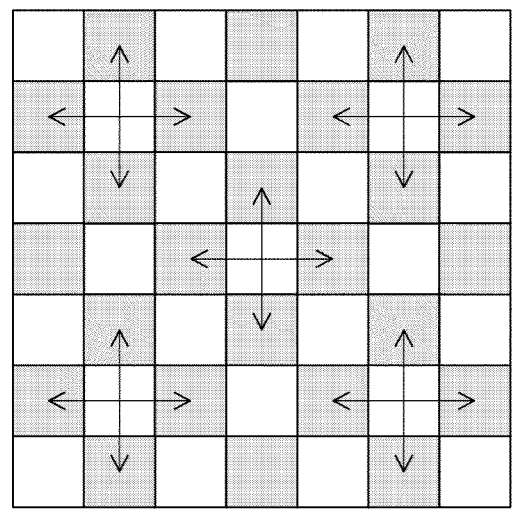
b
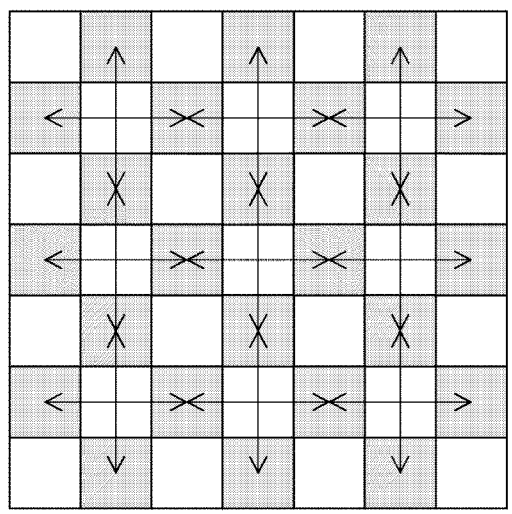
c
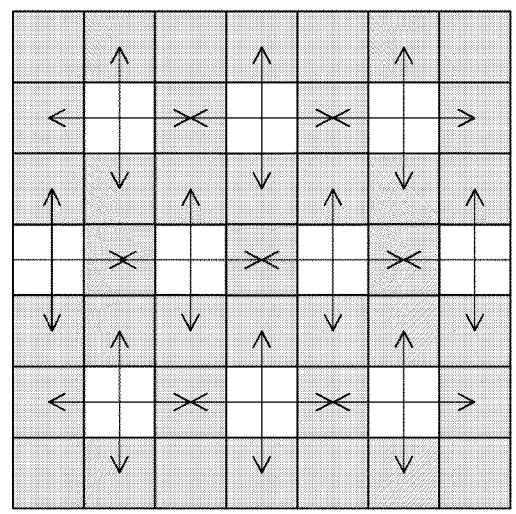
d

FIG. 30
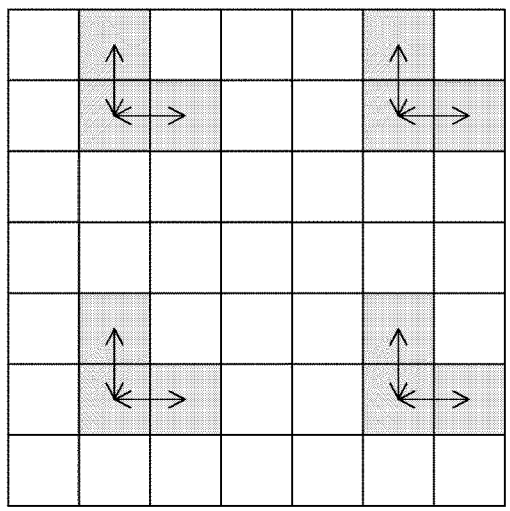
a
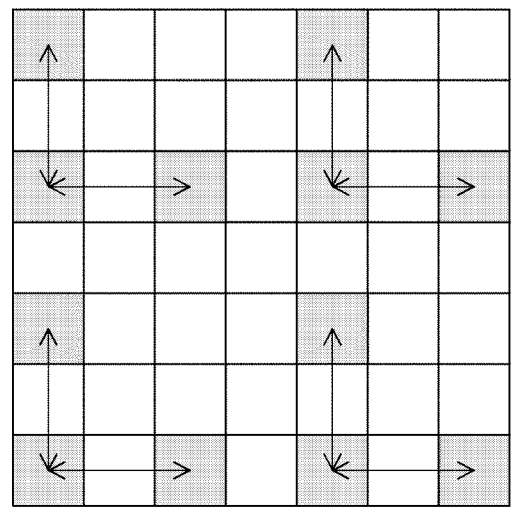
b
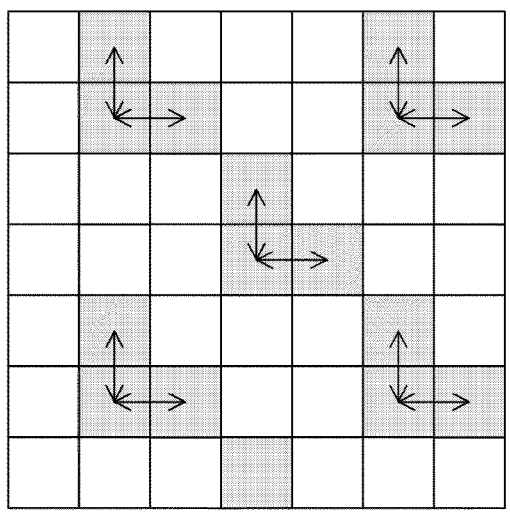
c
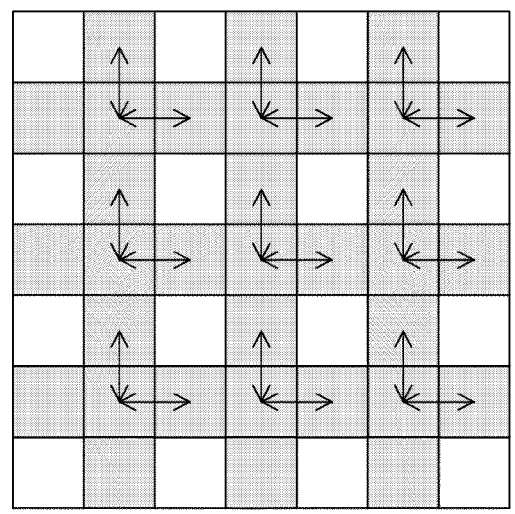
d

FIG.31
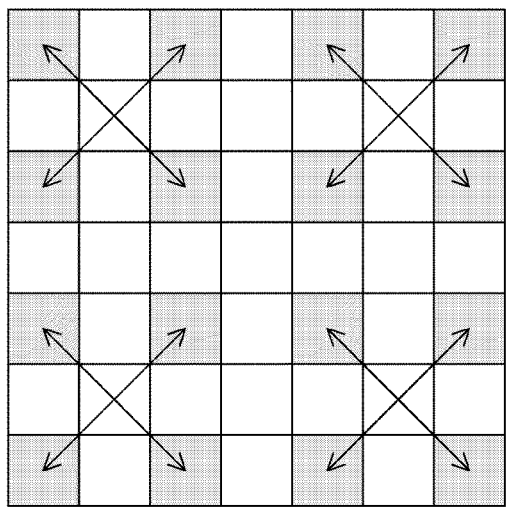
a
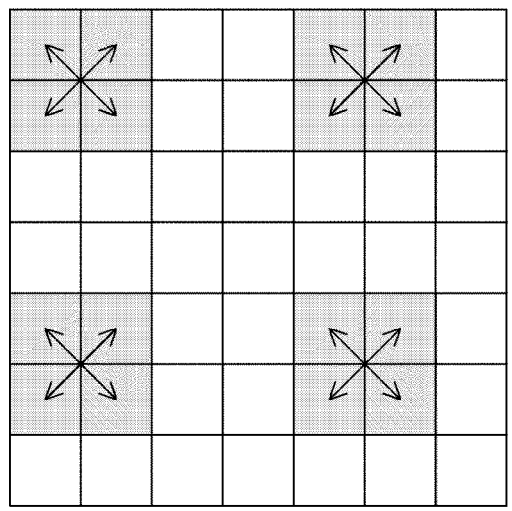
b
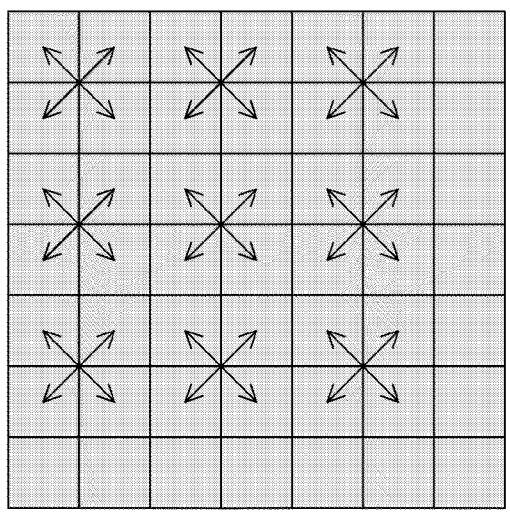
c
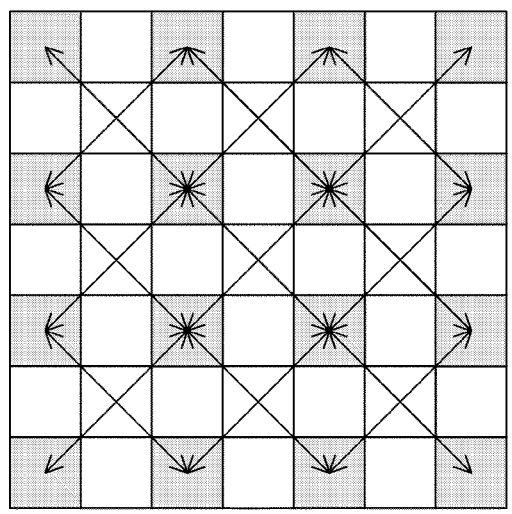
d

FIG.32
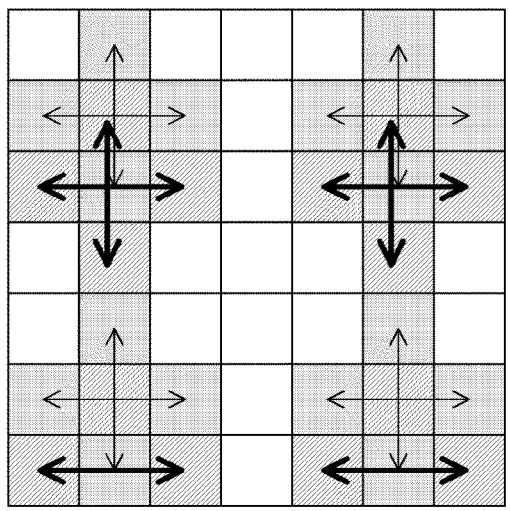
a
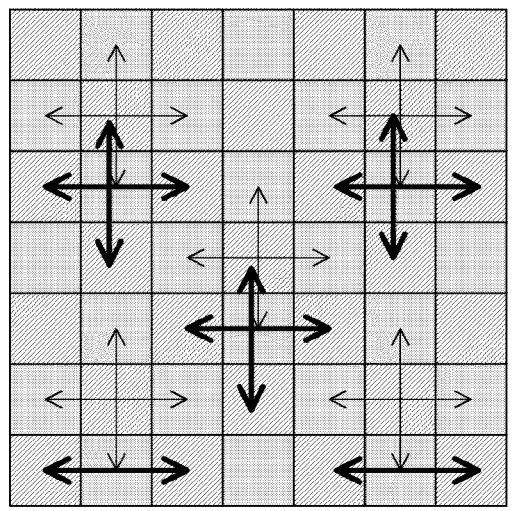
b
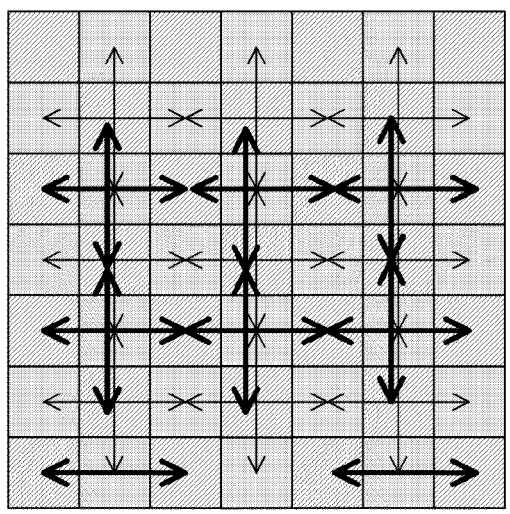
c
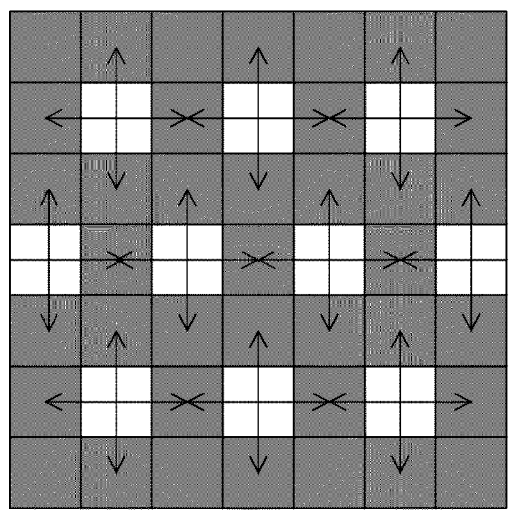
d

FIG.33
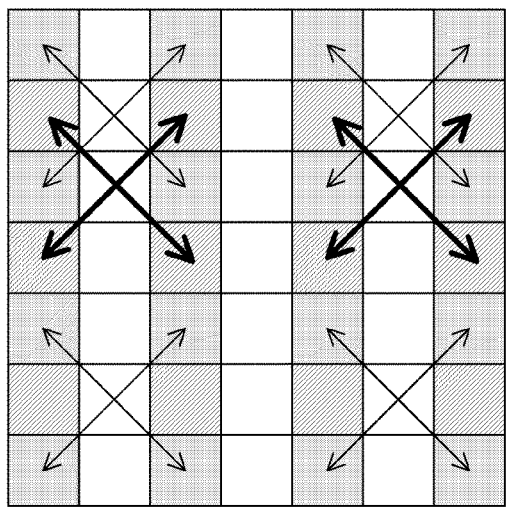
a
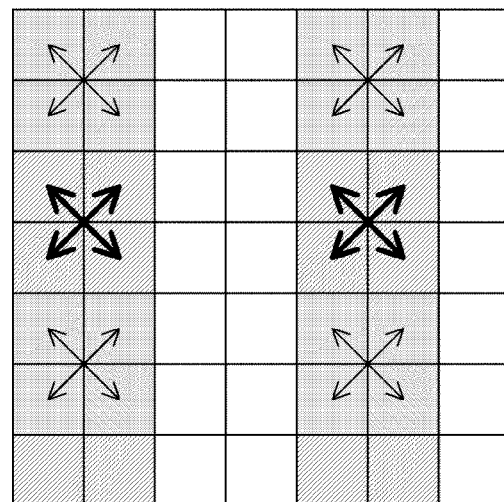
b
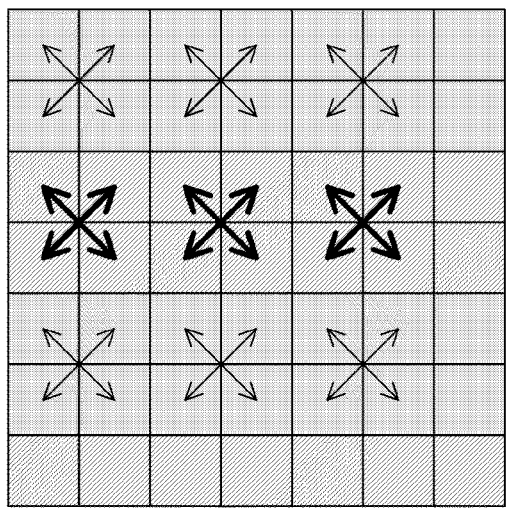
c
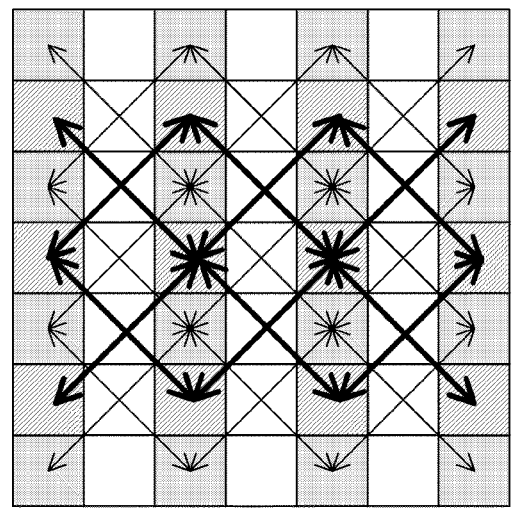
d

FIG.34
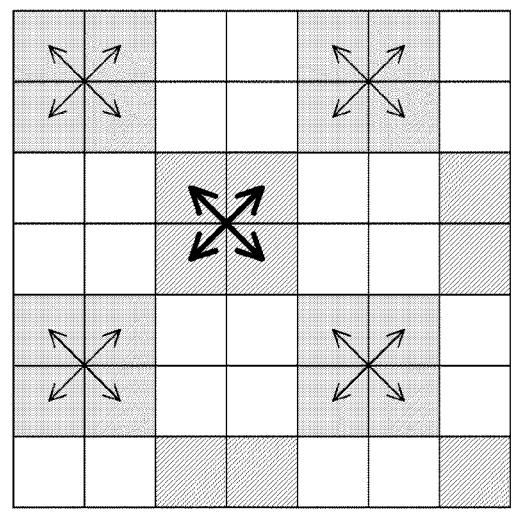
a
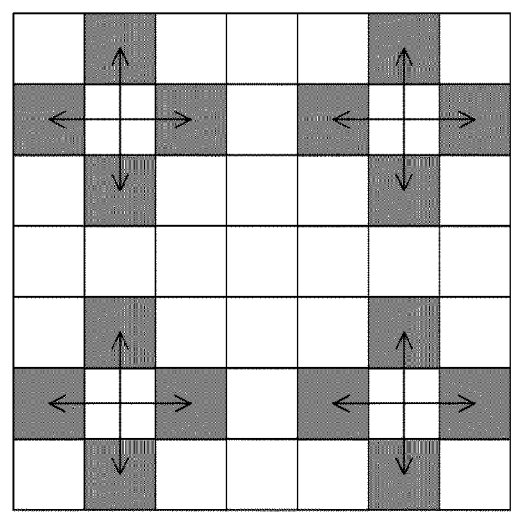
b

SENSING DEVICE, ELECTRONIC APPARATUS, AND METHOD FOR CONTROLLING SENSING DEVICE

TECHNICAL FIELD

The present technology relates to a sensing device. In particular, the present technology relates to a sensing device that compares signals by using a comparator, an electronic apparatus, and a method for controlling the sensing device.

BACKGROUND ART

In known sensing devices, such as solid-state imaging devices, various types of signal processing, such as pixel addition and a CDS (Correlated Double Sampling) process, are performed for the purposes of increasing the dynamic range, reducing noise, and so on. For example, there has been proposed a solid-state imaging device in which, for the purpose of comparing two freely-selected pixel signals with each other, comparators and a switching circuit for switching output destinations of two pixel signals to be compared with each other to the same comparator are provided (see, for example, PTL 1). In this solid-state imaging device, the comparator outputs a difference between the two pixel signals inputted thereto. Then, a circuit in a subsequent stage detects whether an edge is present or absent in reference to whether or not the difference outputted from the comparator exceeds a threshold value, as necessary.

CITATION LIST

Patent Literature

[PTL 1]
Japanese Patent Laid-open No. Hei 5-219440

SUMMARY

Technical Problem

In the above-described related-art technology, an edge between adjacent pixels is detected to extract a contour of a subject. However, the above-described sensing device has a problem in that as the amount of ambient light decreases, the difference decreases, leading to reduced accuracy in detection of an edge. It is possible to vary the threshold value according to the light amount in order to limit the reduction in the detection accuracy, but it is difficult to accurately measure the light amount and finely adjust the threshold value according to the measured value thereof.

The present technology has been conceived of in view of the above circumstances to achieve improved accuracy in detection of an edge in a sensing device that detects whether an edge is present or absent.

Solution to Problem

The present technology has been conceived of to solve the above-described problem, and a first aspect thereof is directed to a sensing device and a method for controlling the sensing device, the sensing device including a level control circuit that amplifies or attenuates a signal level of one of a pair of pixel signals by a predetermined gain, a comparison circuit that compares the pair of pixel signals with the signal level of the one pixel signal amplified or attenuated with each other, and outputs a result of the comparison, and an edge determination circuit that determines whether an edge is present or absent, in reference to the comparison result. This provides an advantageous effect of improved accuracy in detection of an edge.

Further, in this first aspect, the level control circuit may include a first gain circuit that amplifies or attenuates the signal level of the one pixel signal by the gain, and outputs the resulting pixel signal together with another one of the pair of pixel signals, and a second gain circuit that amplifies or attenuates the signal level of the other pixel signal by the gain, and outputs the resulting pixel signal together with the one pixel signal, and the comparison circuit may include a first comparator that compares the pair of pixel signals outputted by the first gain circuit with each other, and outputs a first comparison result to the edge determination circuit, and a second comparator that compares the pair of pixel signals outputted by the second gain circuit with each other, and outputs a second comparison result to the edge determination circuit. This provides an advantageous effect in that an edge can be detected even when the magnitude relation between the pair of pixel signals is unknown.

Further, in this first aspect, the first gain circuit and the first comparator may be disposed in a first analog-to-digital converter that converts the other pixel signal to a digital signal, and the second gain circuit and the second comparator may be disposed in a second analog-to-digital converter that converts the one pixel signal to a digital signal. This provides an advantageous effect of a reduction in circuit size.

Further, in this first aspect, the sensing device may further include a first counter that counts a counter value in reference to the first comparison result, and a second counter that counts a counter value in reference to the second comparison result, and the first comparator and the first counter may be disposed in the first analog-to-digital converter that converts the other pixel signal to a digital signal, and the second comparator and the second counter may be disposed in the second analog-to-digital converter that converts the one pixel signal to a digital signal. This provides an advantageous effect in that the pixel signals are compared with each other by comparators in single-slope ADCs (Analog to Digital Converters).

Further, in this first aspect, the sensing device may further include a switching circuit that supplies the pair of pixel signals to each of the first and second gain circuits in a case where a predetermined edge detection mode is set, and supplies a predetermined reference signal and one of the pair of pixel signals to each of the first and second gain circuits in a case where the edge detection mode is not set. This provides an advantageous effect in that either AD conversion or detection of an edge is performed.

Further, in this first aspect, the sensing device may further include a first digital-to-analog converter that supplies a first reference signal, a second digital-to-analog converter that supplies a second reference signal, a first successive-approximation logic circuit that causes the first reference signal to be updated in reference to the first comparison result, and a second successive-approximation logic circuit that causes the second reference signal to be updated in reference to the second comparison result, and the first gain circuit, the first comparator, the first digital-to-analog converter, and the first successive-approximation logic circuit may be disposed in the first analog-to-digital converter, with the second gain circuit, the second comparator, the second digital-to-analog converter, and the second successive-approximation logic circuit being disposed in the second analog-to-digital converter. This provides an advantageous effect in that the pixel signals are compared with each other by comparators in successive-approximation ADCs.

Further, in this first aspect, each of the first and second comparators may include a pair of differential transistors, a first transistor that initializes one of the pair of differential transistors according to a first auto zero signal, and a second transistor that initializes the other one of the pair of differential transistors according to a second auto zero signal, and input timing of the first auto zero signal may be different from that of the second auto zero signal. This provides an advantageous effect in that auto-zeroing is performed at different timings on positive and negative sides.

Further, in this first aspect, the level control circuit may further include a first sample and hold circuit that holds one of the pixel signals amplified or attenuated, a second sample and hold circuit that holds another one of the pixel signals amplified or attenuated, a third sample and hold circuit that holds another one of the pixel signals amplified, and a fourth sample and hold circuit that holds the one pixel signal. This provides an advantageous effect in that the pixel signals are sampled and held.

Further, in this first aspect, one of the pair of pixel signals may be a signal in a given frame, with the other one of the pair of pixel signals being a signal in a frame different from the given frame. This provides an advantageous effect in that an edge in the time direction can be detected.

Further, in this first aspect, the sensing device may further include a pixel array section including a plurality of pixels arranged in a two-dimensional grid pattern and a pixel analog-to-digital conversion section including analog-to-digital converters each of which is disposed for a separate one of the plurality of pixels, with the level control circuit and the comparison circuit being disposed in the analog-to-digital converter. This provides an advantageous effect in that the pixel signals are compared with each other by comparators in ADCs disposed for the respective pixels.

Further, in this first aspect, the level control circuit may include a source follower circuit that amplifies or attenuates the signal level. This provides an advantageous effect in that the pixel signals are compared while amplification or attenuation thereof is performed by the source follower circuit.

Further, in this first aspect, the level control circuit may include an amplifier circuit that amplifies the signal level by a gain corresponding to a control signal. This provides an advantageous effect in that the pixel signals are compared while amplification thereof is performed by the amplifier circuit.

Further, a second aspect of the present technology is directed to a sensing device including a first pixel that outputs a first signal, a second pixel that outputs a second signal, a first signal line connected to the first pixel, a second signal line connected to the second pixel, a first gain circuit that is connected to the first signal line and that amplifies or attenuates the first signal, a second gain circuit that is connected to the second signal line and that amplifies or attenuates the second signal, a first comparator that compares the first signal with the second signal amplified or attenuated by the second gain circuit, and a second comparator that compares the second signal with the first signal amplified or attenuated by the first gain circuit. This provides an advantageous effect of improved accuracy in detection of an edge.

Further, in this second aspect, the sensing device may further include a first counter that counts a counter value in reference to the first comparison result, and a second counter that counts a counter value in reference to the second comparison result. This provides an advantageous effect in that the pixel signals are compared with each other by comparators in single-slope ADCs.

Further, in this second aspect, the first gain circuit may further amplify or attenuate the second signal by a gain different from the gain used for the first signal, and output the resulting signal to the second comparator, and the second gain circuit may further amplify or attenuate the first signal by a gain different from the gain used for the second signal, and output the resulting signal to the first comparator. This provides an advantageous effect in that both the first and second signals are amplified or attenuated by different gains.

Further, in this second aspect, the sensing device may further include a switching circuit that supplies the pair of pixel signals to each of the first and second gain circuits in a case where a predetermined edge detection mode is set, and supplies a predetermined reference signal and one of the pair of pixel signals to each of the first and second gain circuits in a case where the edge detection mode is not set. This provides an advantageous effect in that either AD conversion or detection of an edge is performed.

Further, in this second aspect, the sensing device may further include a first digital-to-analog converter that supplies a first reference signal, a second digital-to-analog converter that supplies a second reference signal, a first successive-approximation logic circuit that causes the first reference signal to be updated in reference to the first comparison result, and a second successive-approximation logic circuit that causes the second reference signal to be updated in reference to the second comparison result, and the second gain circuit, the first comparator, the first digital-to-analog converter, and the first successive-approximation logic circuit may be disposed in the first analog-to-digital converter, with the first gain circuit, the second comparator, the second digital-to-analog converter, and the second successive-approximation logic circuit being disposed in the second analog-to-digital converter. This provides an advantageous effect in that the pixel signals are compared with each other by comparators in successive-approximation ADCs.

Further, in this second aspect, each of the first and second comparators may include a pair of differential transistors, a first transistor that initializes one of the pair of differential transistors according to a first auto zero signal, and a second transistor that initializes the other one of the pair of differential transistors according to a second auto zero signal, and input timing of the first auto zero signal may be different from that of the second auto zero signal. This thus provides an advantageous effect in that auto-zeroing is performed at different timings on positive and negative sides.

Furthermore, a third aspect of the present technology is directed to an electronic apparatus including a level control circuit that amplifies or attenuates a signal level of one of a pair of pixel signals by a predetermined gain, a comparison circuit that compares the pair of pixel signals with the signal level of the one pixel signal amplified or attenuated with each other, and outputs a result of the comparison, an edge determination circuit that determines whether an edge is present or absent in reference to the comparison result, and outputs a result of the determination, and a digital signal processing circuit that subjects the determination result to processing. This provides an advantageous effect of improved accuracy in image recognition.

BRIEF DESCRIPTION OF DRAWINGS

FIG. 6 is a diagram illustrating an example operation of an edge determination circuit according to the first embodiment of the present technology.

FIG. 9 represents graphs each illustrating the relations between the amount of light and the signal level in the first embodiment of the present technology.

FIG. 18 is a diagram illustrating example settings of enable signals in the second embodiment of the present technology.

FIG. 29 represents diagrams each illustrating an example in which pixels with respect to which edge detection is performed in the fifth embodiment of the present technology are arranged in the shape of a cross.

FIG. 30 represents diagrams each illustrating an example in which pixels with respect to which the edge detection is performed in the fifth embodiment of the present technology are arranged in the shape of the letter "L."

FIG. 31 represents diagrams each illustrating an example in which pixels with respect to which the edge detection is performed in the fifth embodiment of the present technology are arranged in the shape of the letter "X."

FIG. 32 represents diagrams each illustrating an example in which pixels with respect to which the edge detection is performed are arranged in the shape of a cross when high dynamic range rendering is performed in the fifth embodiment of the present technology.

FIG. 33 represents diagrams each illustrating an example in which pixels with respect to which the edge detection is performed are arranged in the shape of the letter "X" when high dynamic range rendering is performed in the fifth embodiment of the present technology.

FIG. 34 represents diagrams each illustrating another example arrangement when high dynamic range rendering is performed in the fifth embodiment of the present technology.

DESCRIPTION OF EMBODIMENTS

Hereinafter, modes for carrying out the present technology (hereinafter referred to as embodiments) will be described. Descriptions will be provided in the following order.

1. First embodiment (an example in which pixel signals are compared with each other, with one of the pixel signals amplified or attenuated)
2. Second embodiment (an example in which a comparator in a single-slope ADC compares pixel signals with each other, with one of the pixel signals amplified or attenuated)
3. Third embodiment (an example in which a comparator in a successive-approximation ADC compares pixel signals with each other, with one of the pixel signals amplified or attenuated)
4. Fourth embodiment (an example in which positive and negative sides of a comparator are initialized at different timings, with one of pixel signals amplified or attenuated)
5. Fifth embodiment (an example in which sample-and-hold operations are performed, with one of pixel signals amplified or attenuated)
6. Sixth embodiment (an example in which comparators in ADCs for respective pixels compare pixel signals with each other, with one of the pixel signals amplified or attenuated)
7. Example modifications

1. First Embodiment

Example Configuration of Imaging Apparatus

Figure 1:
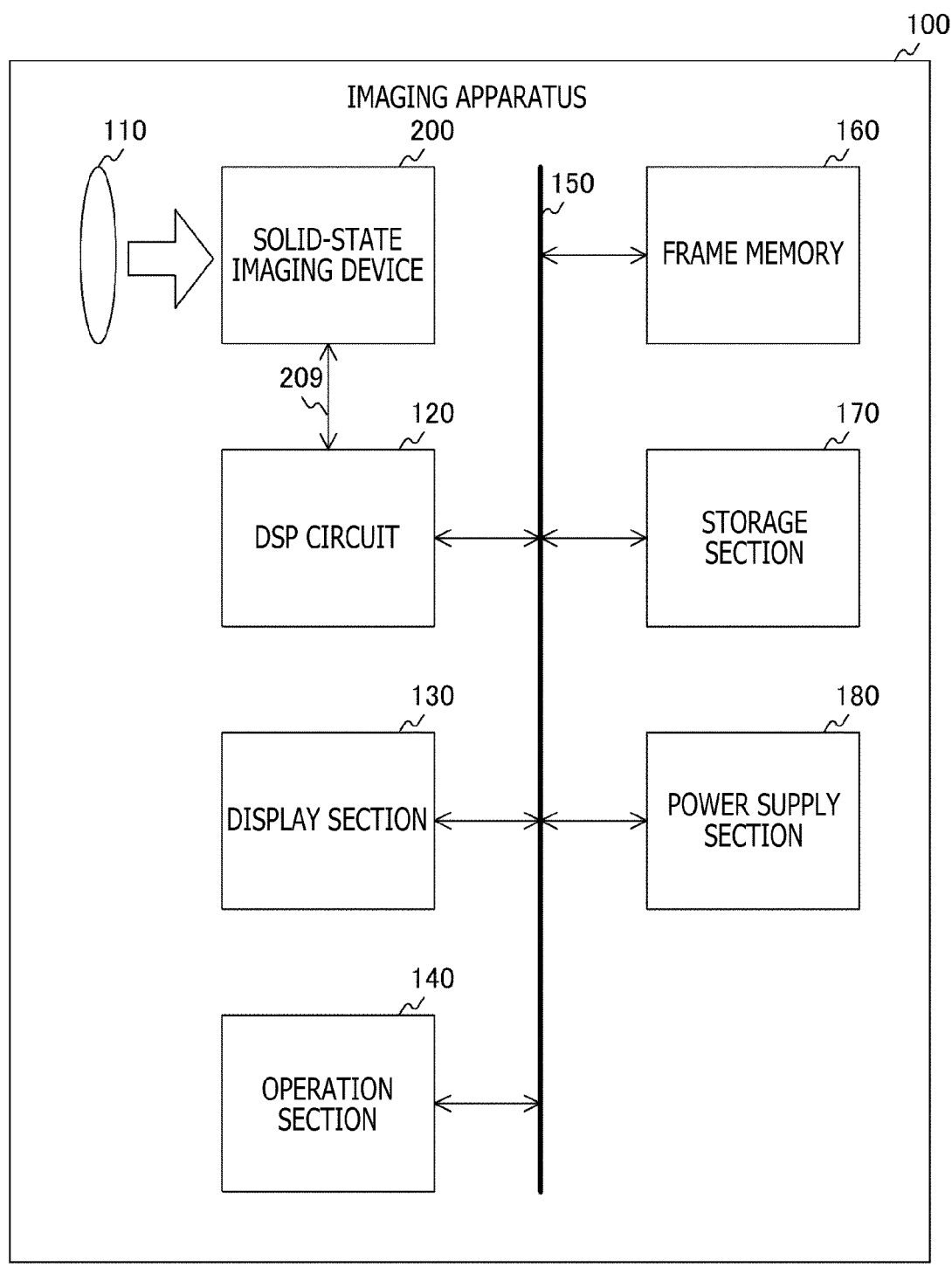
FIG. 1 is a block diagram illustrating an example configuration of an imaging apparatus according to a first embodiment of the present technology.

FIG. 1 is a block diagram illustrating an example configuration of an imaging apparatus 100 according to a first embodiment of the present technology. The imaging apparatus 100 is an apparatus for performing imaging to obtain image data, and includes an optical section 110, a solid-state imaging device 200, and a DSP (Digital Signal Processing) circuit 120. The imaging apparatus 100 further includes a display section 130, an operation section 140, a bus 150, a frame memory 160, a storage section 170, and a power supply section 180. Conceivable examples of the imaging apparatus 100 include, in addition to a digital camera, such as a digital still camera, a smart phone and a personal computer having an imaging function and an onboard camera.

The optical section 110 collects and condenses light from a subject, and leads the light to the solid-state imaging device 200. The solid-state imaging device 200 generates image data through photoelectric conversion in synchronism with a vertical synchronization signal. Here, the vertical synchronization signal is a periodic signal having a predetermined frequency indicating timing of imaging. The solid-state imaging device 200 supplies the generated image data to the DSP circuit 120 through a signal line 209. Note that the solid-state imaging device 200 is an example of a sensing device recited in the appended claims.

The DSP circuit 120 performs predetermined image processing on the image data supplied from the solid-state imaging device 200. The DSP circuit 120 outputs the image data subjected to the processing to the frame memory 160 and so on through the bus 150. Note that the DSP circuit 120 is an example of a digital signal processing circuit recited in the appended claims.

The display section 130 displays the image data. Conceivable examples of the display section 130 include a liquid crystal panel and an organic EL (Electro Luminescence) panel. The operation section 140 generates operation signals according to user operations.

The bus 150 is a shared path for exchanging data between the optical section 110, the solid-state imaging device 200, the DSP circuit 120, the display section 130, the operation section 140, the frame memory 160, the storage section 170, and the power supply section 180.

The frame memory 160 holds the image data. The storage section 170 stores various pieces of data, including the image data. The power supply section 180 supplies power to the solid-state imaging device 200, the DSP circuit 120, the display section 130, and so on.

Example Configuration of Solid-State Imaging Device

Figure 2:
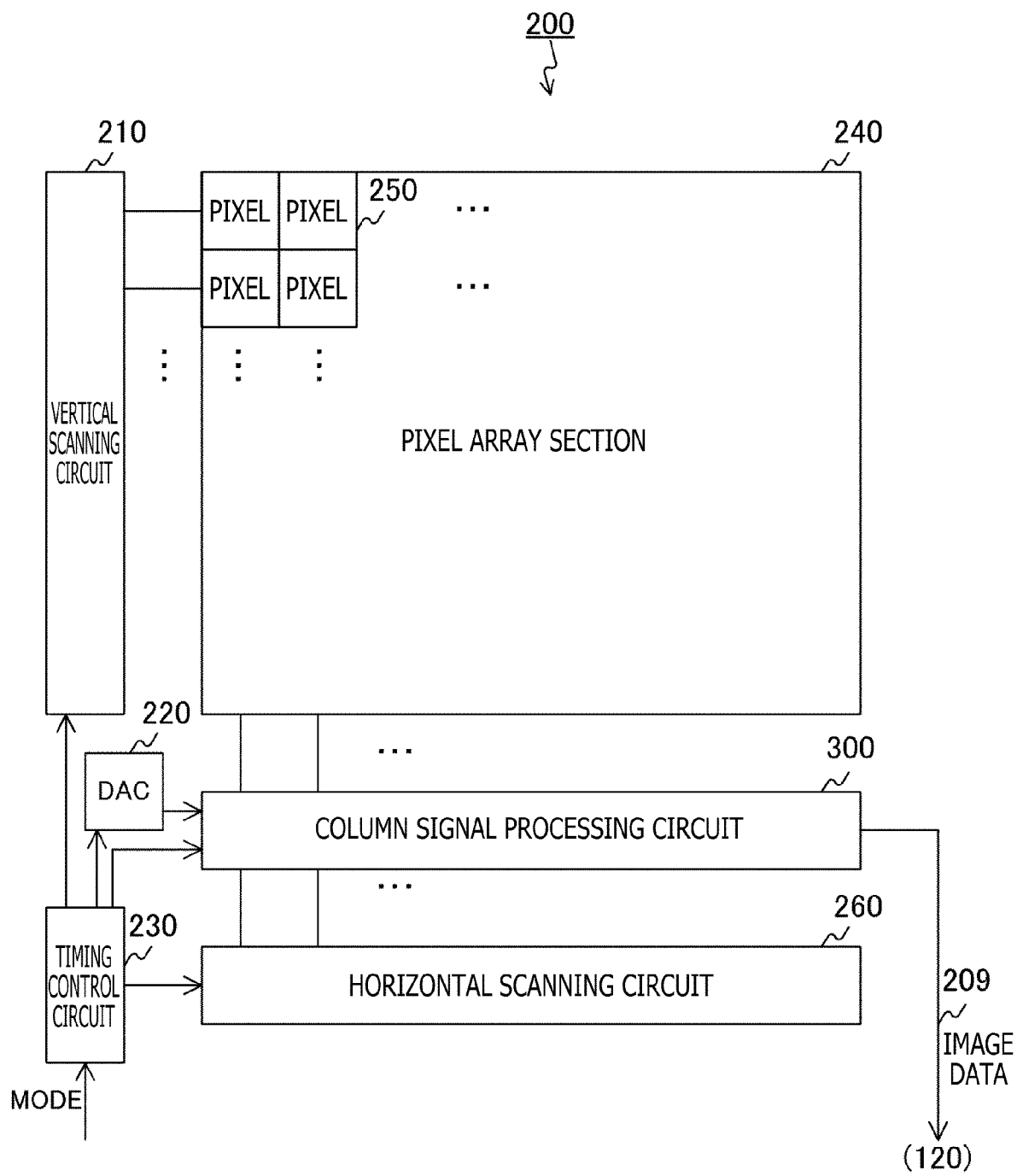
FIG. 2 is a block diagram illustrating an example configuration of a solid-state imaging device according to the first embodiment of the present technology.

FIG. 2 is a block diagram illustrating an example configuration of the solid-state imaging device according to the first embodiment of the present technology. The solid-state imaging device 200 includes a vertical scanning circuit 210, a DAC 220, a timing control circuit 230, a pixel array section 240, a column signal processing circuit 300, and a horizontal scanning circuit 260. In addition, these circuits are disposed on, for example, a single semiconductor chip.

In addition, in the pixel array section 240, a plurality of pixels 250 are arranged in a two-dimensional grid pattern. Hereinafter, a collection of pixels 250 arranged in a predetermined horizontal direction will be referred to as a "row," while a collection of pixels 250 arranged in a direction perpendicular to the horizontal direction will be referred to as a "column."

The timing control circuit 230 controls operation timing of the vertical scanning circuit 210, the column signal processing circuit 300, and so on in synchronism with the vertical synchronization signal.

In addition, a mode signal MODE that indicates an operation mode of the solid-state imaging device is inputted to the timing control circuit 230. Options of the operation mode include an edge detection mode in which it is detected whether an edge is present or absent and an imaging mode in which only imaging is performed to obtain image data without detecting whether an edge is present or absent. The timing control circuit 230 controls each circuit according to these operation modes. Note that, in the edge detection mode, imaging may also be performed to obtain image data while it is detected whether an edge is present or absent.

The vertical scanning circuit 210 selects and drives rows sequentially, and causes the rows to output analog pixel signals. The DAC 220 generates a reference signal through DA (Digital to Analog) conversion, and supplies the reference signal to the column signal processing circuit 300. A ramp signal having a sawtooth pattern, for example, is used as the reference signal. The pixels 250 generate pixel signals through photoelectric conversion, under the control by the vertical scanning circuit 210. Each of the pixels 250 outputs the pixel signals to the column signal processing circuit 300.

The column signal processing circuit 300 performs signal processing, such as a CDS process and an AD conversion process, on the pixel signals on a column-by-column basis. The column signal processing circuit 300 supplies image data including digital signals obtained as a result of the signal processing to the DSP circuit 120, under the control by the horizontal scanning circuit 260.

The horizontal scanning circuit 260 selects columns sequentially, and causes the column signal processing circuit 300 to output the digital signals sequentially.

Example Configuration of Pixel

Figure 3:
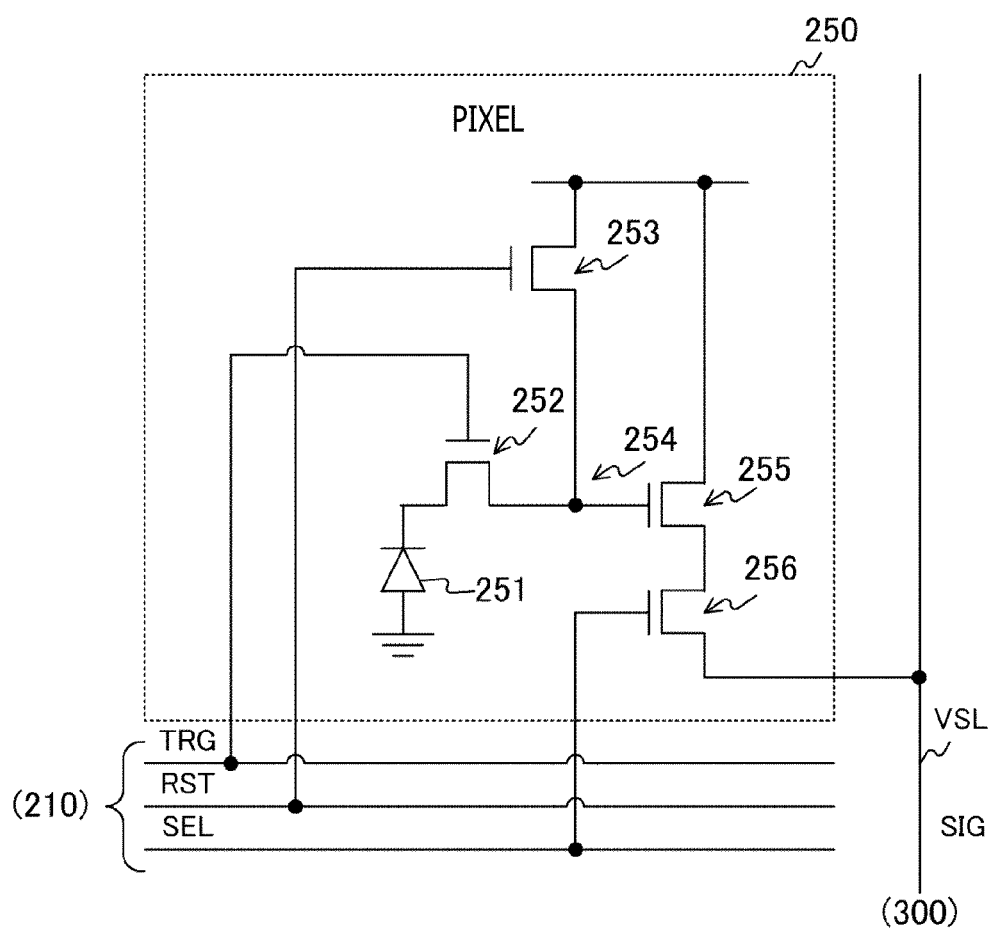
FIG. 3 is a circuit diagram illustrating an example configuration of a pixel according to the first embodiment of the present technology.

FIG. 3 is a circuit diagram illustrating an example configuration of the pixel 250 according to the first embodiment of the present technology. The pixel 250 includes a photoelectric conversion element 251, a transfer transistor 252, a reset transistor 253, a floating diffusion layer 254, an amplification transistor 255, and a selection transistor 256.

The photoelectric conversion element 251 subjects incoming light to photoelectric conversion to generate an electric charge. The transfer transistor 252 transfers the electric charge from the photoelectric conversion element 251 to the floating diffusion layer 254, according to a transfer signal TRG from the vertical scanning circuit 210.

The reset transistor 253 removes the electric charge from the floating diffusion layer 254 according to a reset signal RST from the vertical scanning circuit 210, for initialization.

The floating diffusion layer 254 accumulates the electric charge to generate a voltage corresponding to the quantity of the electric charge. The amplification transistor 255 amplifies the voltage of the floating diffusion layer 254.

The selection transistor 256 outputs, as a pixel signal, a signal representing the amplified voltage, according to a selection signal SEL from the vertical scanning circuit 210. The pixel signal is supplied to the column signal processing circuit 300 through a corresponding vertical signal line VSL.

Note that the circuit of the pixel 250 is not limited to the 4-transistor circuit as illustrated in the figure, as long as the circuit is capable of generating the pixel signal through photoelectric conversion. For example, an overflow gate transistor that removes the electric charge from the photoelectric conversion element may be additionally provided to form a 5-transistor circuit. Moreover, a transistor that functions as an embedded analog memory may be further added to form a 6-transistor circuit. Furthermore, an 8-transistor pixel as described in "Laurence Stark, et al., Back-illuminated voltage-domain global shutter CMOS image sensor with 3.75 µm pixels and dual in-pixel storage nodes, VLSI symposium 2016" may be used. Alternatively, a pixel as described in "Kazuko Nishimura, et al., An 8K4K-Resolution 60 fps 450 ke—Saturation-Signal Organic-Photoconductive-Film Global-Shutter CMOS Image Sensor with In-Pixel Noise Canceller, ISSCC 2018" may be used.

Example Configuration of Column Signal Processing Circuit

Figure 4:
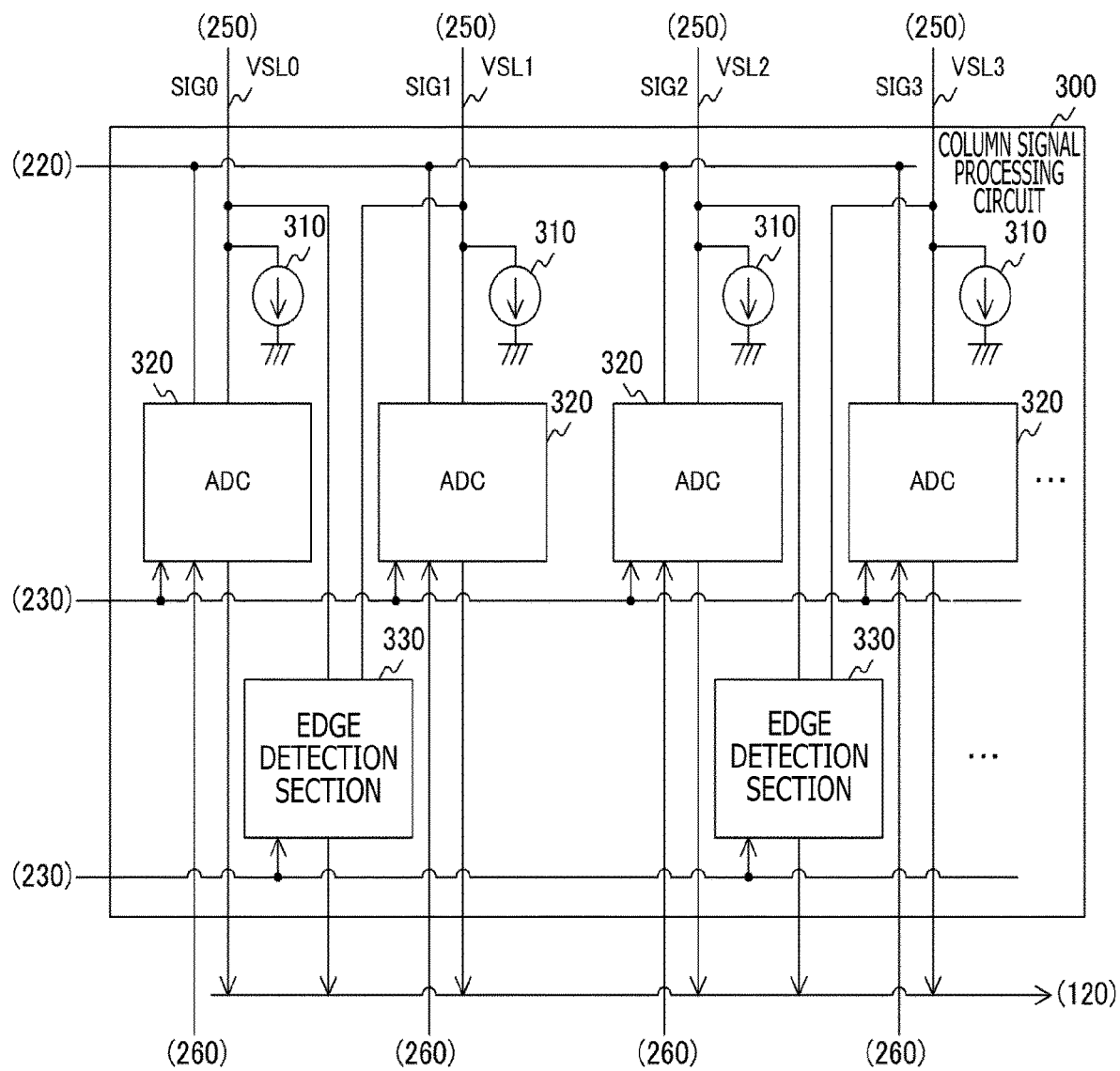
FIG. 4 is a block diagram illustrating an example configuration of a column signal processing circuit according to the first embodiment of the present technology.

FIG. 4 is a block diagram illustrating an example configuration of the column signal processing circuit 300 according to the first embodiment of the present technology. The column signal processing circuit 300 has a plurality of constant current sources 310, a plurality of ADCs 320, and a plurality of edge detection sections 330 disposed therein. The constant current source 310 and the ADC 320 are disposed for each column. In the case where the number of columns is N (N is an integer), N constant current sources 310 and N ADCs 320 are disposed. Meanwhile, each edge detection section 330 is disposed for a separate pair of pixels in a row with respect to which an edge is to be detected. When an edge is to be detected with respect to each of a pair of a 0th column and a 1st column and a pair of the 1st column and a 2nd column, for example, two edge detection sections 330 are disposed for the 0th to 3rd columns.

Each constant current source 310 supplies a constant electric current to a corresponding vertical signal line.

The ADC 320 converts the analog pixel signals of a corresponding column to digital signals in accordance with control by the timing control circuit 230. This ADC 320 supplies the digital signals to the DSP circuit 120, under the control by the horizontal scanning circuit 260. A single-slope ADC including a comparator and a counter, for example, is used as the ADC 320. Note that a successive-approximation ADC including a comparator, a successive-approximation logic circuit, and a register may alternatively be used.

Each edge detection section 330 detects whether or not there is an edge between a corresponding pair of pixels. The vertical signal lines of the corresponding columns are connected to the edge detection section 330. For example, a vertical signal line VSL0 of the 0th column and a vertical signal line VSL1 of the 1st column are connected to the edge detection section 330 corresponding to the 0th column and the 1st column. The edge detection section 330 detects whether an edge is present or absent and supplies a result of the detection to the DSP circuit 120, under the control by the timing control circuit 230.

In the edge detection mode, the timing control circuit 230 sets the edge detection section 330 to an enabled state, causing the edge detection section 330 to detect whether or not an edge is present, and sets the ADC 320 to a disabled state. Meanwhile, in the imaging mode, the timing control circuit 230 sets the ADC 320 to an enabled state, causing the ADC 320 to perform the AD conversion, and sets the edge detection section 330 to a disabled state.

Example Configuration of Edge Detection Section

Figure 5:
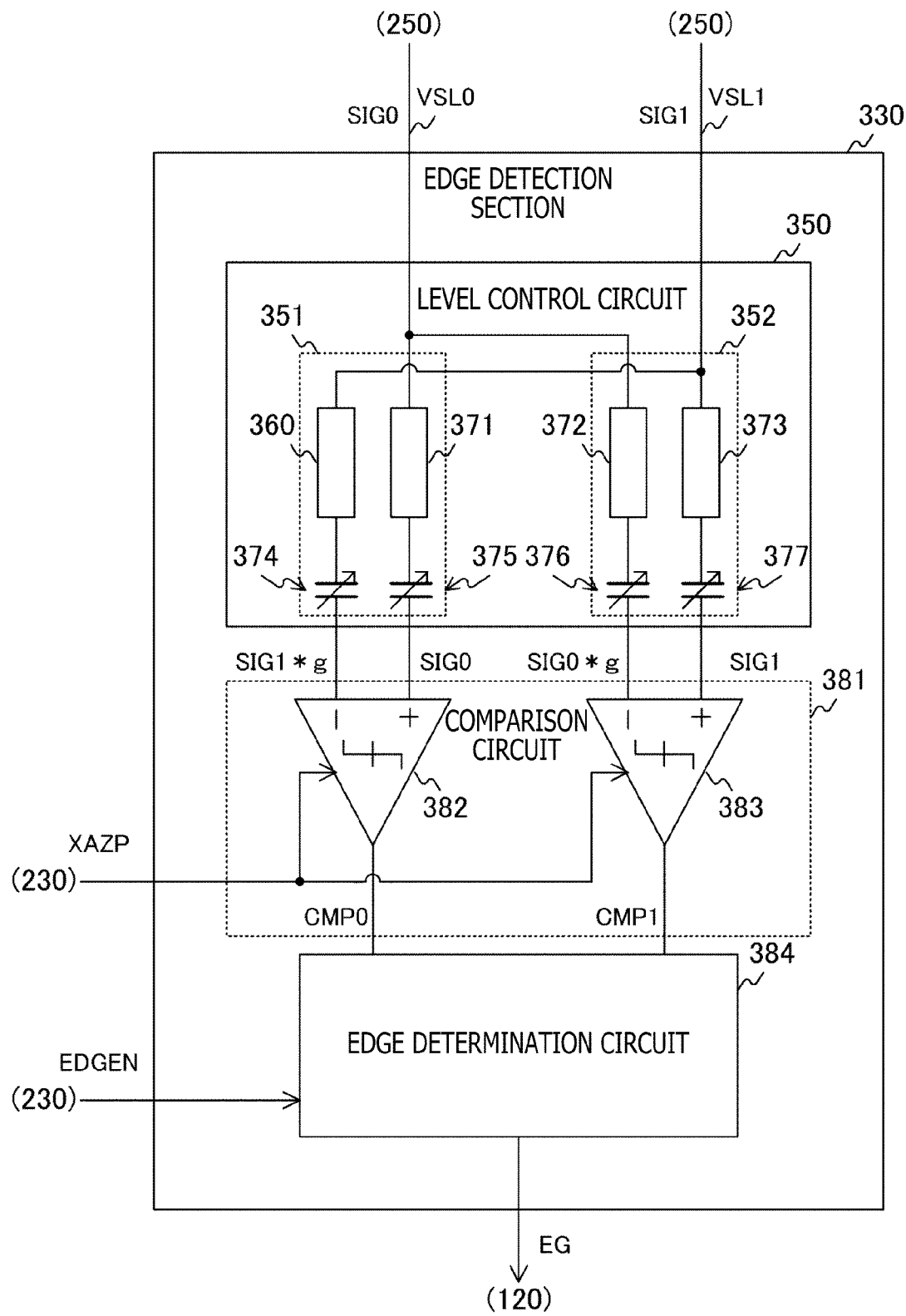
FIG. 5 is a circuit diagram illustrating an example configuration of an edge detection section according to the first embodiment of the present technology.

FIG. 5 is a circuit diagram illustrating an example configuration of the edge detection section 330 according to the first embodiment of the present technology. The edge detection section 330 includes a level control circuit 350, a comparison circuit 381, and an edge determination circuit 384. In addition, the comparison circuit 381 includes comparators 382 and 383.

The level control circuit 350 amplifies or attenuates a pair of pixel signals by mutually different gains. The level control circuit 350 includes gain circuits 351 and 352. To each of the gain circuits 351 and 352, both of the vertical signal lines VSL0 and VSL1 are connected, and both of a pixel signal SIG0 from the vertical signal line VSL0 and a pixel signal SIG1 from the vertical signal line VSL1 are inputted.

The gain circuit 351 amplifies or attenuates the pixel signal SIG1 by a relative gain g, and outputs the resulting pixel signal to the comparator 382 together with the pixel signal SIG0. In the gain circuit 351, source follower circuits 360 and 371 and variable capacitors 374 and 375 are disposed. The source follower circuit 360 and the variable capacitor 374 are inserted in series between the vertical signal line VSL1 and an inverting input terminal (−) of the comparator 382. Meanwhile, the source follower circuit 371 and the variable capacitor 375 are inserted in series between the vertical signal line VSL0 and a non-inverting input terminal (+) of the comparator 382. Note that the ratio between the capacitance of the variable capacitor 374 and the capacitance of the variable capacitor 375 is set to be a predetermined value.

In the gain circuit 351, the source follower circuit 360 amplifies or attenuates the pixel signal SIG1 by a predetermined gain g1, while the source follower circuit 371 amplifies or attenuates the pixel signal SIG0 by a gain g0, which is different from the gain g1. Each of g0 and g1 is a real number, and the pixel signal is amplified when a gain of more than 1 is set, while the pixel signal is attenuated when a gain of less than 1 is set. With this configuration, the gain circuit 351 is capable of amplifying or attenuating the pixel signal SIG0 by the gain g0, and amplifying or attenuating the pixel signal SIG1 by the gain g1. Here, to say in a different way, assuming that g1/g0 is the relative gain g, the gain circuit 351 amplifies or attenuates only the pixel signal SIG1 by the relative gain g, and outputs the pixel signal SIG1 as it is.

The gain circuit 352 amplifies or attenuates the pixel signal SIG0 by the relative gain g, and outputs the resulting pixel signal to the comparator 383 together with the pixel signal SIG0. In the gain circuit 352, source follower circuits 372 and 373 and variable capacitors 376 and 377 are disposed.

In addition, the source follower circuit 372 and the variable capacitor 376 are inserted in series between the vertical signal line VSL0 and an inverting input terminal (−) of the comparator 383. Meanwhile, the source follower circuit 373 and the variable capacitor 377 are inserted in series between the vertical signal line VSL1 and a non-inverting input terminal (+) of the comparator 383. Note that the ratio between the capacitance of the variable capacitor 376 and the capacitance of the variable capacitor 377 is set to be a predetermined value.

In addition, in the gain circuit 352, the source follower circuit 372 amplifies or attenuates the pixel signal SIG1 by the gain g0, while the source follower circuit 373 amplifies or attenuates the pixel signal SIG0 by the gain g1. With this configuration, the gain circuit 352 is capable of amplifying or attenuating only the pixel signal SIG0 by the relative gain g, and outputting the pixel signal SIG1 as it is.

Note that each of the gain circuits 351 and 352 may alternatively amplify or attenuate the pixel signal by using a circuit (e.g., an amplifier circuit, which will be described later) other than the source follower circuit. Also note that, although the source follower circuits are inserted for both of the vertical signal lines VSL0 and VSL1 in the above-described example, the source follower circuit may alternatively be inserted for only one of the vertical signal lines VSL0 and VSL1. In this case, the source follower circuit is inserted for a different one of the vertical signal lines in each of the gain circuits 351 and 352.

The comparator 382 compares the pixel signal SIG1 amplified by the relative gain g with the pixel signal SIG0. The comparator 382 supplies a comparison result CMP0 to the edge determination circuit 384.

The comparator 383 compares the pixel signal SIG0 amplified by the relative gain g with the pixel signal SIG1. The comparator 383 supplies a comparison result CMP1 to the edge determination circuit 384.

In addition, each of the comparators 382 and 383 is initialized by an inverted signal XAZP from the timing control circuit 230.

The edge determination circuit 384 determines whether an edge is present or absent, under the control by the timing control circuit 230. To the edge determination circuit 384, an enable signal EDGEN is inputted from the timing control circuit 230. In the case where the edge determination circuit 384 has been set to an enabled state by the enable signal EDGEN, the edge determination circuit 384 determines whether an edge is present or absent in reference to the comparison results CMP0 and CMP1, and outputs a result thereof as an edge detection result EG. Meanwhile, in the case where the edge determination circuit 384 has been set to a disabled state, the edge determination circuit 384 does not determine whether an edge is present or absent.

FIG. 6 is a diagram illustrating an example operation of the edge determination circuit 384 according to the first embodiment of the present technology. In the case where the edge determination circuit 384 has been set to the enabled state, the edge determination circuit 384 determines that an edge is present if the comparison results CMP0 and CMP1 represent different values. Meanwhile, the edge determination circuit 384 determines that an edge is absent if the comparison results CMP0 and CMP1 represent the same value.

It is assumed, for example, that a low-level comparison result CMP0 is outputted when the following inequality holds.

$$SIG0 \leq SIG1*g \qquad \text{inequality 1}$$

In the above inequality, "*" represents multiplication.

Meanwhile, it is assumed that a high-level comparison result CMP0 is outputted when the following inequality holds.

$$SIG0 > SIG1*g \qquad \text{inequality 2}$$

In addition, it is assumed that a high-level comparison result CMP1 is outputted when the following inequality holds.

$$SIG1 > SIG0*g \qquad \text{inequality 3}$$

In the above inequality, "*" represents multiplication.

Meanwhile, it is assumed that a low-level comparison result CMP1 is outputted when the following inequality holds.

$$SIG1 \leq SIG0*g \qquad \text{inequality 4}$$

In the case where both inequality 1 and inequality 3 hold, the following inequality holds.

$$SIG0 << SIG1 \qquad \text{inequality 5}$$

In the above inequality, "<<" represents such a great difference in magnitude that it should be determined that an edge is present.

Meanwhile, in the case where both inequality 2 and inequality 4 hold, the following inequality holds.

$$SIG0 >> SIG1 \qquad \text{inequality 6}$$

In the above inequality, ">>" represents such a great difference in magnitude that it should be determined that an edge is present.

In the case where the comparison results CMP0 and CMP1 represent different values, one of inequality 5 and inequality 6 holds. Each of inequality 5 and inequality 6 indicates that the ratio of one of the pixel signals SIG0 and SIG1 to the other is equal to or greater than a certain value. In this case, it is determined that an edge is present.

Meanwhile, in the case where the comparison results CMP0 and CMP1 represent the same value, neither inequality 5 nor inequality 6 holds. In this case, it is determined that an edge is absent. Note that, in the case where g is less than "1," both of the comparison results CMPO0 and CMP1 never represent "0" according to calculations. In addition, in the case where g is equal to or greater than "1," both of the comparison results CMPO0 and CMP1 never represent "1" according to calculations. However, such cases may happen because of an effect of noise, and hence, determination results as to an edge are set even with respect to the cases that never take place according to calculations.

Note that, although the two comparators 382 and 383 are disposed in the edge detection section 330 in the above-described example, only one comparator may be disposed therein. In this case, for example, the comparator compares the pixel signals SIG0 and SIG1 that are not yet subjected to the amplification or attenuation with each other, and the level control circuit 350 changes the pixel signals to be amplified or attenuated by the gains, depending on a result of the comparison. Then, it is sufficient if the comparator compares the pixel signals that have been subjected to the amplification or attenuation with each other.

Figure 7:
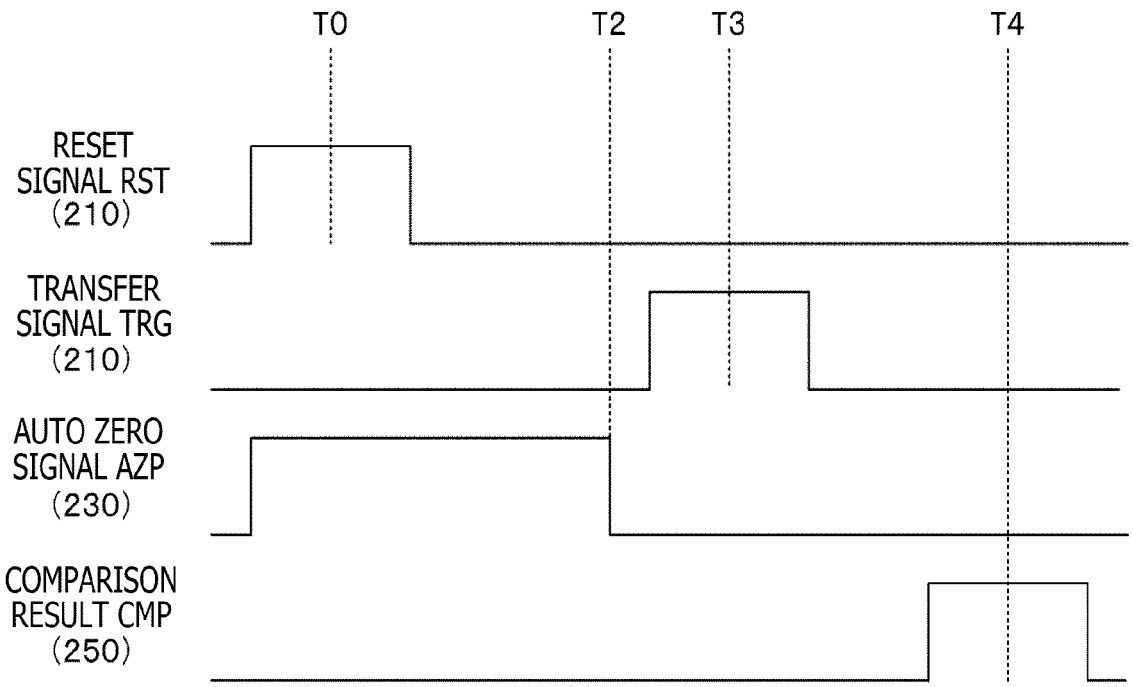
FIG. 7 is a timing diagram illustrating an example operation of the solid-state imaging device according to the first embodiment of the present technology.

FIG. 7 is a timing diagram illustrating an example operation of the solid-state imaging device 200 according to the first embodiment of the present technology.

At a timing T0, at which the floating diffusion layer 254 should be reset, the vertical scanning circuit 210 supplies the reset signal RST. Thus, the floating diffusion layer 254 in the pixel 250 is initialized. Then, at a timing T3, which is immediately before an end of an exposure, the vertical scanning circuit 210 supplies the transfer signal TRG. As a result, the electric charge is transferred to the floating diffusion layer 254, so that a pixel signal corresponding to the amount of exposure is generated.

In addition, during a period from the timing T0 to a timing T2, which is immediately before the timing T3, the timing control circuit 230 continues supplying a high-level auto zero signal AZP. Each of the comparators 382 and 383 is initialized by the inverted signal XAZP, which is the inverse of the auto zero signal.

Then, at a timing T4, which is after an end of the transfer of the electric charge, each of the comparators 382 and 383 outputs a comparison result CMP.

Figure 8:
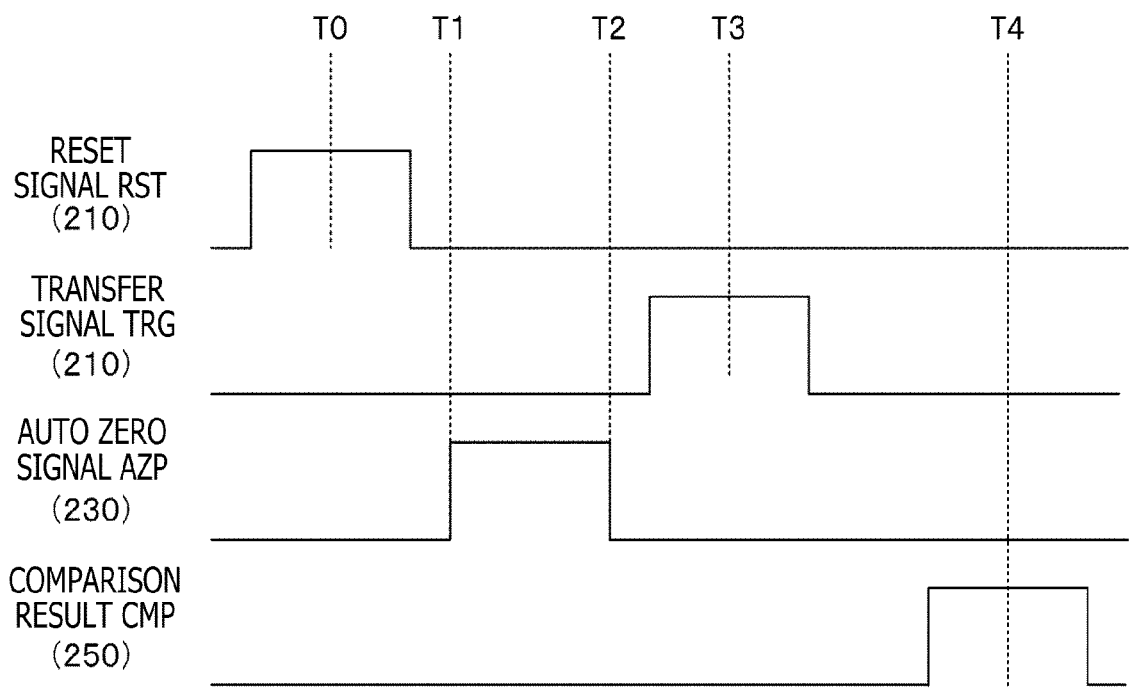
FIG. 8 is a timing diagram illustrating an example operation of the solid-state imaging device when the timing of an auto zero signal is changed in the first embodiment of the present technology.

Note that, as illustrated in FIG. 8, the timing control circuit 230 may alternatively continue supplying the high-level auto zero signal AZP during a period from a timing T1, which is immediately after the timing T0, to the timing T2.

FIG. 9 represents graphs each illustrating the relations between the amount of light and the signal level in the first embodiment of the present technology. The part "a" in this figure represents a graph illustrating an example of the relations between the amount of ambient light and the signal level of each of the pixel signals SIG0 and SIG1 that have not yet been subjected to the amplification or attenuation by the gain. The part "b" in this figure represents a graph illustrating an example of the relations between the amount of ambient light and the signal level when only the pixel signal SIG1 has been amplified or attenuated by the relative gain g. The part "c" in this figure represents a graph illustrating an example of the relations between the amount of ambient light and the signal level when only the pixel signal SIG0 has been amplified or attenuated by the relative gain g. The vertical axis in this figure represents the signal level of the pixel signals, while the horizontal axis represents the amount of ambient light.

In addition, it is assumed in this figure that a pixel that generates the pixel signal SIG0 receives a ray of ambient light reflected from a surface of object A, which has a reflectivity of Ra, while a pixel that generates the pixel signal SIG1 receives a ray of ambient light reflected from a surface of object B, which has a reflectivity of Rb. It is assumed that AL denotes the amount of ambient light and that the relative gain g is less than 1.

Here, suppose a comparative example in which presence or absence of an edge is detected by comparing a difference between the pixel signals SIG0 and SIG1 with a threshold value Th. In this comparative example, it is determined that an edge is present in the case where the following inequality holds.

$$SIG0-SIG1=Ra*AL-Rb*AL>Th \qquad \text{inequality 7}$$

Inequality 7 can be rewritten as the following inequality.

$$(Ra-Rb)>Th/AL \qquad \text{inequality 8}$$

As exemplified in inequality 7 and inequality 8, the determination result as to an edge can vary depending on the amount AL of ambient light in the comparative example. This leads to reduced accuracy in the detection of an edge. For example, as the light amount AL decreases, the difference decreases, making it harder to detect an edge. Although the reduction in the detection accuracy can be reduced by varying the threshold value according to the amount of ambient light, it is difficult to accurately measure the light amount and finely adjust the threshold value accordingly. Moreover, although the effect of the ambient light can be reduced by a method of subjecting the pixel signals to logarithmic transformation and comparing a difference between the resultants with a threshold value, it is difficult to implement this method because of the necessity of logarithmic operation.

However, the effect of the ambient light can easily be reduced by introducing a method in which the threshold value is determined not in reference to the ambient light but in reference to the signals.

As illustrated in the figure, it is assumed that, no matter whether only the pixel signal SIG1 is attenuated by the relative gain g or whether only the pixel signal SIG0 is attenuated by the relative gain g, the magnitude relation between the pixel signals does not change as a result of the attenuation. In this case, the comparison results CMP0 and CMP1 represent different values due to the manners of connection of the input terminals of the comparators 382 and 383 illustrated in FIG. 5. At this time, the following inequality holds.

$$|Ra*AL-Rb*AL|>g*\max(Ra,Rb)*AL \qquad \text{inequality 9}$$

In the above inequality, max( ) represents a function that returns the greatest value of a plurality of input values within ( ). Note that, in the case where the relative gain g is greater than 1, a function min( ), which returns the smallest value, is used in place of max( ).

In the case where Ra is greater than Rb, inequality 9 can be rewritten as the following inequality.

$$(Ra-Rb)*AL>g*Ra*AL \qquad \text{inequality 10}$$

Inequality 10 can be rewritten as the following inequality.

$$(1-g)*Ra*AL-Rb*AL>0 \qquad \text{inequality 11}$$

Further, inequality 11 can be rewritten as the following inequality.

$$G*(Ra*AL)-(Rb*AL)>0 \qquad \text{inequality 12}$$

Dividing both sides of inequality 12 by the light amount AL gives the following inequality.

$$G*Ra-Rb>0 \qquad \text{inequality 13}$$

That is, in the case where the comparison results CMP0 and CMP1 represent different values, inequality 13 holds. Inequality 13 indicates that the ratio between the pixel signal SIG0 and the pixel signal SIG1 is equal to or greater than a certain value (G in the above inequality). In other words, the comparison results CMP0 and CMP1 represent values that indicate that the ratio between the pixel signal SIG0 and the pixel signal SIG1 is equal to or greater than a certain value.

Since inequality 13 does not include a term that includes the light amount AL, the solid-state imaging device 200 is capable of determining whether an edge is present or absent without depending on the light amount AL. Thus, higher accuracy in the detection of an edge can be achieved than in the comparative example.

Example Operation of Solid-State Imaging Device

Figure 10:
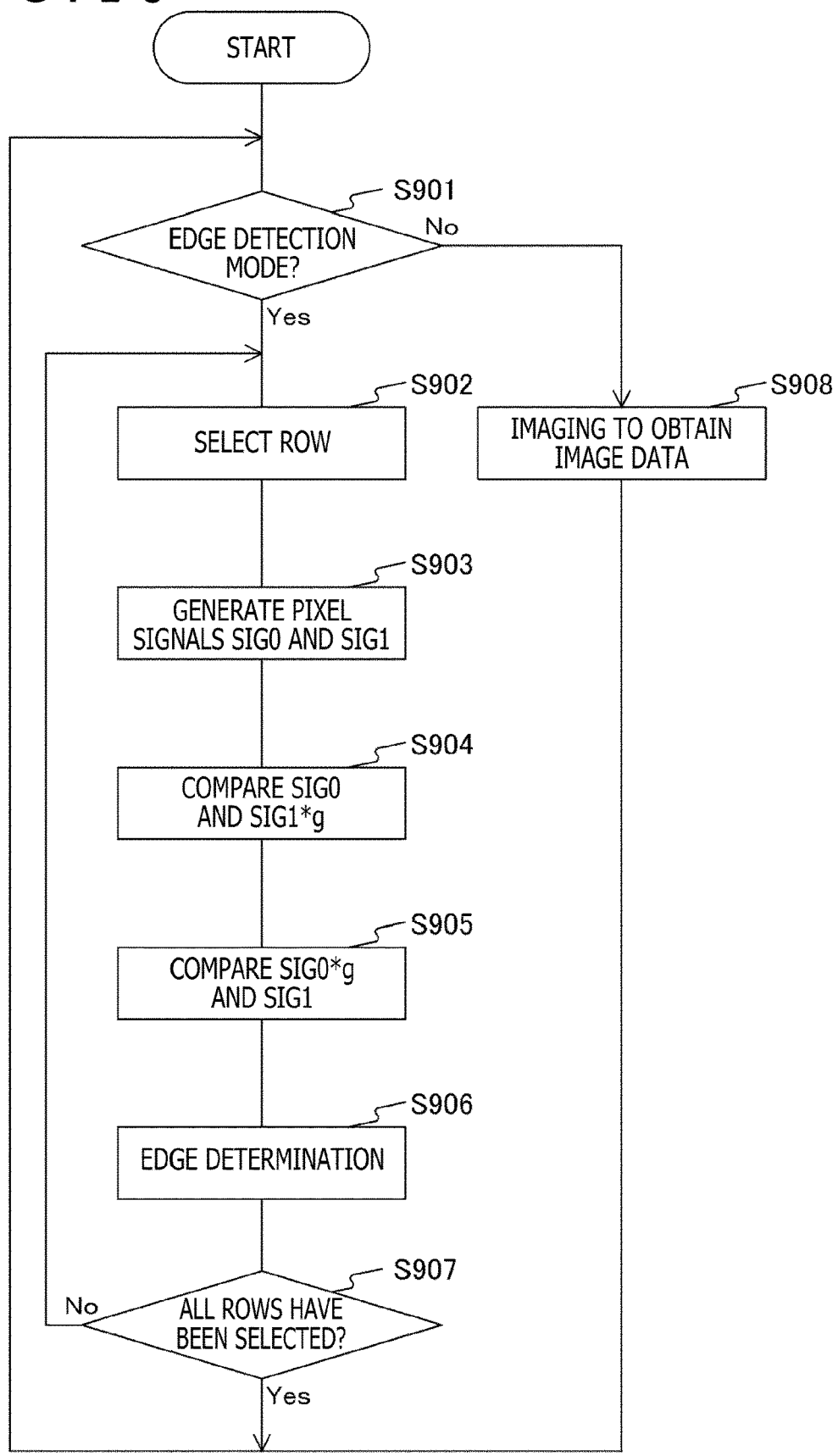
FIG. 10 is a flowchart illustrating an example operation of the solid-state imaging device according to the first embodiment of the present technology.

FIG. 10 is a flowchart illustrating an example operation of the solid-state imaging device 200 according to the first embodiment of the present technology. This operation is started when, for example, power of the solid-state imaging device 200 is turned on.

The solid-state imaging device 200 determines whether or not the edge detection mode is set as the operation mode (step S901). In the case where the edge detection mode is set as the operation mode (step S901: Yes), the vertical scanning circuit 210 in the solid-state imaging device 200 selects and drives one of the rows (step S902). The pixels in the row generate pixel signals SIG0, SIG1, and so on (step S903). The comparator 382 compares the pixel signal SIG0 with the pixel signal SIG1*g subjected to the amplification or attenuation by the gain (step S904). Meanwhile, the comparator 383 compares the pixel signal SIG1 with the pixel signal SIG0*g subjected to the amplification or attenuation by the gain (step S905). Then, the edge determination circuit 384 determines whether an edge is present or absent in reference to the comparison results CMP0 and CMP1 (step S906).

The vertical scanning circuit 210 determines whether or not all the rows have already been selected (step S907). In the case where all the rows have already been selected (step S907: Yes), the solid-state imaging device 200 repeats step S901 and the subsequent steps. In the case where all the rows have not been selected yet (step S907: No), the solid-state imaging device 200 repeats step S902 and the subsequent steps.

Meanwhile, in the case where the edge detection mode is not set as the operation mode (step S901: No), the solid-state imaging device 200 performs imaging to obtain image data (step S908), and repetitively performs step S901 and the subsequent steps.

As described above, in the first embodiment of the present technology, the comparator 382 compares the signal obtained by amplifying or attenuating the pixel signal SIG1 with the pixel signal SIG0 which has not been amplified or attenuated, and a result of the comparison therefore represents a value that indicates whether or not the ratio between the pixel signals SIG0 and SIG1 is equal to or greater than a certain value. This ratio between the pixel signals is a parameter that does not depend on the amount of ambient light, and hence, the edge determination circuit 384 is able to detect, in reference to the result of the comparison, whether an edge is present or absent, without depending on the amount of ambient light. This leads to an improvement in the accuracy in the detection of an edge.

[First Modification]

In the above-described first embodiment, the edge detection section 330 detects whether an edge is present or absent with the source follower circuits remaining connected to the vertical signal lines. However, it is desirable that, in the case where detection of an edge is not performed, the source follower circuits be disconnected from the vertical signal lines from the viewpoint of reducing power consumption. A first modification of the first embodiment is different from the first embodiment in that a switching circuit for opening and closing paths between the source follower circuits and the vertical signal lines is additionally provided.

Figure 11:
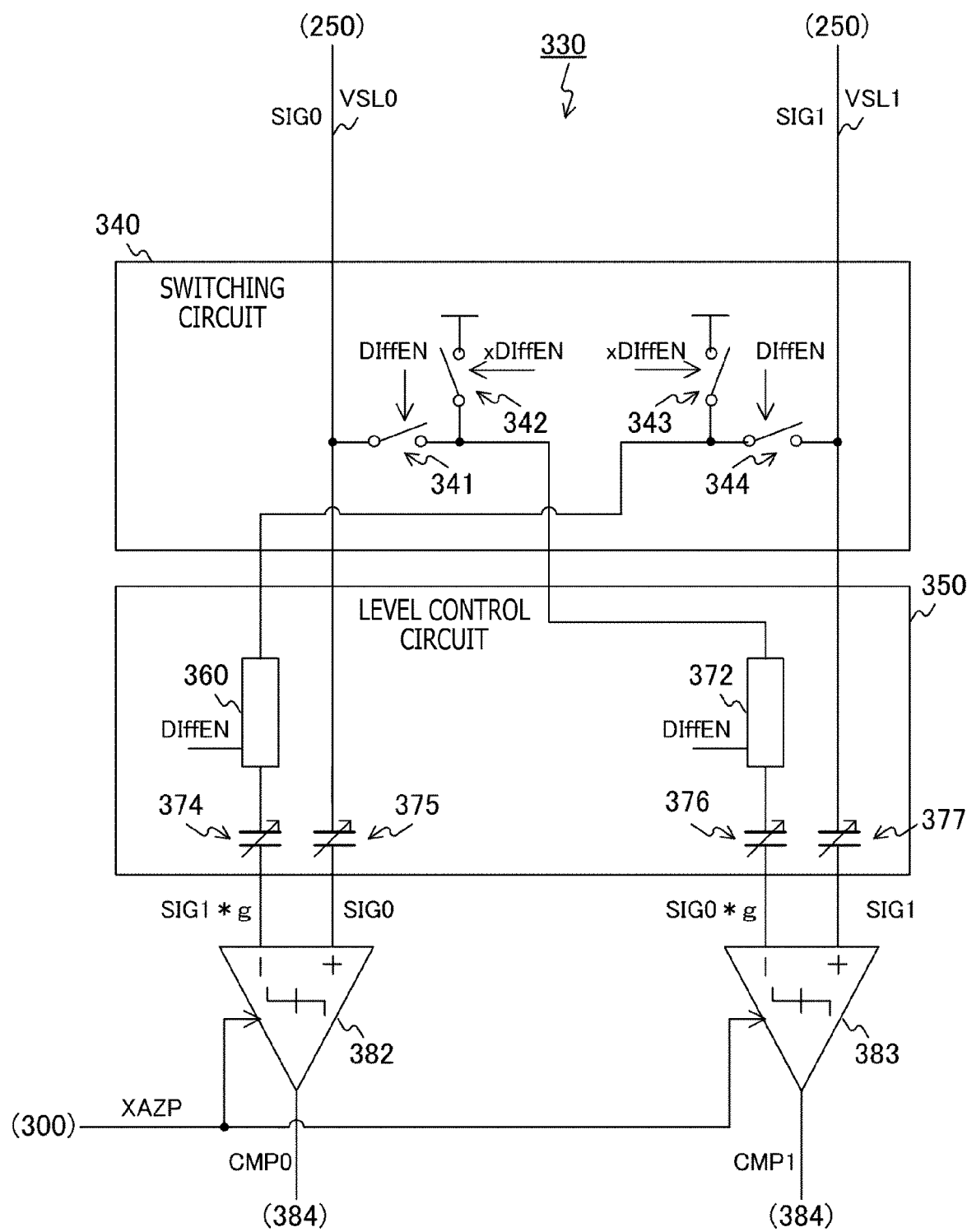
FIG. 11 is a circuit diagram illustrating an example configuration of an edge detection section according to a first modification of the first embodiment of the present technology.

FIG. 11 is a circuit diagram illustrating an example configuration of an edge detection section 330 according to the first modification of the first embodiment of the present technology. The edge detection section 330 according to the first modification of the first embodiment is different from the edge detection section 330 according to the first embodiment in that a switching circuit 340 is additionally provided. In addition, the source follower circuits 371 and 373 are not provided, and an enable signal DiffEN is inputted to each of the source follower circuits 360 and 372.

The switching circuit 340 includes switches 341, 342, 343, and 344. The switch 341 opens and closes a path between the vertical signal line VSL0 and the source follower circuit 372 according to the enable signal DiffEN. The switch 342 opens and closes a path between a power supply and the source follower circuit 372 according to an inverted signal xDiffEN, which is the inverse of the enable signal DiffEN.

The switch 343 opens and closes a path between the vertical signal line VSL1 and the source follower circuit 360 according to the enable signal DiffEN. The switch 344 opens and closes a path between the power supply and the source follower circuit 360 according to the inverted signal xDiffEN.

The enable signal DiffEN is generated by, for example, the timing control circuit 230. In the case where the edge detection mode is set as the operation mode, the timing control circuit 230 causes the switches 341 and 344 to enter a closed state, by using the enable signal DiffEN, and causes the switches 342 and 343 to enter an open state. On the other hand, in the case where the edge detection mode is not set as the operation mode, the timing control circuit 230 causes the switches 341 and 344 to enter an open state, by using the enable signal DiffEN, and causes the switches 342 and 343 to enter a closed state, thereby fixing an input node of each of the source follower circuits 360 and 372 at a predetermined voltage. Note that the input node may be fixed at any voltage as long as the input node is not made floating. Hence, the source follower circuits can be disconnected from the vertical signal lines in the case where the detection of an edge is not performed. As a result, no electric current passes through the source follower circuits, resulting in a corresponding reduction in the power consumption.

Figure 12:
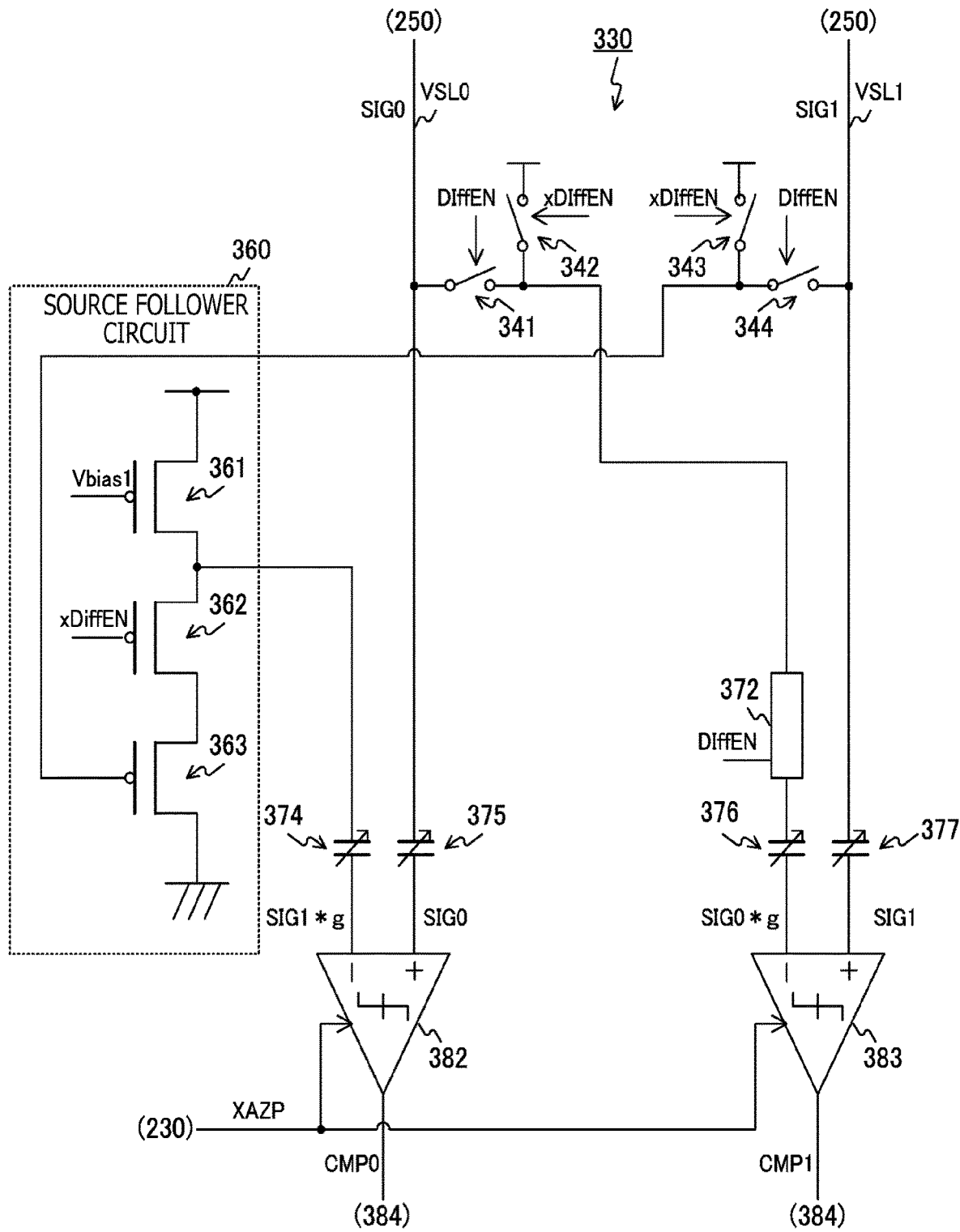
FIG. 12 is a circuit diagram illustrating an example configuration of a source follower circuit according to the first modification of the first embodiment of the present technology.

FIG. 12 is a circuit diagram illustrating an example configuration of the source follower circuit 360 according to the first modification of the first embodiment of the present technology. The source follower circuit 360 according to the first modification of the first embodiment includes pMOS transistors 361, 362, and 363. Note that the gain of the source follower circuit 360 can be adjusted by connecting a semiconductor substrate (body) of the pMOS transistor 363 to a source thereof or a power supply. This similarly applies to the source follower circuit 372.

The pMOS transistors are connected in series between the power supply and a ground terminal. In addition, a predetermined bias voltage Vbias1 is inputted to a gate of the pMOS transistor 361 on the side closer to the power supply. The inverse xDiffEN of the enable signal DiffEN is inputted to a gate of the second pMOS transistor 362 from the side closer to the power supply. A gate of the pMOS transistor 363 on the side closer to the ground is connected to the switch 344. In addition, a point of junction of the pMOS transistors 361 and 362 is connected to the variable capacitor 374. Note that an nMOS transistor may be used in place of the pMOS transistor 362, and in this case, the enable signal DiffEN is inputted to a gate thereof.

Note that the configuration of the source follower circuit 372 is similar to that of the source follower circuit 360.

As described above, in the first modification of the first embodiment of the present technology, the switching circuit 340 disconnects the source follower circuits from the vertical signal lines in the case where the detection of an edge is not performed, and is hence able to reduce the power consumption through interruption of the electric current to the source follower circuits.

[Second Modification]

While, in the above-described first modification of the first embodiment, the pixel signals are amplified or attenuated by the source follower circuit 360 and so on, circuits other than the source follower circuits may alternatively be used to amplify or attenuate the pixel signals. A second modification of the first embodiment is different from the first modification of the first embodiment in that amplifier circuits are used to amplify or attenuate the pixel signals.

Figure 13:
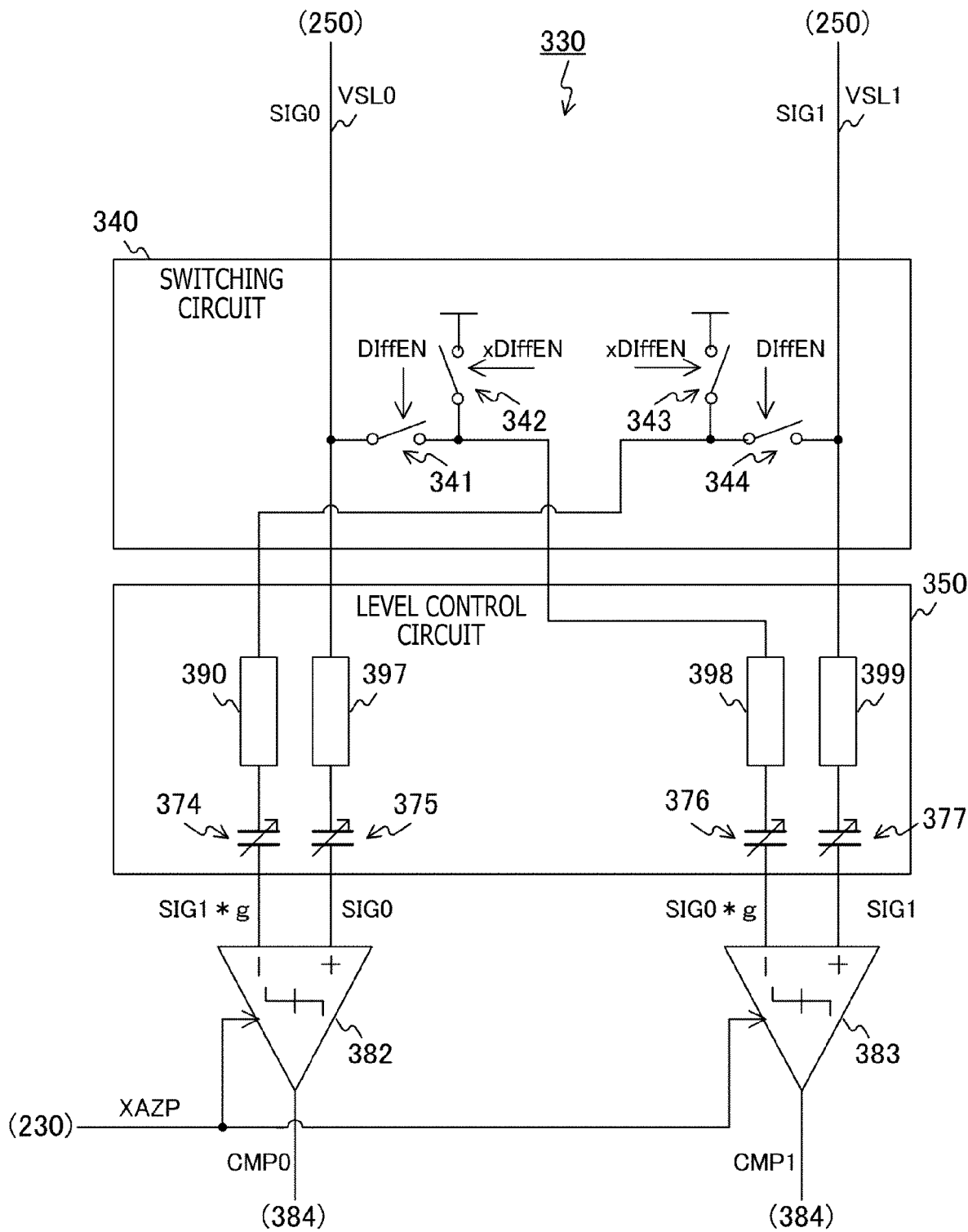
FIG. 13 is a circuit diagram illustrating an example configuration of an edge detection section according to a second modification of the first embodiment of the present technology.

FIG. 13 is a circuit diagram illustrating an example configuration of an edge detection section 330 according to the second modification of the first embodiment of the present technology. The edge detection section 330 according to the first embodiment is different from that according to the first modification of the first embodiment in that amplifier circuits 390, 397, 398, and 399 are disposed in place of the source follower circuits 360, 372, 373, and 374.

Each of the amplifier circuits 390, 397, 398, and 399 amplifies or attenuates the signal level of a pixel signal by a gain. Note that the amplifier circuit 390 and the like are inserted in both of the vertical signal lines VSL0 and VSL1, but may alternatively be inserted in only one of the vertical signal lines VSL0 and VSL1.

Figure 14:
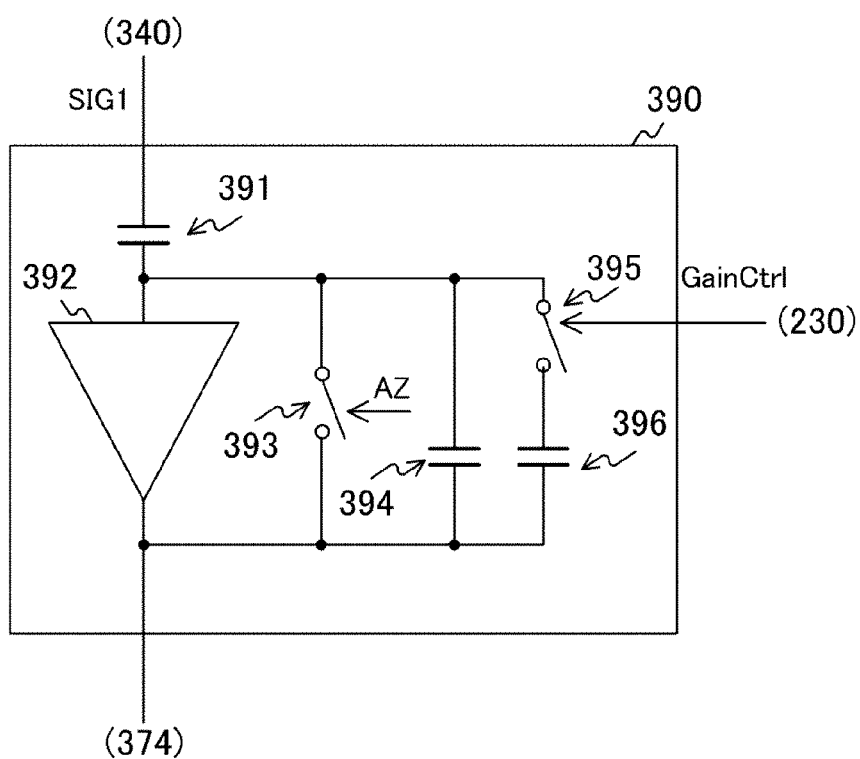
FIG. 14 is a circuit diagram illustrating an example configuration of an amplifier circuit according to the second modification of the first embodiment of the present technology.

FIG. 14 is a circuit diagram illustrating an example configuration of the amplifier circuit 390 according to the second modification of the first embodiment of the present technology. The amplifier circuit 390 according to the second modification of the first embodiment includes capacitors 391, 394, and 396, an amplifier 392, an auto zero switch 393, and a control switch 395.

The capacitor 391 is inserted between the switching circuit 340 and an input terminal of the amplifier 392. An output terminal of the amplifier 392 is connected to the variable capacitor 374.

The auto zero switch 393 makes a short circuit between the input terminal and the output terminal of the amplifier 392 according to an auto zero signal AZ from the timing control circuit 230.

The capacitor 394 is inserted in parallel with the amplifier 392. The control switch 395 opens and closes a path between the input terminal of the amplifier 392 and the capacitor 396 according to a control signal GainCtrl from the timing control circuit 230. The capacitor 396 is inserted between the control switch 395 and the output terminal of the amplifier 392.

With the configuration illustrated in this figure, the amplifier circuit 390 is able to amplify or attenuate the pixel signal by a predetermined gain. In addition, the gain can be varied using the control signal GainCtrl.

Note that the configuration of each of the amplifier circuits 397, 398, and 399 is similar to that of the amplifier circuit 390.

As described above, in the second modification of the first embodiment of the present technology, it is possible to adjust the gain for the pixel signal owing to the provision of the amplifier circuit 390 which amplifies the pixel signal by a gain corresponding to the control signal GainCtrl.

2. Second Embodiment

In the above-described first embodiment, the comparators 382 and 383, which compare a pair of pixel signals with each other, are disposed outside of the ADCs, but this configuration has a disadvantage in that, as the number of pixels increases, a greater number of comparators are required, resulting in an increase in circuit size. A solid-state imaging device 200 according to this second embodiment is different from that according to the first embodiment in that comparators in ADCs are used to compare a pair of pixel signals with each other.

Figure 15:
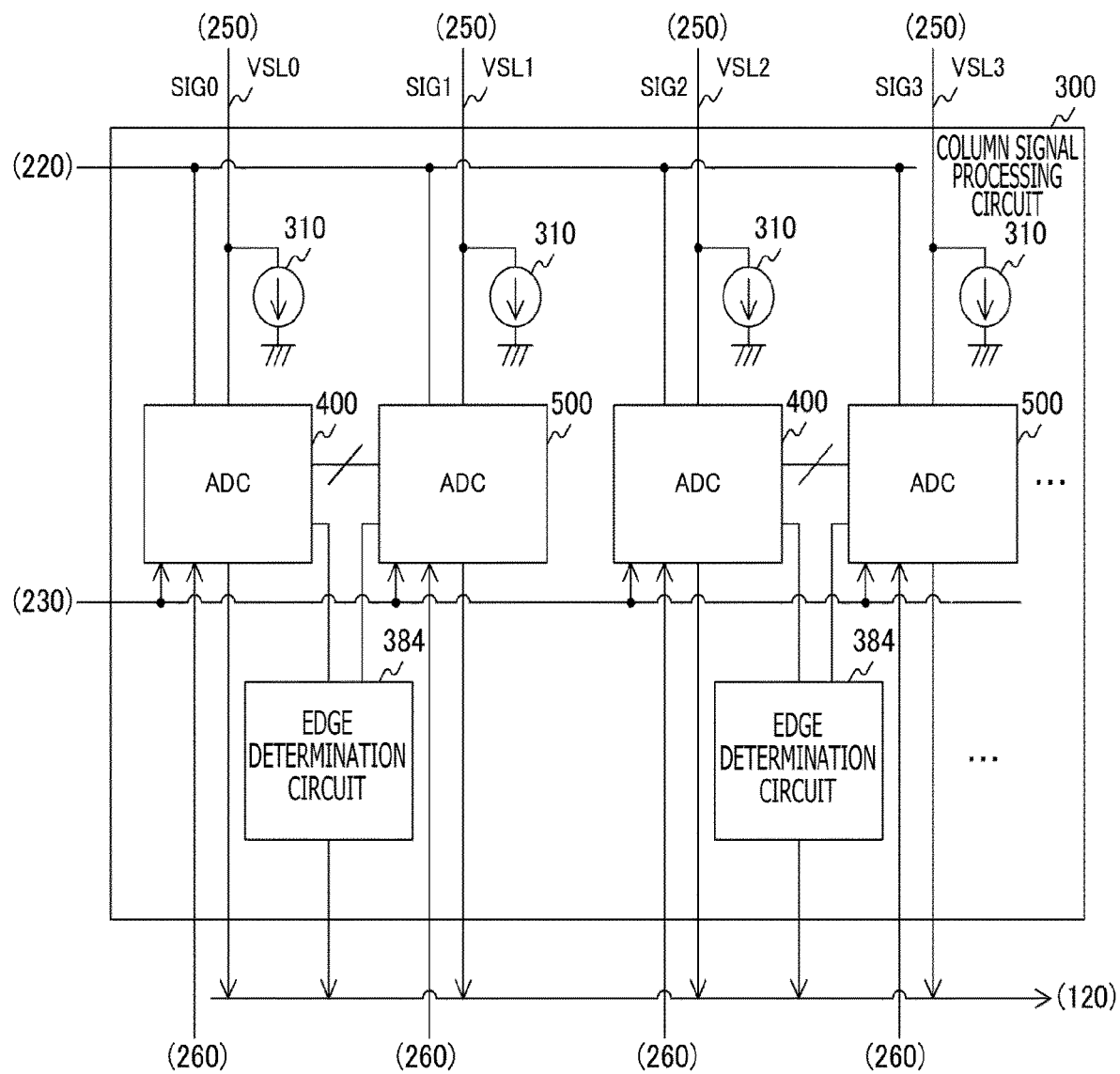
FIG. 15 is a block diagram illustrating an example configuration of a column signal processing circuit according to a second embodiment of the present technology.

FIG. 15 is a block diagram illustrating an example configuration of a column signal processing circuit 300 according to the second embodiment of the present technology. In the column signal processing circuit 300 according to the second embodiment, ADCs 400 and 500 are provided in place of the ADCs 320. One of a pair of pixel signals with respect to which detection of an edge is performed is inputted to the ADC 400, while another one of the pixel signals is inputted to the ADC 500. In addition, a separate edge determination circuit 384 is provided for each of pairs of ADCs 400 and 500.

In the imaging mode, each of the ADCs 400 and 500 subjects corresponding pixel signals to AD conversion. On the other hand, in the edge detection mode, a comparator in each of the ADCs 400 and 500 compares a pair of pixel signals with one of the pixel signals amplified or attenuated with each other, and supplies a result of the comparison to the edge determination circuit 384. That is, the comparator which is used for the AD conversion is used also to compare the pixel signals with respect to which the detection of an edge is performed with each other.

Figure 16:
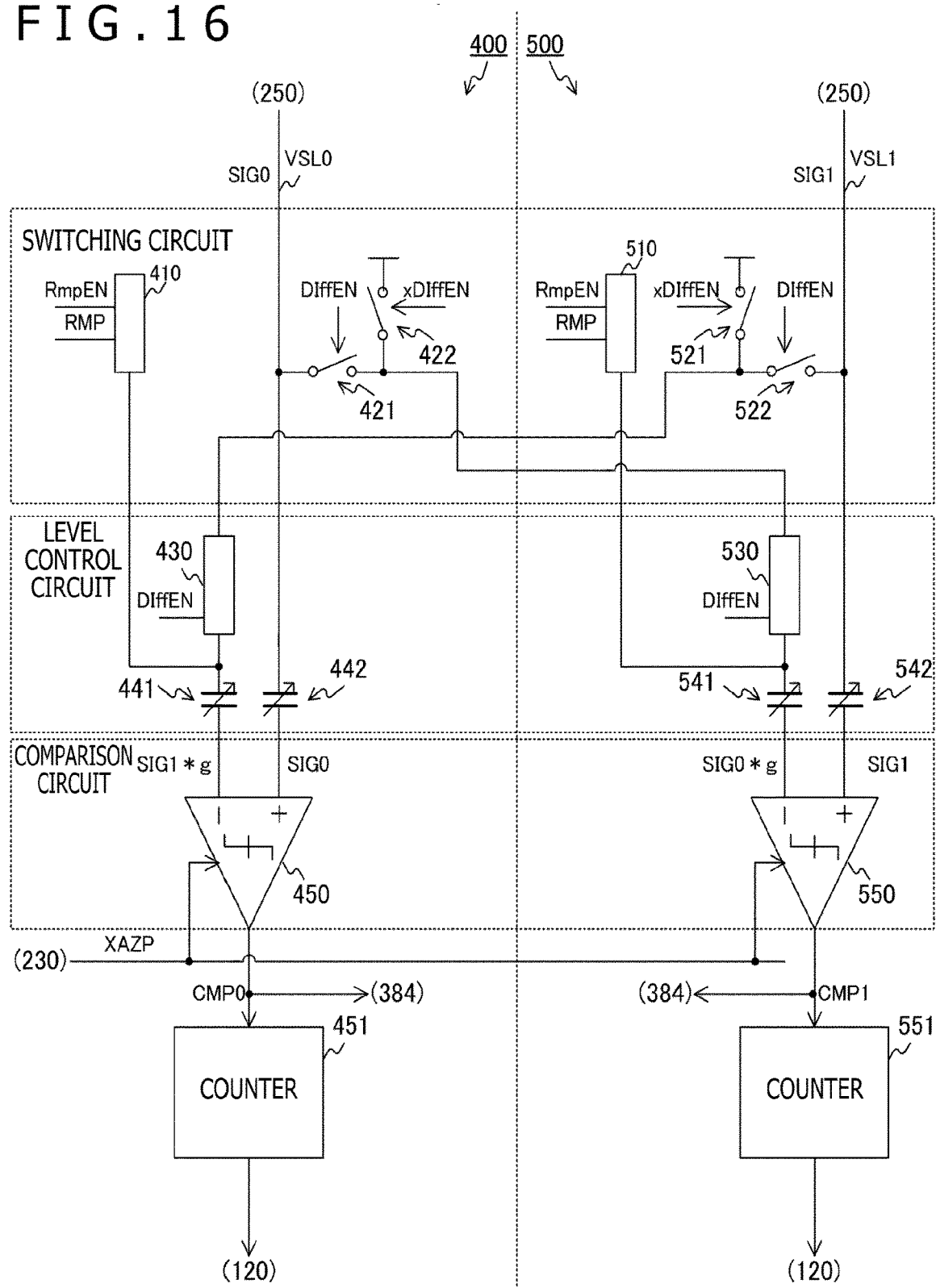
FIG. 16 is a circuit diagram illustrating example configurations of ADCs according to the second embodiment of the present technology.

FIG. 16 is a circuit diagram illustrating example configurations of the ADCs 400 and 500 according to the second embodiment of the present technology. The ADC 400 includes a ramp input switch 410, enable switches 421 and 422, a source follower circuit 430, variable capacitors 441 and 442, a comparator 450, and a counter 451. The ADC 500 includes a ramp input switch 510, enable switches 521 and 522, a source follower circuit 530, variable capacitors 541 and 542, a comparator 550, and a counter 551.

The ramp input switch 410 outputs a reference signal RMP to an inverting input terminal (−) of the comparator 450 through the variable capacitor 441, according to an enable signal RmpEN from the timing control circuit 230. For example, in the imaging mode, the timing control circuit 230 sets the enable signal RmpEN to "enable" to cause the reference signal RMP to be outputted. On the other hand, in the edge detection mode, the enable signal RmpEN is set to "disable," so that the reference signal RMP is not outputted. The ramp input switch 510 outputs the reference signal RMP to an inverting input terminal (−) of the comparator 550 through the variable capacitor 541 according to the enable signal RmpEN.

The enable switch 421 opens and closes a path between the vertical signal line VSL0 and the source follower circuit 530 according to an enable signal DiffEN. The enable switch 422 opens and closes a path between the power supply and the source follower circuit 530 according to an inverted signal xDiffEN. The enable switch 521 opens and closes a path between the power supply and the source follower circuit 430 according to the inverted signal xDiffEN. The enable switch 522 opens and closes a path between the vertical signal line VSL1 and the source follower circuit 430 according to the enable signal DiffEN.

The source follower circuit 430 and the variable capacitor 441 are inserted in series between the enable switch 522 and the inverting input terminal (−) of the comparator 450. The variable capacitor 442 is inserted between the vertical signal line VSL0 and a non-inverting input terminal (+) of the comparator 450. The source follower circuit 530 and the variable capacitor 541 are inserted in series between the enable switch 421 and the inverting input terminal (−) of the comparator 550. The variable capacitor 542 is inserted between the vertical signal line VSL1 and a non-inverting input terminal (+) of the comparator 550.

The comparator 450 outputs a comparison result CMP0 to each of the edge determination circuit 384 and the counter 451. The comparator 550 outputs a comparison result CMP1 to each of the edge determination circuit 384 and the counter 551.

The counter 451 counts a counter value in reference to the comparison result CMP0. For example, the counter value is counted during a period until the comparison result CMP0 is inverted. The counter 451 supplies, as pixel data, a digital signal representing the counter value to the DSP circuit 120. The counter 551 counts a counter value in reference to the comparison result CMP1. The counter 551 supplies, as pixel data, a digital signal representing the counter value to the DSP circuit 120. An ADC that performs AD conversion with use of a comparator and a counter as described above is called a single-slope ADC.

In this figure, the ramp input switches 410 and 510 and the enable switches 421, 422, 521, and 522 together form a switching circuit. In addition, the source follower circuit 430 and the variable capacitors 441 and 442 together form a gain circuit that amplifies or attenuates the pixel signal SIG1, while the source follower circuit 530 and the variable capacitors 541 and 542 together form a gain circuit that amplifies or attenuates the pixel signal SIG0. These gain circuits together form a level control circuit. In addition, the comparators 450 and 550 together form a comparison circuit.

In the edge detection mode, the switching circuit supplies a pair of pixel signals (SIG0 and SIG1) to each of the pair of gain circuits. On the other hand, in the imaging mode, the switching circuit supplies the reference signal RMP and one of the pair of pixel signals to each of the pair of gain circuits. Specifically, in the imaging mode, the reference signal and the pixel signal from the vertical signal line VSL0 are supplied to the gain circuit on the vertical signal line VSL0, while the reference signal and the pixel signal from the vertical signal line VSL1 are supplied to the gain circuit on the vertical signal line VSL1.

In addition, in the edge detection mode, the gain control circuits amplify or attenuate the pixel signal SIG1 by a predetermined gain and supply the resulting pixel signal to the comparator 450 together with the pixel signal SIG0, and amplify or attenuate the pixel signal SIG0 by the gain and supply the resulting pixel signal to the comparator 450 together with the pixel signal SIG1. On the other hand, in the imaging mode, the gain control circuits supply the pixel signal SIG0 and the reference signal RMP as they are to the comparator 450, and supply the pixel signal SIG1 and the reference signal RMP to the comparator 550.

Further, in the edge detection mode, the timing control circuit 230 controls each of the counters 451 and 551 to stop the counting operation thereof. On the other hand, in the imaging mode, the timing control circuit 230 controls each of the counters 451 and 551 to generate the pixel data. Note that, in the case where imaging is also performed in the edge detection mode, each of the counters 451 and 551 performs the counting operation therein.

As illustrated in this figure, using the comparators 450 and 550 in the ADCs also to compare a pair of pixel signals with each other eliminates the need to dispose comparators for comparing the pixel signals with each other outside of the ADCs. This leads to a reduction in circuit size.

Figure 17:
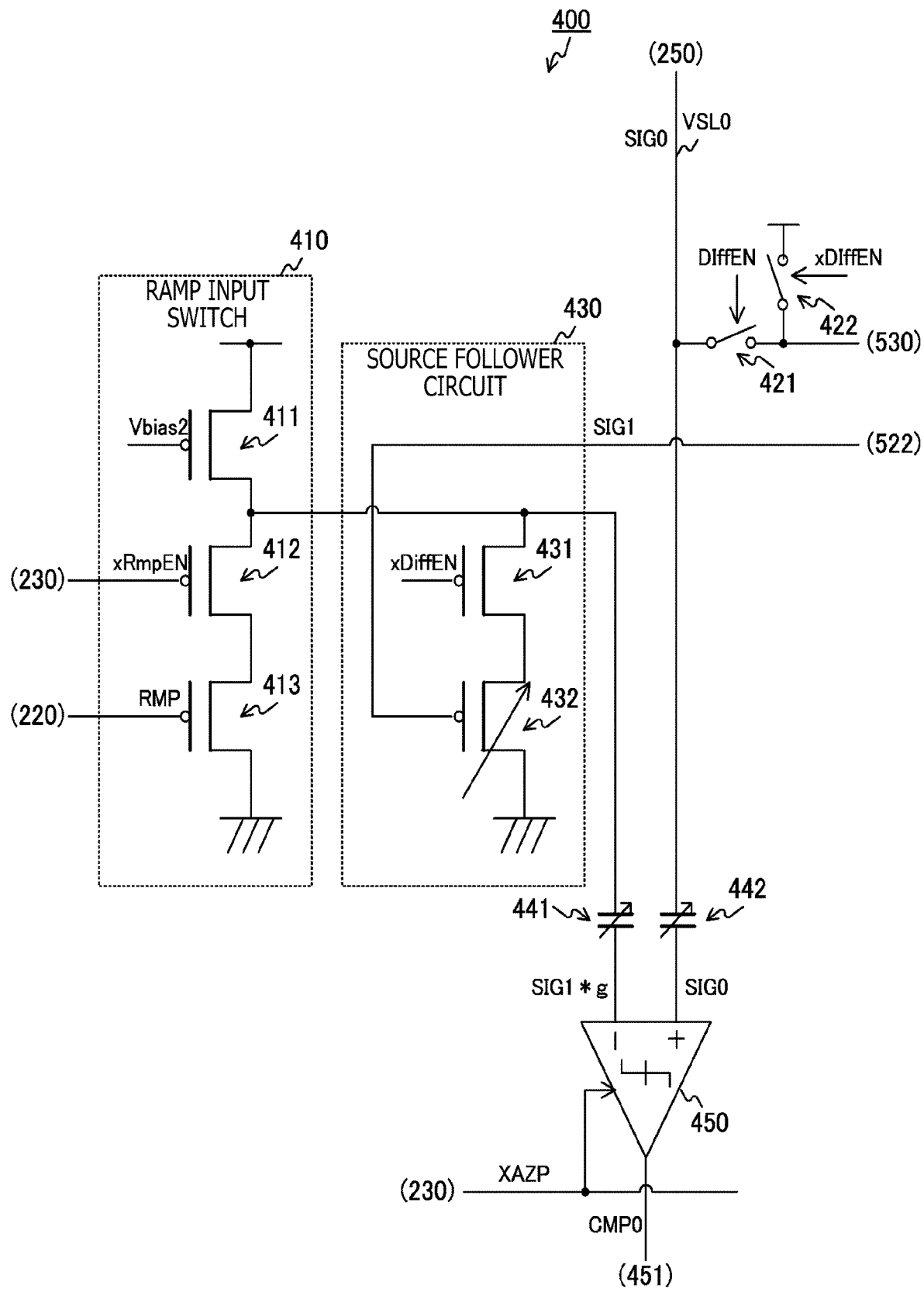
FIG. 17 is a circuit diagram illustrating a ramp input switch and a source follower circuit according to the second embodiment of the present technology.

FIG. 17 is a circuit diagram illustrating the ramp input switch 410 and the source follower circuit 430 according to the second embodiment of the present technology. The ramp input switch 410 includes pMOS transistors 411, 412, and 413. The source follower circuit 430 includes pMOS transistors 431 and 432.

The pMOS transistors 411 to 413 are connected in series between the power supply and a ground terminal. In addition, a predetermined bias voltage Vbias2 is inputted to a gate of the pMOS transistor 411 on the side closer to the power supply. The inverse xRmpEN of the enable signal RmpEN is inputted to a gate of the pMOS transistor 412 that is positioned second from the side closer to the power supply. The reference signal RMP from the DAC 220 is inputted to a gate of the pMOS transistor 413 on the side closer to the ground. In addition, a point of junction of the pMOS transistors 411 and 412 is connected to the variable capacitor 441. Note that an nMOS transistor may be used in place of the pMOS transistor 412, and in this case, the enable signal RmpEN is inputted to a gate thereof.

In addition, the pMOS transistors 431 and 432 are connected in series between a ground terminal and the point of junction of the pMOS transistors 411 and 412. The enable signal DiffEN is inputted to a gate of the pMOS transistor 431 on the side closer to the power supply. A gate of the pMOS transistor 432 on the side closer to the ground is connected to the enable switch 522.

Note that the configurations of the ramp input switch 510 and the source follower circuit 530 are similar to those of the ramp input switch 410 and the source follower circuit 430.

FIG. 18 is a diagram illustrating example settings of the enable signals in the second embodiment of the present technology. In the edge detection mode, the enable signal RmpEN is set to "disable," and the enable signal DiffEN is set to "enable," for example. As a result, the pixel signal SIG0 and the pixel signal SIG1*g are inputted to the comparator 450. Meanwhile, the pixel signal SIG1 and the pixel signal SIG0*g are inputted to the comparator 550. In addition, the comparison results of the comparator 450 and the like are outputted to the edge determination circuit 384. Note that the counter 451 and the like stop the counting operation.

On the other hand, in the imaging mode, the enable signal RmpEN is set to "enable," and the enable signal DiffEN is set to "disable," for example. As a result, the pixel signal SIG0 and the reference signal RMP are inputted to the comparator 450. Meanwhile, the pixel signal SIG1 and the reference signal RMP are inputted to the comparator 550. In addition, the comparison results of the comparator 450 and the like are outputted to the counter 451 and the like. Note that the edge determination circuit 384 is set to the disabled state, and stops the determination operation.

Figure 19:
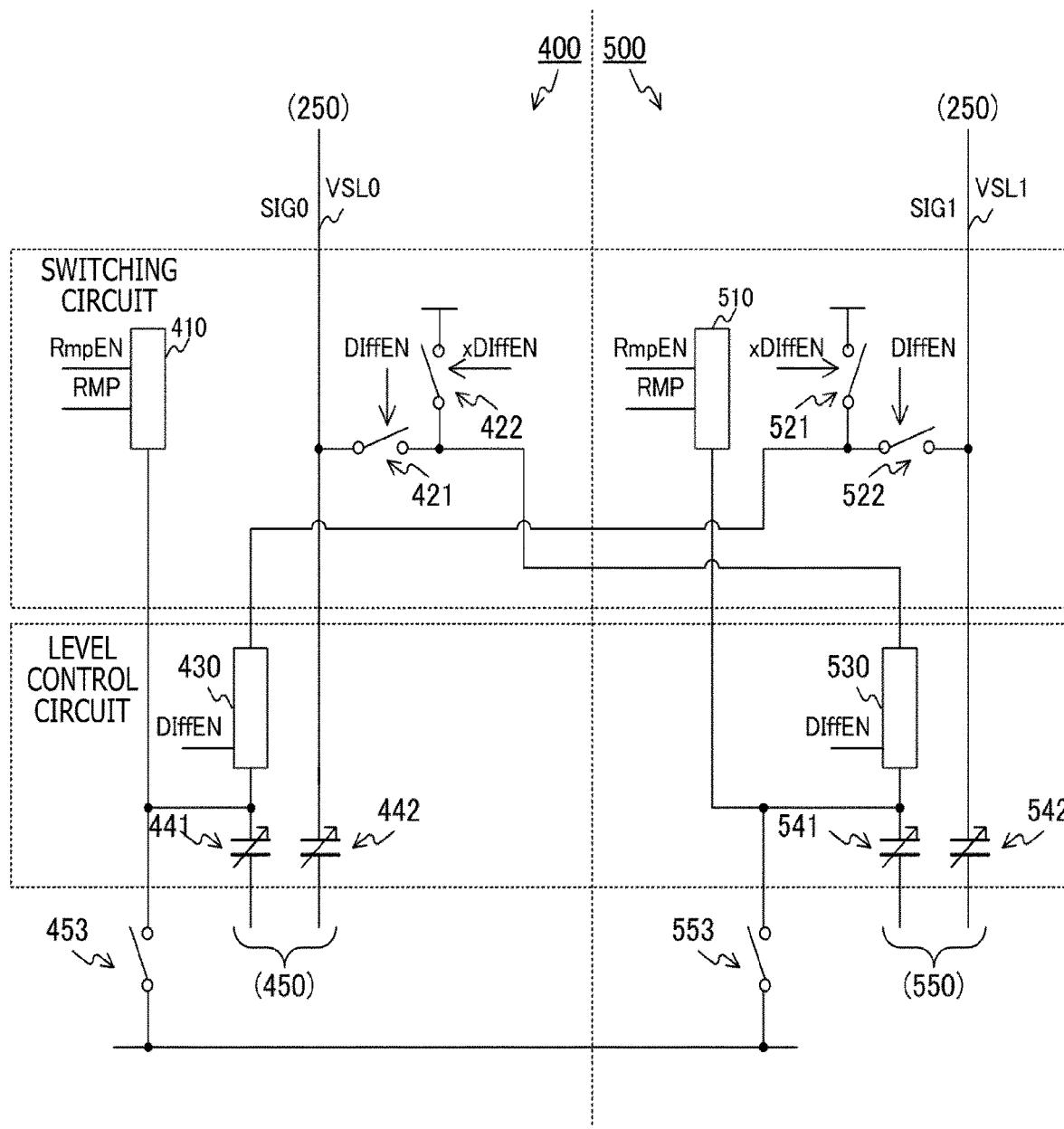
FIG. 19 is a circuit diagram illustrating example configurations of ADCs according to the second embodiment of the present technology with horizontally-connecting switches disposed therein.

Note that, as illustrated in FIG. 19, the ADCs 400 and 500 may additionally be provided with horizontally-connecting switches 453 and 553. In this figure, the horizontally-connecting switch 453 opens and closes a path between a point of junction of the source follower circuit 430 and the variable capacitor 441 and a signal line arranged to extend in the horizontal direction, under the control by the timing control circuit 230. The horizontally-connecting switch 553 opens and closes a path between a point of junction of the source follower circuit 530 and the variable capacitor 541 and the signal line arranged to extend in the horizontal direction, under the control by the timing control circuit 230. Thus horizontally connecting the plurality of ADCs contributes to suppressing noise that occurs in these circuits.

As described above, in the second embodiment of the present technology, the comparators 450 and 550 in the ADCs are used also to compare the pixel signals with each other, and this eliminates the need to dispose comparators for comparing the pixel signals with each other outside of the ADCs. A reduction in circuit size can thus be achieved.

3. Third Embodiment

In the above-described second embodiment, the solid-state imaging device 200 performs the AD conversion by using the single-slope ADCs, but this may involve an insufficient resolution of the amount of gain adjustment. A solid-state imaging device 200 according to this third embodiment is different from that according to the second embodiment in that successive-approximation ADCs are used to perform the AD conversion such that improved fineness of the amount of gain adjustment can be achieved.

Figure 20:
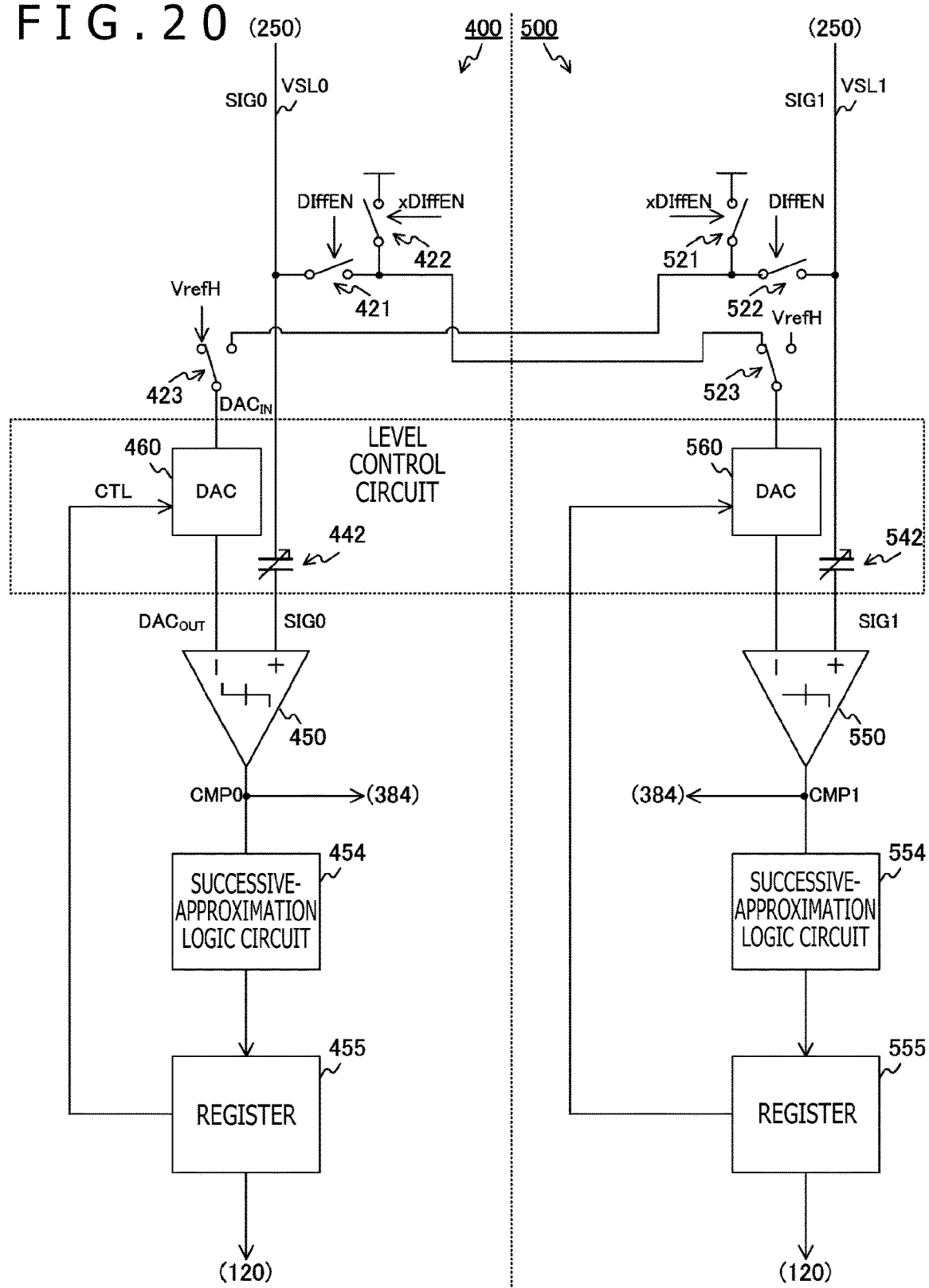
FIG. 20 is a circuit diagram illustrating example configurations of ADCs according to a third embodiment of the present technology.

FIG. 20 is a circuit diagram illustrating example configurations of ADCs 400 and 500 according to the third embodiment of the present technology. The ADC 400 according to this third embodiment is different from that according to the second embodiment in including a selector 423, a DAC 460, a successive-approximation logic circuit 454, and a register 455 in place of the counter 451. Meanwhile, the ADC 500 according to the third embodiment is different from that according to the second embodiment in including a selector 523, a DAC 560, a successive-approximation logic circuit 554, and a register 555 in place of the counter 551. In addition, the variable capacitors 441 and 541 are not inserted.

The selector 423 selects one of a predetermined reference voltage Vref and the pixel signal SIG1 and supplies the selected reference voltage Vref or pixel signal SIG1 to the DAC 460, under the control by the timing control circuit 230. The selector 523 selects one of the reference voltage Vref and the pixel signal SIG0 and supplies, as an input signal $DAC_{IN}$, the selected reference voltage Vref or pixel signal SIG0 to the DAC 560, under the control by the timing control circuit 230. For example, the pixel signal is selected in the edge detection mode, while the reference voltage Vref is selected in the imaging mode.

The DAC 460 generates a reference signal $DAC_{OUT}$, and supplies the reference signal $DAC_{OUT}$ to an inverting input terminal (−) of a comparator 450. In an initial state, the level of the reference signal $DAC_{OUT}$ is set to a value obtained by amplifying or attenuating the input signal $DAC_{IN}$ (i.e., the reference voltage VrefH or the pixel signal SIG1) from the selector 423 by a gain. Then, the DAC 460 updates the reference signal $DAC_{OUT}$ according to a control signal CTL from the register 455.

The comparator 450 compares the reference signal $DAC_{OUT}$ from the DAC 460 with the pixel signal SIG0. Then, the comparator 450 supplies a comparison result CMP0 to each of the edge determination circuit 384 and the successive-approximation logic circuit 454.

The successive-approximation logic circuit 454 obtains a value of the reference signal $DAC_{OUT}$ that approximates the pixel signal SIG0, in reference to the comparison result of the comparator 450, and generates a control signal CTL for updating the reference signal $DAC_{OUT}$ to that value. The successive-approximation logic circuit 454 causes the register 455 to hold the control signal CTL and a digital signal in which comparison results are arranged. The register 455 outputs the control signal CTL to the DAC 460. In addition, the register 455 outputs, as pixel data, the digital signal to the DSP circuit 120.

The configurations of the selector 523, the successive-approximation logic circuit 554, and the register 555 are similar to those of the selector 423, the successive-approximation logic circuit 454, and the register 455, respectively.

An ADC that performs successive approximation as illustrated in this figure is called a SARADC (Successive Approximation Register Analog to Digital Converter). An improved resolution of the amount of gain adjustment can be achieved using SARADCs.

Figure 21:
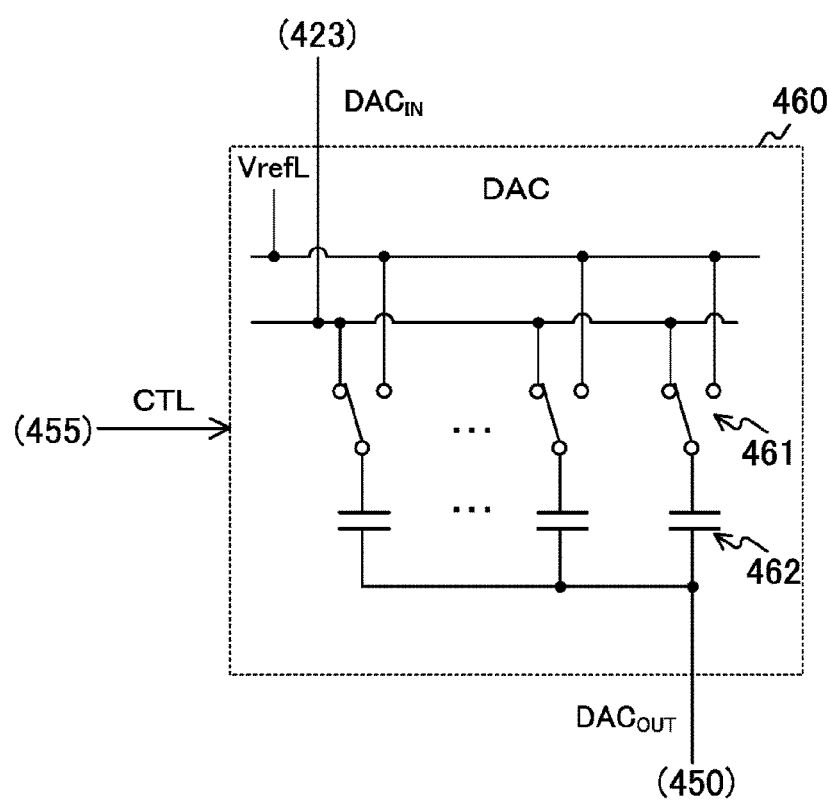
FIG. 21 is a circuit diagram illustrating an example configuration of a DAC (Digital to Analog Converter) according to the third embodiment of the present technology.

FIG. 21 is a circuit diagram illustrating an example configuration of the DAC 460 according to the third embodiment of the present technology. The DAC 460 includes a plurality of selectors 461 and a plurality of capacitors 462. Each capacitor 462 is disposed for a separate one of the selectors 461.

The selector 461 connects one of the input signal $DAC_{IN}$ and VrefL, which is lower than the reference voltage VrefH, to the capacitor 462 according to the control signal CTL from the register 455. The capacitors 462 are connected in parallel between the corresponding selectors 461 and the comparator 450.

By the configuration illustrated in this figure, the input signal $DAC_{IN}$ (i.e., the reference voltage VrefH or the pixel signal SIG1) is amplified or attenuated by a predetermined gain.

As described above, in the third embodiment of the present technology, the solid-state imaging device 200 performs the AD conversion by using SARADCs, and is thus able to achieve a higher resolution of the amount of gain adjustment for the input signal than in the case where single-slope ADCs are used.

4. Fourth Embodiment

In the above-described third embodiment, the timing control circuit 230 initializes each of the comparators 450 and 550 by using the inverted signal XAZP, i.e., the inverse of the auto zero signal. This configuration, however, may cause an error due to noise in the case where a difference between the signals that are compared by the comparator 450 or the like is slight. Comparators according to this fourth embodiment are different from those according to the second embodiment in that the positive and negative sides are initialized at different timings to suppress errors.

Figure 22:
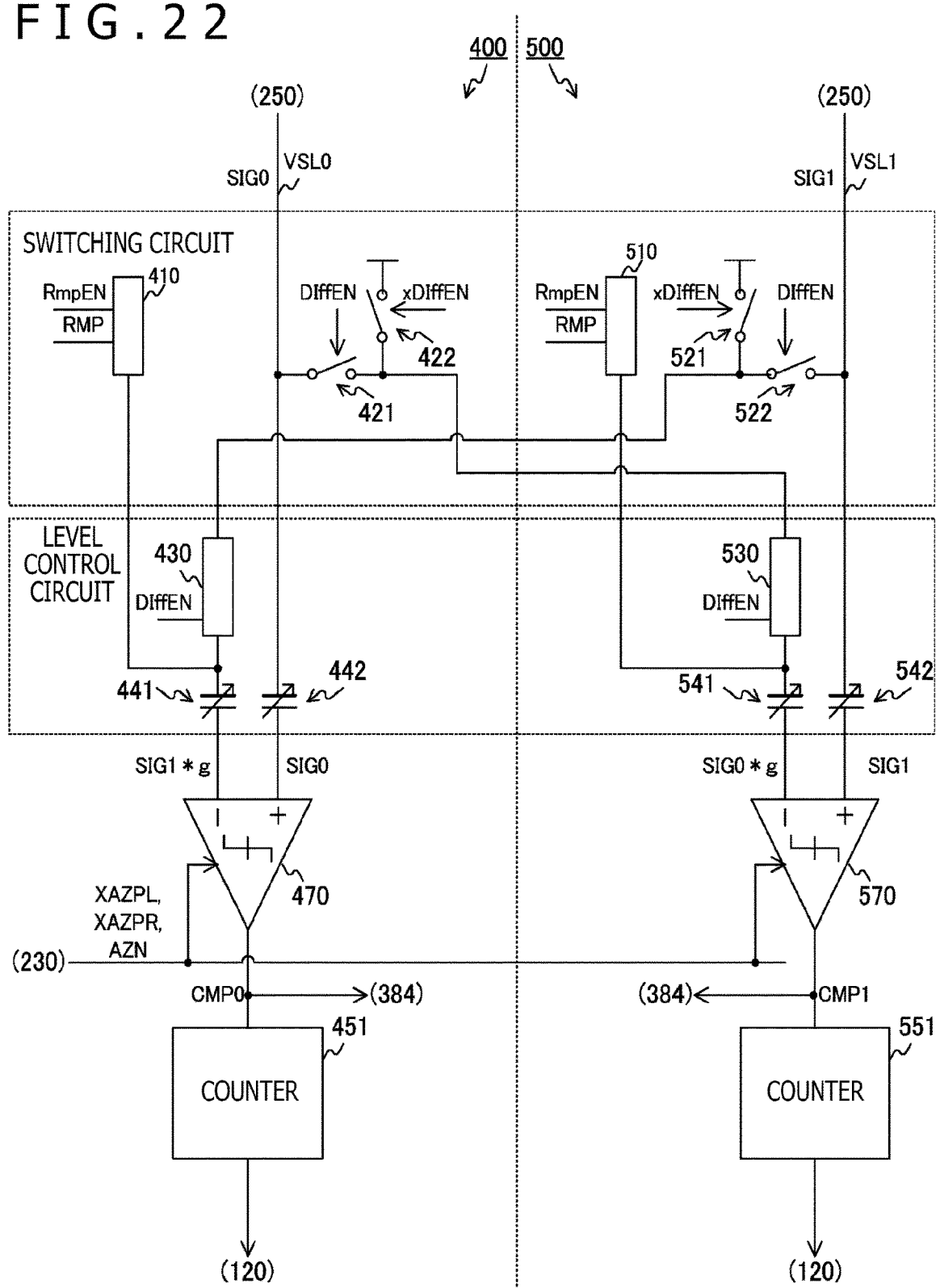
FIG. 22 is a circuit diagram illustrating example configurations of ADCs according to a fourth embodiment of the present technology.

FIG. 22 is a circuit diagram illustrating example configurations of ADCs 400 and 500 according to the fourth embodiment of the present technology. The ADCs 400 and 500 according to this fourth embodiment are different from those according to the third embodiment in that comparators 470 and 570 are provided in place of the comparators 450 and 550. To each of the comparators 470 and 570, an auto zero signal AZN and inverted signals XAZPL and XAZPR are inputted from the timing control circuit 230. Here, the inverted signal XAZPL is the inverse of an auto zero signal AZPL, while the inverted signal XAZPR is the inverse of an auto zero signal AZPR.

Figure 23:
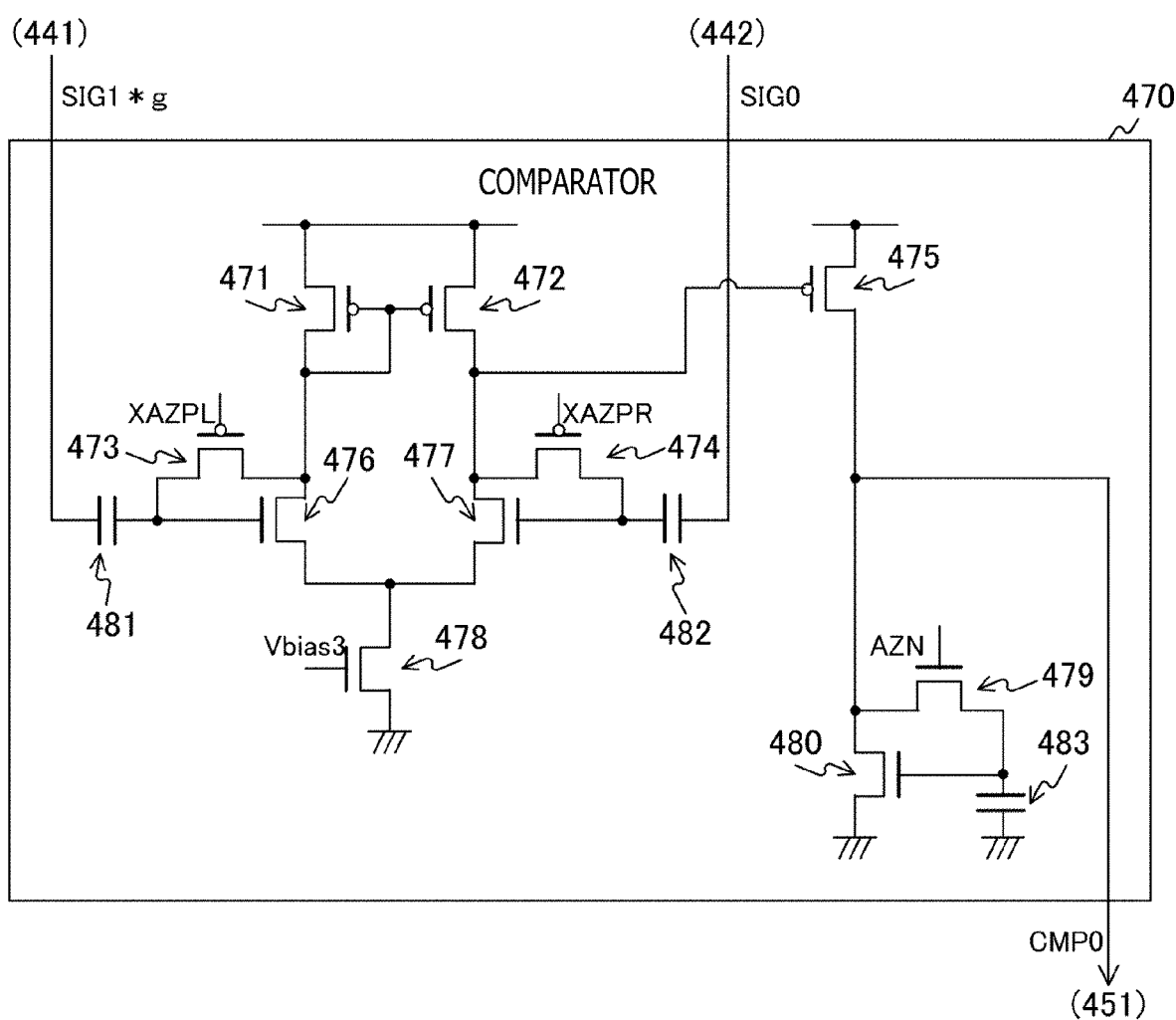
FIG. 23 is a circuit diagram illustrating an example configuration of a comparator according to the fourth embodiment of the present technology.

FIG. 23 is a circuit diagram illustrating an example configuration of the comparator 470 according to the fourth embodiment of the present technology. The comparator 470 includes pMOS transistors 471, 472, 473, 474, and 475, nMOS transistors 476, 477, 478, 479, and 480, and capacitors 481, 482, and 483.

The pMOS transistors 471, 472, and 475 are connected in parallel to the power supply. A gate of the pMOS transistor 471 is connected to a drain thereof and a gate of the pMOS transistor 472.

A drain of the nMOS transistor 476 is connected to the pMOS transistor 471, and a source of the nMOS transistor 476 is connected to a common node. In addition, a gate of the nMOS transistor 476 is connected to the variable capacitor 441 through the capacitor 481. A drain of the nMOS transistor 477 is connected to the pMOS transistor 472, and a source of the nMOS transistor 477 is connected to the common node. In addition, a gate of the nMOS transistor 477 is connected to the variable capacitor 442 through the capacitor 482.

The nMOS transistor 478 is inserted between the common node and a ground terminal, and a predetermined bias voltage Vbias3 is inputted to a gate of the nMOS transistor 478.

The pMOS transistor 473 makes a short circuit between the drain and the source of the nMOS transistor 476 when the inverted signal XAZPL is at a high level. The pMOS transistor 474 makes a short circuit between the drain and the source of the nMOS transistor 477 when the inverted signal XAZPR is at a high level. Note that the pMOS transistor 473 is an example of a first transistor recited in the appended claims, while the pMOS transistor 474 is an example of a second transistor recited in the appended claims.

A point of junction of the pMOS transistor 472 and the nMOS transistor 477 is connected to a gate of the pMOS transistor 475.

The nMOS transistor 480 is inserted between the pMOS transistor 475 and a ground terminal. A comparison result CMP0 is outputted from a point of junction of the pMOS transistor 475 and the nMOS transistor 480. The nMOS transistor 479 and the capacitor 483 are connected in series between a ground terminal and the point of junction of the pMOS transistor 475 and the nMOS transistor 480. In addition, the auto zero signal AZN is inputted to a gate of the nMOS transistor 479, and a point of junction of the nMOS transistor 479 and the capacitor 483 is connected to a gate of the nMOS transistor 480.

With the circuit illustrated in this figure, the comparator 470 compares the pixel signal SIG1*g with the pixel signal SIG0. In addition, the timing control circuit 230 makes the input timing of the auto zero signal AZPL, which is used to initialize one of the positive and negative sides, different from the input timing of the auto zero signal AZPR, which is used to initialize the other side. An offset of the comparator 470 can be adjusted by making the input timing of the auto zero signal AZPL different from the input timing of the auto zero signal AZPR as described above.

Note that the configuration of the comparator 570 is similar to that of the comparator 470. Note that the second embodiment or the third embodiment can also be applied to the fourth embodiment.

As described above, in the fourth embodiment of the present technology, the timings of the auto zero signals on the positive and negative sides are made different from each other in each of the comparators 450 and 550, and hence, the offset of the comparator 450 can be adjusted.

5. Fifth Embodiment

In the above-described second embodiment, each of the comparators 450 and 550 compares the pixel signals with each other without holding the pixel signals, but this configuration does not allow detection of an edge between different frames or between two pixels arranged in a column direction. A solid-state imaging device 200 according to this fourth embodiment is different from that according to the second embodiment in that sample and hold circuits for holding pixel signals are additionally provided to enable detection of an edge between different frames or between two pixels arranged in the column direction.

Figure 24:
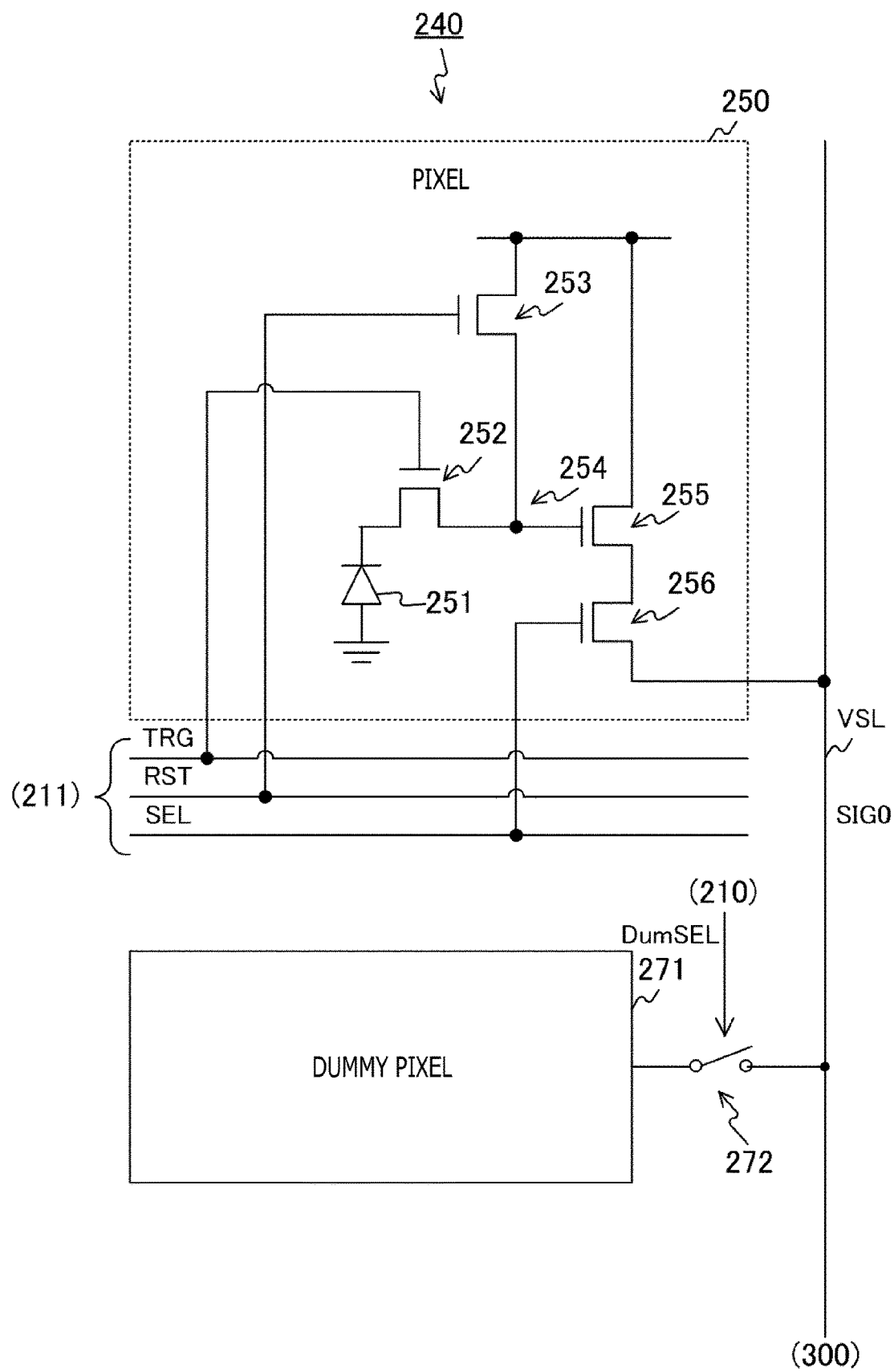
FIG. 24 is a diagram illustrating an example configuration of a pixel array section according to a fifth embodiment of the present technology.

FIG. 24 is a diagram illustrating an example configuration of a pixel array section 240 according to the fifth embodiment of the present technology. The pixel array section 240 according to the fifth embodiment is different from that according to the second embodiment in that a dummy pixel 271 and a dummy connection switch 272 are additionally disposed for each column.

The dummy pixel 271 supplies a dummy signal in which a predetermined fixed value is set. The dummy connection switch 272 makes connection between the dummy pixel 271 and the vertical signal line VSL according to a dummy connection signal DumSEL from the vertical scanning circuit 210.

Figure 25:
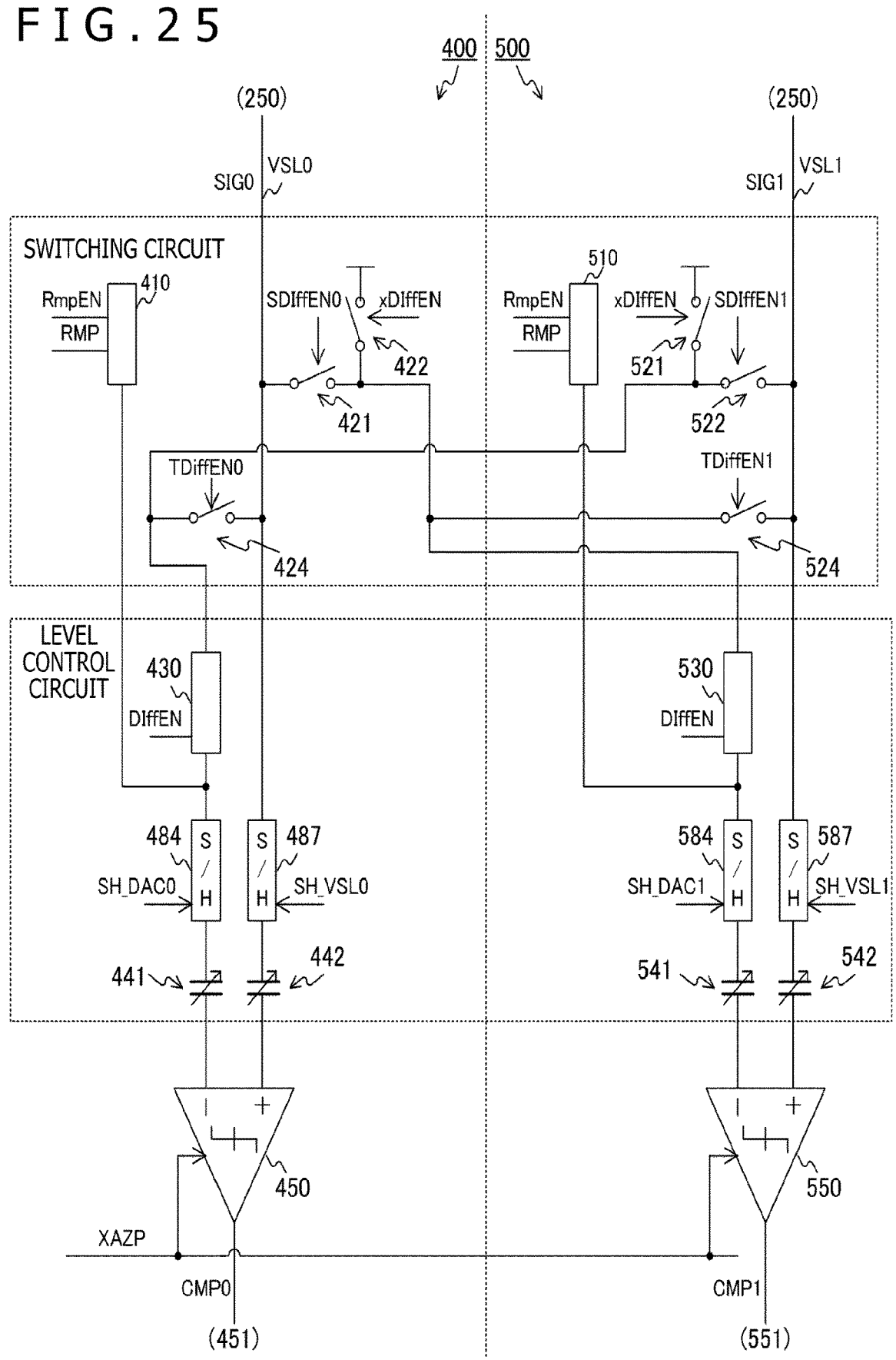
FIG. 25 is a circuit diagram illustrating example configurations of ADCs according to the fifth embodiment of the present technology.

FIG. 25 is a circuit diagram illustrating example configurations of ADCs 400 and 500 according to the fifth embodiment of the present technology. The ADCs 400 and 500 according to this fifth embodiment are different from those according to the second embodiment in that sample and hold circuits 484, 487, 584, and 587 and enable switches 424 and 524 are additionally provided. In addition, in place of the enable signal DiffEN, an enable signal SDiffEN is inputted to each of the enable switches 421 and 521.

The sample and hold circuit 484 samples and holds one of a reference signal and an amplified pixel signal according to a control signal SH_DAC0 from the timing control circuit 230. The sample and hold circuit 487 samples and holds a pixel signal according to a control signal SH_VSL0 from the timing control circuit 230. The sample and hold circuit 484 is inserted between the source follower circuit 430 and the variable capacitor 441, while the sample and hold circuit 487 is inserted between the vertical signal line VSL0 and the variable capacitor 442.

Note that the sample and hold circuit 484 is an example of a first sample and hold circuit recited in the appended claims, while the sample and hold circuit 487 is an example of a second sample and hold circuit recited in the appended claims.

The sample and hold circuit 584 samples and holds one of a reference signal and an amplified pixel signal according to a control signal SH_DAC1 from the timing control circuit 230. The sample and hold circuit 587 samples and holds a pixel signal according to a control signal SH_VSL1 from the timing control circuit 230. The sample and hold circuit 584 is inserted between the source follower circuit 530 and the variable capacitor 541, while the sample and hold circuit 587 is inserted between the vertical signal line VSL1 and the variable capacitor 542.

Note that the sample and hold circuit 584 is an example of a third sample and hold circuit recited in the appended claims, while the sample and hold circuit 587 is an example of a fourth sample and hold circuit recited in the appended claims.

The enable switch 424 opens and closes a path between the vertical signal line VSL0 and the source follower circuit 430 according to an enable signal TDiffEN0 from the timing control circuit 230. The enable switch 524 opens and closes a path between the vertical signal line VSL1 and the source follower circuit 530 according to an enable signal TDiffEN1 from the timing control circuit 230.

Note that amplifier circuits may be provided in place of the source follower circuits 430 and 530.

The timing control circuit 230 is capable of controlling the sample and hold circuit 484 and the like to hold pixel signals of different frames. For example, the timing control circuit 230 is capable of causing a pixel signal of a frame F0 and a pixel signal of the next frame F1 to be held. This enables the edge determination circuit 384 in a subsequent stage to detect an edge from the pixel signals of the different frames. In this case, however, an analog CDS process cannot be performed, and it is hence necessary to use dummy signals as input signals at the time of auto-zeroing of the comparator 450 and the like.

In the edge detection in the space direction in each of the first to fourth embodiments, an offset between two pixels is eliminated by analog CDS. Incidentally, input offsets of the comparator 450 and the like can be eliminated in each of the edge detection in the space direction and the edge detection in the time direction. In the case of the time direction as in the fifth embodiment, signals of the same pixel are read out, and hence, variations of pixel amplifiers (e.g., amplification transistors, etc.) are the same with respect to both the frame F0 and the frame F1, and, therefore, do not produce a significant effect.

Note that the solid-state imaging device 200 is capable of performing the edge detection in the space direction as well as the edge detection in the time direction. When the edge detection in the space direction is performed, detection of an edge between two pixels arranged in the row direction can be performed as in each of the first to fourth embodiments, and detection of an edge between two pixels arranged in the column direction can also be performed. In the case where the detection of an edge between two pixels arranged in the column direction is performed, the timing control circuit 230, for example, is only required to cause the sample and hold circuit 484 or the like to hold the pixel signal of one of the two pixels, and cause the sample and hold circuit 487 or the like to hold the pixel signal of the other one of the two pixels.

Figure 26:
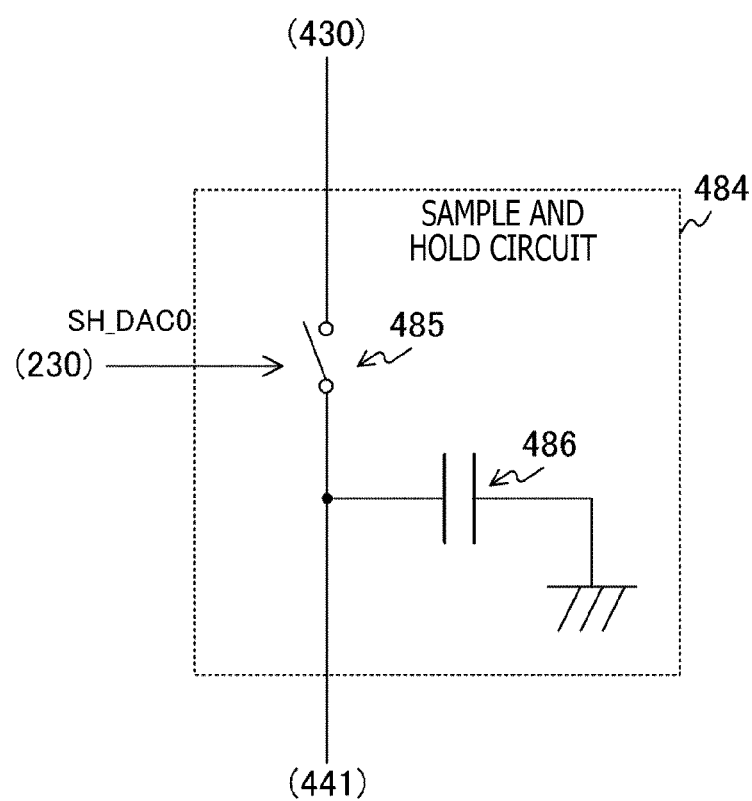
FIG. 26 is a circuit diagram illustrating an example configuration of a sample and hold circuit according to the fifth embodiment of the present technology.

FIG. 26 is a circuit diagram illustrating an example configuration of the sample and hold circuit 484 according to the fifth embodiment of the present technology. The sample and hold circuit 484 includes a sample switch 485 and a capacitor 486.

The sample switch 485 is inserted between the source follower circuit 430 and the variable capacitor 441. The capacitor 486 is inserted between a ground terminal and a point of junction of the sample switch 485 and the variable capacitor 441.

The sample switch 485 causes the signal from the source follower circuit 430 to be sampled and held in the capacitor 486 according to the control signal SH_DAC0.

Note that the configuration of each of the sample and hold circuits 487, 584, and 587 is similar to that of the sample and hold circuit 484.

Figure 27:
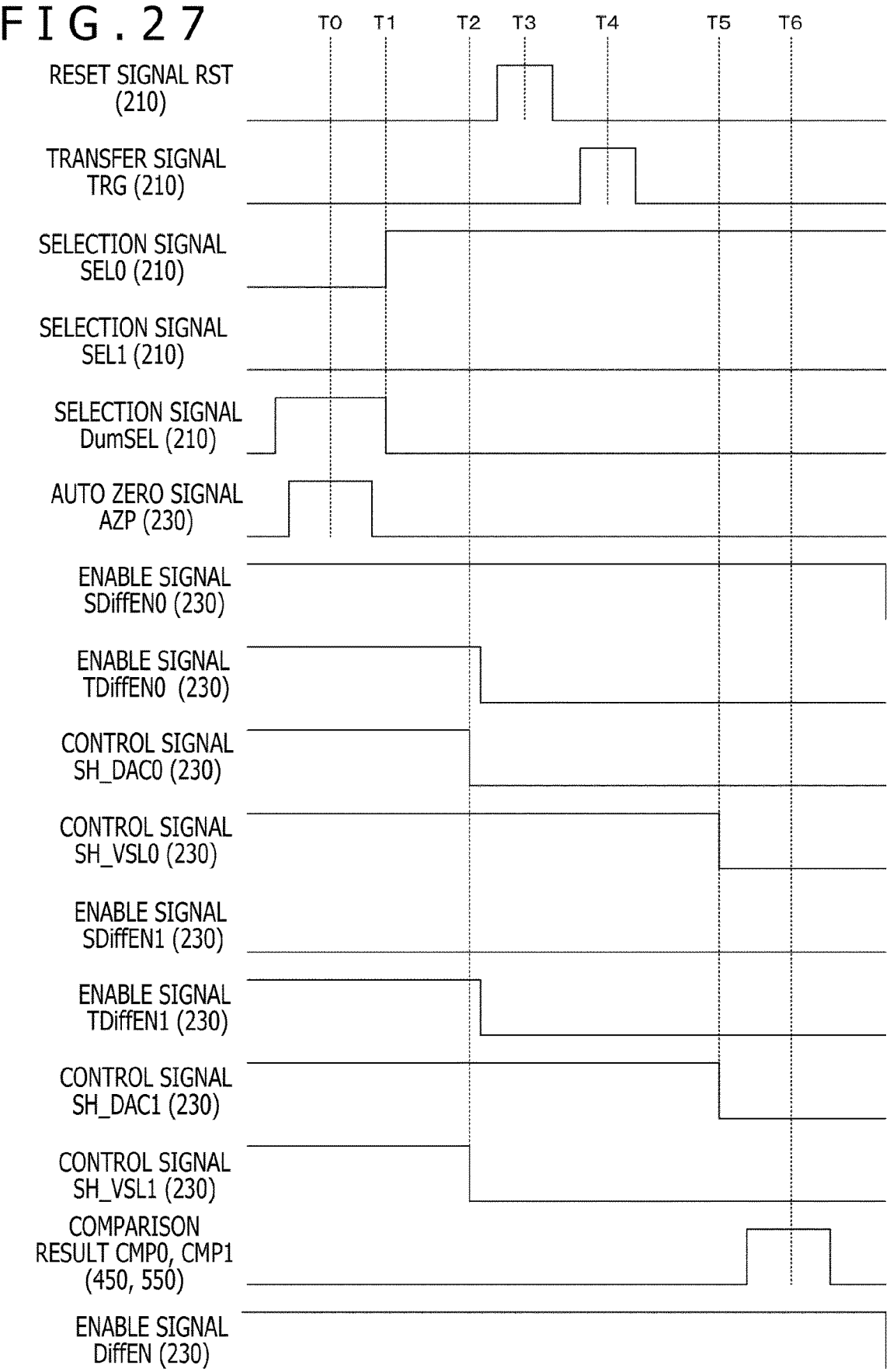
FIG. 27 is a flowchart illustrating an example operation of a solid-state imaging device according to the fifth embodiment of the present technology.

FIG. 27 is a flowchart illustrating an example operation of the solid-state imaging device 200 according to the fifth embodiment of the present technology. First, at a timing T0, the vertical scanning circuit 210 supplies the dummy connection signal DumSEL to connect the dummy pixel 271 to the vertical signal line. In addition, the timing control circuit 230 supplies the auto zero signal AZP to initialize the comparator 450 and the like.

Then, at a timing T1, the vertical scanning circuit 210 supplies a high-level selection signal SEL0. At this time, a pixel signal of the frame F0 is inputted to one of the input terminals of each of the comparators 450 and 550. At this time, it is unknown which of signals of the frame F0 and the next frame F1 is the greater. Therefore, for example, in the comparator 450 on the left side, the pixel signal is inputted to the inverting input terminal (−) on the side of the DAC 220, i.e., on the side on which the application of the gain is made, whereas in the comparator 550 on the right side, the pixel signal is inputted to the non-inverting input terminal (+) on the side on which the application of the gain is not made.

Specifically, the timing control circuit 230 continues supplying a high-level control signal SH_DAC0 and a high-level control signal SH_VSL1 during a period until a timing T2, which is after the timing T1. In addition, high-level enable signals TDiffEN0 and TDiffEN1 are continuously supplied during a period until the timing T2 has just passed. As a result, the pixel signal is sampled and held at the timing T2.

Incidentally, in the timing diagram of this figure, the pixel signal of the frame F0 is inputted to every input, and therefore, each of the control signal SH_DAC0 and the control signal SH_VSL1 may be set to a low level after auto-zeroing and then be set to a high level.

Then, at a timing T3, the vertical scanning circuit 210 supplies the reset signal RST to reset the floating diffusion layer. Then, at a timing T4, the vertical scanning circuit 210 supplies the transfer signal TRG to cause an electric charge to be transferred from the photoelectric conversion element to the floating diffusion layer.

Then, at a timing T5, a pixel signal of the frame F1 is inputted to the non-inverting input terminal (+) on the VSL side of the comparator 450 on the left side, and is inputted to the inverting input terminal (−) on the DAC side of the comparator 550 on the right side. Specifically, the timing control circuit 230 continues to supply a high-level control signal SH_VSL0 and a high-level control signal SH_DAC1 during a period until the timing T5.

Then, at a timing T6, the comparators 450 and 550 supply the comparison results CMP0 and CMP1, respectively. In the single-slope ADCs 400 and 500, the analog comparators 450 and 550 are used. Hence, the timing at which clocks are inputted to the comparator 450 and the like can be regarded as the timing at which the output of the comparator 450 and the like is latched. Thus, the solid-state imaging device 200 is capable of obtaining differences in the space direction.

Note that, in the control illustrated in this figure, each of the enable signals SDiffEN and DiffEN is set at a high level.

Figure 28:
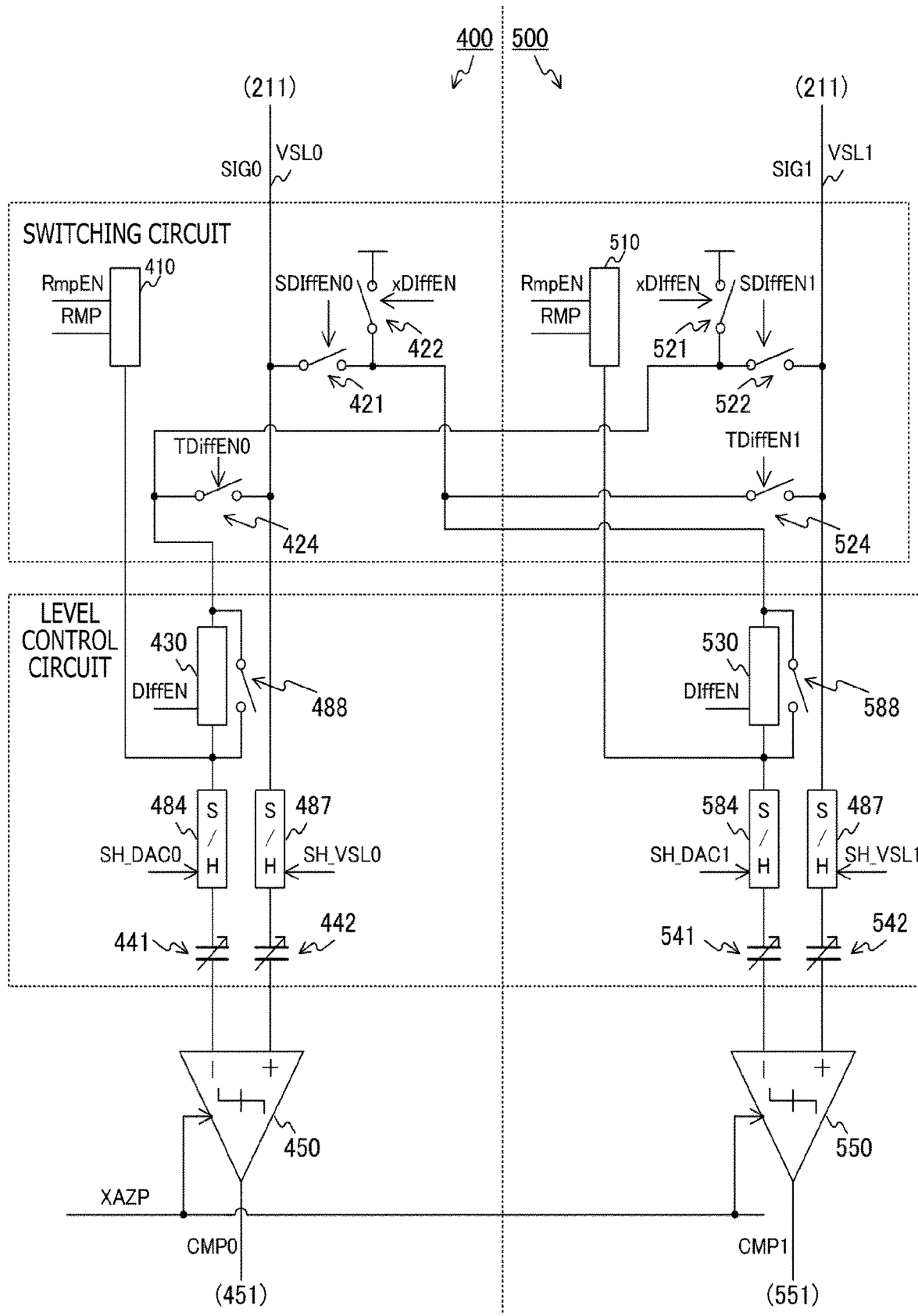
FIG. 28 is a circuit diagram illustrating other examples of the ADCs according to the fifth embodiment of the present technology.

In addition, as illustrated in FIG. 28, a short-circuiting switch 488 that makes a short circuit between the input and output of the source follower circuit 430 and a short-circuiting switch 588 that makes a short circuit between the input and output of the source follower circuit 530 may be additionally provided. The short-circuiting switches 488 and 588 open and close according to control signals SHT0 and SHT1 from the timing control circuit 230. For example, control is performed such that pulse periods of the control signals SHT0 and SHT1 (in other words, periods during which a short circuit continues) are included in pulse periods of the enable signals TDiffEN0 and TDiffEN1. This enables each of the comparator 450 and the like to compare the pixel signal of the frame F0 with the pixel signal of the frame F1 without the amplification or attenuation by the gain. However, the signal is directly transferred to the output of the source follower circuit 430 or the like, and this causes concern over deterioration in characteristics of the ADC 400 or 500 attributable to parasitic capacitance or the like.

Therefore, it is necessary to perform simulations carefully to check the characteristics before the implementation.

FIG. 29 represents diagrams each illustrating an example in which pixels with respect to which the edge detection is performed in the fifth embodiment of the present technology are arranged in the shape of a cross. Arrows at both ends of each of line segments in the figure indicate two pixels with respect to which detection of an edge is performed. This holds true in the following figures as well.

As mentioned above, the solid-state imaging device 200 is able to perform not only the edge detection in the time direction but also the edge detection in the space direction. In this case, as illustrated in the part "a" of this figure, pixels with respect to which the detection is performed may be arranged in the shape of a cross. Further, as illustrated in the part "b" of the figure, pixels with respect to which the detection is performed may be further arranged in nine pixels that are free in the part "a" in the figure. Thus, a checkered flag pattern is formed when the pixels with respect to which the detection is performed are colored black while the remaining pixels are colored white.

In the part "b" in the figure, one of a pair of pixels is not used in another pair of pixels, but as illustrated in the part "c" in the figure, one of a pair of pixels may be used in another pair of pixels. Further, as illustrated in the part "d" in the figure, pixels with respect to which the detection is performed may be increased in the row direction to arrange alternate rows including only pixels with respect to which the detection is performed.

FIG. 30 represents diagrams each illustrating an example in which pixels with respect to which the edge detection is performed in the fifth embodiment of the present technology are arranged in the shape of the letter "L." As illustrated in the part "a" in the figure, three adjacent pixels arranged in the shape of the letter "L" may be made pixels with respect to which the detection is performed. In addition, as illustrated in the part "b" in the figure, alternate pixels may be arranged in the shape of the letter "L." Further, as illustrated in the part "c" in the figure, pixels with respect to which the edge detection is performed may be arranged in four pixels that are free in the part "a" in the figure. Furthermore, as illustrated in the part "d" in the figure, arrangement may be so made that odd-numbered columns and odd-numbered rows are lines in which pixels with respect to which the detection is performed are alternately arranged, while odd-numbered columns and even-numbered rows are lines including only pixels with respect to which the detection is performed.

FIG. 31 represents diagrams each illustrating an example in which pixels with respect to which the edge detection is performed in the fifth embodiment of the present technology are arranged in the shape of the letter "X." As illustrated in the part "a" in the figure, four nonadjacent pixels arranged in the shape of the letter "X" may be made pixels with respect to which the detection is performed. In addition, as illustrated in the part "b" in the figure, four adjacent pixels arranged in the shape of the letter "X" may be made pixels with respect to which the detection is performed. Further, as illustrated in the part "c" in the figure, all pixels may be made pixels with respect to which the detection is performed. Furthermore, as illustrated in the part "d" in the figure, arrangement may be so made that four nonadjacent pixels arranged in the shape of the letter "X" are made pixels with respect to which the detection is performed with one of a pair of pixels used in another pair of pixels.

FIG. 32 represents diagrams each illustrating an example in which pixels with respect to which the edge detection is performed are arranged in the shape of a cross when high dynamic range rendering is performed in the fifth embodiment of the present technology. In the case where the detection of an edge is performed in a time-axis direction, exposure times of two frames with respect to which the detection is performed may be arranged to have different values to enable a circuit (e.g., the DSP circuit 120) in a subsequent stage to perform high dynamic range rendering. Gray pixels in the figure are pixels in the frame for which the exposure time is shorter. Pixels hatched with oblique lines in the figure are pixels in the frame for which the exposure time is longer.

As illustrated in the part "a" in the figure, pixels with respect to which the edge detection is performed may be arranged in the shape of a cross in each of the frames. In addition, as illustrated in the part "b" in the figure, pixels with respect to which the detection is performed in the frame for which the exposure time is shorter may be arranged to alternate with pixels with respect to which the detection is performed in the frame for which the exposure time is longer in each of the row direction and the column direction. Further, as illustrated in the part "c" in the figure, one of a pair of pixels may be used in another pair of pixels. Furthermore, as illustrated in the part "d" in the figure, the pixels with respect to which the detection is performed in the frame for which the exposure time is shorter may be arranged at the same coordinates as the pixels with respect to which the detection is performed in the frame for which the exposure time is longer. Black pixels in the part "a" in the figure indicate positions at which the pixels with respect to which the detection is performed in the two frames coincide.

FIG. 33 represents diagrams each illustrating an example in which pixels with respect to which the edge detection is performed are arranged in the shape of the letter "X" when high dynamic range rendering is performed in the fifth embodiment of the present technology. As illustrated in the part "a" in the figure, in each of the frames, four nonadjacent pixels arranged in the shape of the letter "X" may be made pixels with respect to which the detection is performed. Alternately, as illustrated in the part "b" in the figure, four nonadjacent pixels arranged in the shape of the letter "X" may be made pixels with respect to which the detection is performed. Further, as illustrated in the part "c" in the figure, all pixels may be made pixels with respect to which the detection is performed. Furthermore, as illustrated in the part "d" in the figure, one of a pair of pixels may be used in another pair of pixels.

FIG. 34 represents diagrams each illustrating another example arrangement when high dynamic range rendering is performed in the fifth embodiment of the present technology. As illustrated in the part "a" in the figure, arrangement may be so made that four adjacent pixels arranged in the shape of the letter "X" are made pixels with respect to which the detection is performed, and sets of four pixels with respect to which the detection is performed and remaining sets of four pixels are arranged alternately in each of the row direction and the column direction. In addition, as illustrated in the part "b" in the figure, arrangement may be so made that pixels with respect to which the edge detection is performed are arranged in the shape of a cross, and pixels with respect to which the detection is performed in the frame for which the exposure time is shorter are arranged at the same coordinates as pixels with respect to which the detection is performed in the frame for which the exposure time is longer.

Note that each of the third embodiment and the fourth embodiment can also be applied to the fifth embodiment.

As described above, in the fifth embodiment of the present technology, the sample and hold circuit 484 and the like, which hold the pixel signals, are disposed, and it is hence possible to detect whether an edge is present in the time direction by causing pixel signals of different frames to be held by the sample and hold circuit 484 and the like.

6. Sixth Embodiment

In the above-described second embodiment, the ADC 400 or 500 is disposed for each column, but this configuration may lead to an increase in a read time required to complete AD conversion (in other words, reading) of all pixels. A solid-state imaging device 200 according to this sixth embodiment is different from that according to the second embodiment in that each pixel is provided with a separate ADC to reduce the read time.

Figure 35:
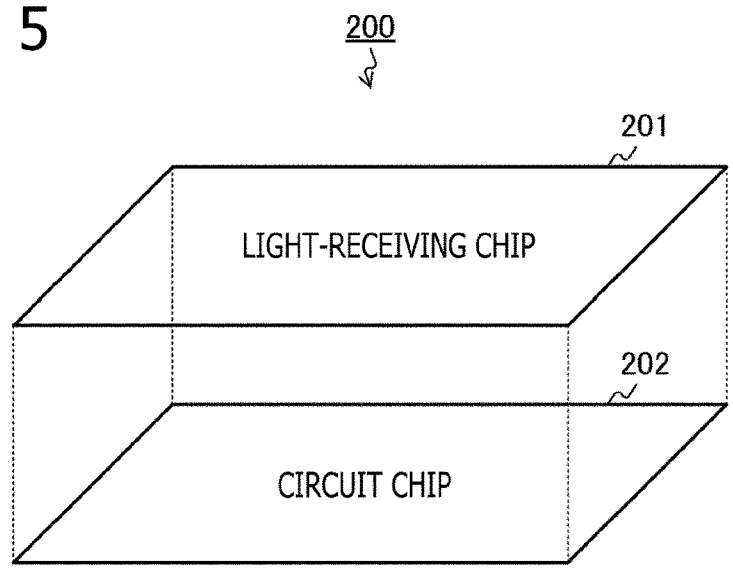
FIG. 35 is a diagram illustrating an example stack structure of a solid-state imaging device according to a sixth embodiment of the present technology.

FIG. 35 is a diagram illustrating an example stack structure of the solid-state imaging device 200 according to the sixth embodiment of the present technology. The solid-state imaging device 200 includes a circuit chip 202 and a light-receiving chip 201 stacked on the circuit chip 202. These boards are electrically connected through connection portions, such as vias. Note that, in addition to the vias, Cu—Cu joint, bumps, and an inductive coupling communication technology, such as TCI (ThruChip Interface), can also be used to accomplish the connection.

Figure 36:
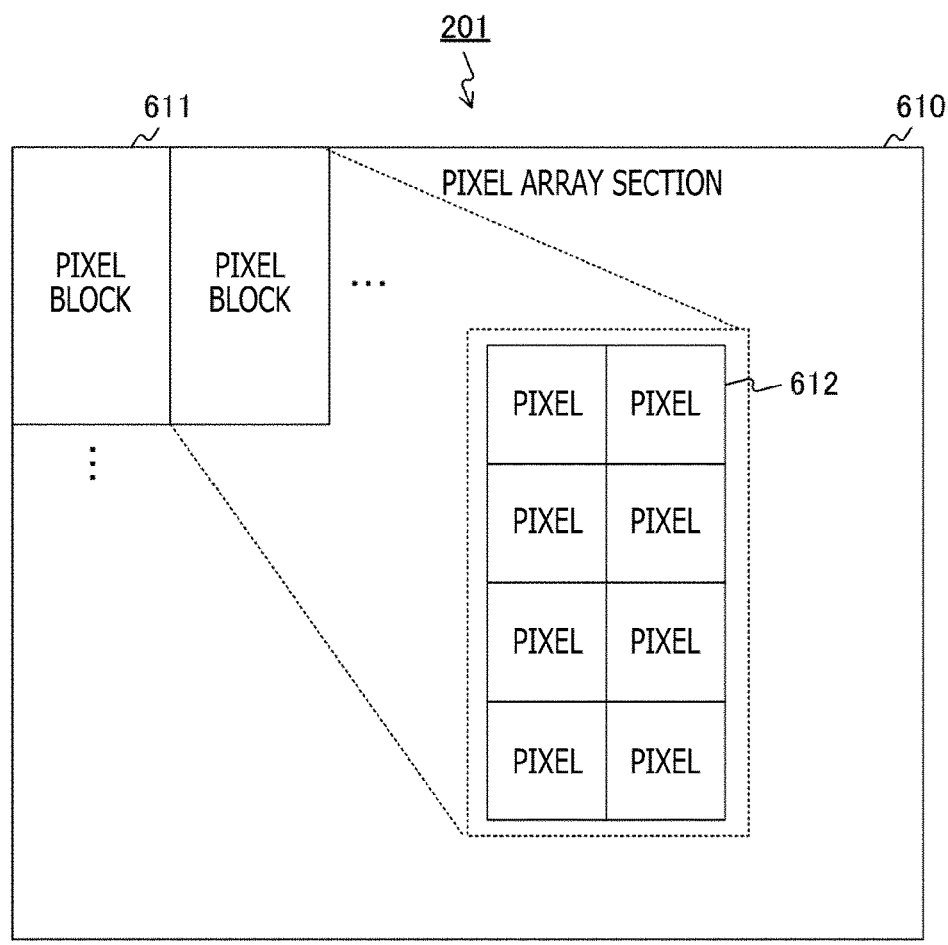
FIG. 36 is a diagram illustrating an example configuration of a light-receiving chip according to the sixth embodiment of the present technology.

FIG. 36 is a diagram illustrating an example configuration of the light-receiving chip 201 according to the sixth embodiment of the present technology. On the light-receiving chip 201, a pixel array section 610 having a plurality of pixel blocks 611 arranged therein is disposed. A plurality of pixels 612 are arranged in each of the pixel blocks 611. For example, 4 (row) by 2 (column) pixels 612 are arranged in each pixel block 611.

Figure 37:
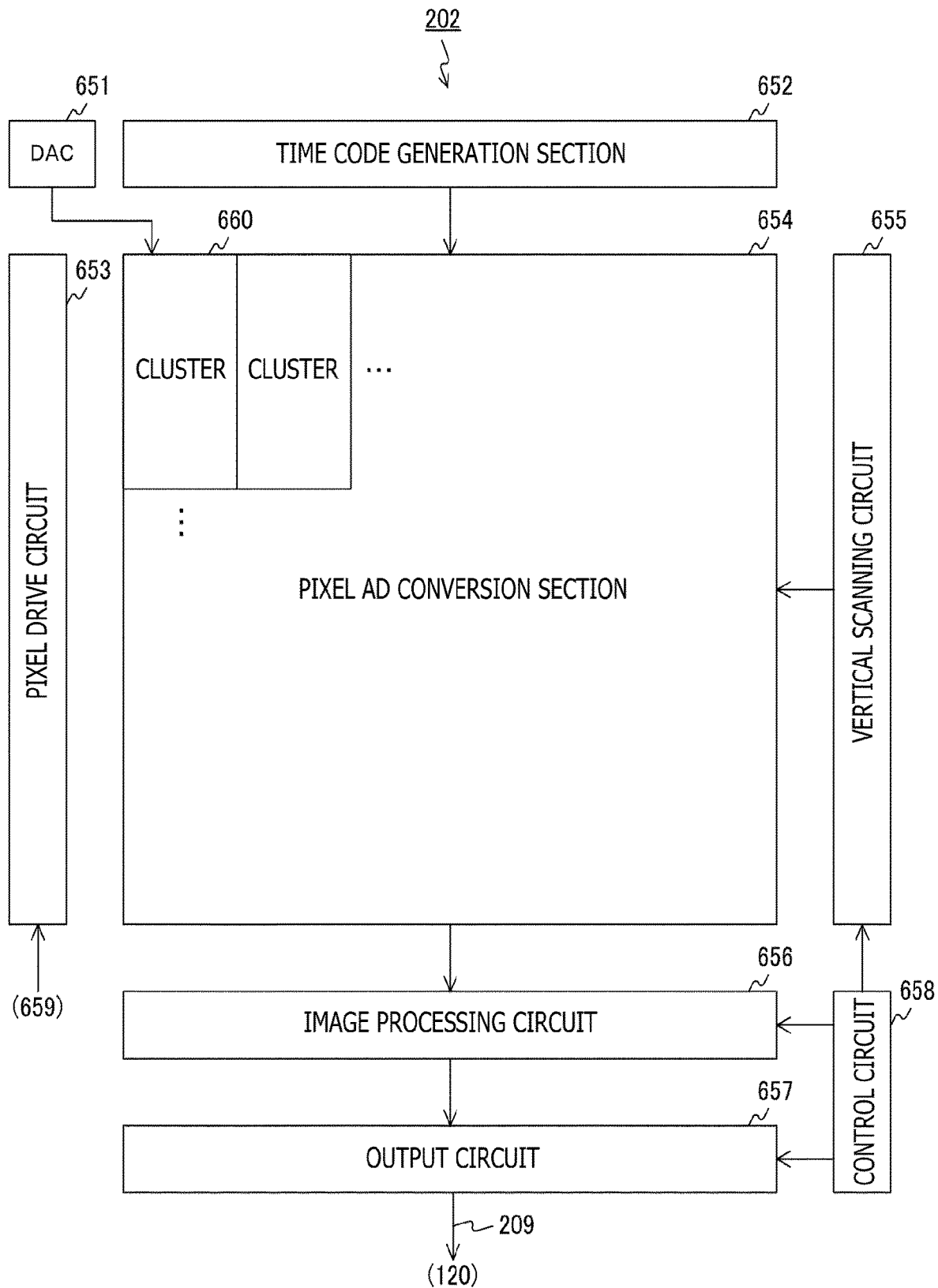
FIG. 37 is a block diagram illustrating an example configuration of a circuit chip according to the sixth embodiment of the present technology.

FIG. 37 is a diagram illustrating an example configuration of the circuit chip 202 according to the sixth embodiment of the present technology. The circuit chip 202 has disposed thereon a DAC 651, a time code generation section 652, a pixel drive circuit 653, a pixel AD conversion section 654, a vertical scanning circuit 655, an image processing circuit 656, an output circuit 657, and a control circuit 658.

The DAC 651 generates a reference signal through DA conversion, and supplies the reference signal to the pixel AD conversion section 654. The time code generation section 652 generates a time code indicating a time in a period during which AD conversion is performed, and supplies the time code to the pixel AD conversion section 654.

In the pixel AD conversion section 654, a plurality of clusters 660 are arranged in a two-dimensional grid pattern. Each of the clusters 660 is provided for a separate one of the pixel blocks 611. The pixel blocks 611 and the clusters 660 are connected in a one-to-one fashion.

Each cluster 660 converts analog pixel signals from the corresponding pixel block 611 to digital signals on a pixel-by-pixel basis, and supplies, as pixel data, the digital signals to the image processing circuit 656.

The pixel drive circuit 653 drives the pixels 612 to cause the pixel signals to be outputted therefrom. The vertical scanning circuit 655 drives circuits in the clusters 660 to generate the digital signals.

The image processing circuit 656 performs various types of signal processing, such as a CDS process, on the transferred pixel data, on a pixel-by-pixel basis. The image processing circuit 656 supplies image data including the pixel data subjected to the processing to the DSP circuit 120 through the output circuit 657.

The control circuit 658 controls operation timing of each of the pixel drive circuit 653, the vertical scanning circuit 655, the image processing circuit 656, and the output circuit 657.

Figure 38:
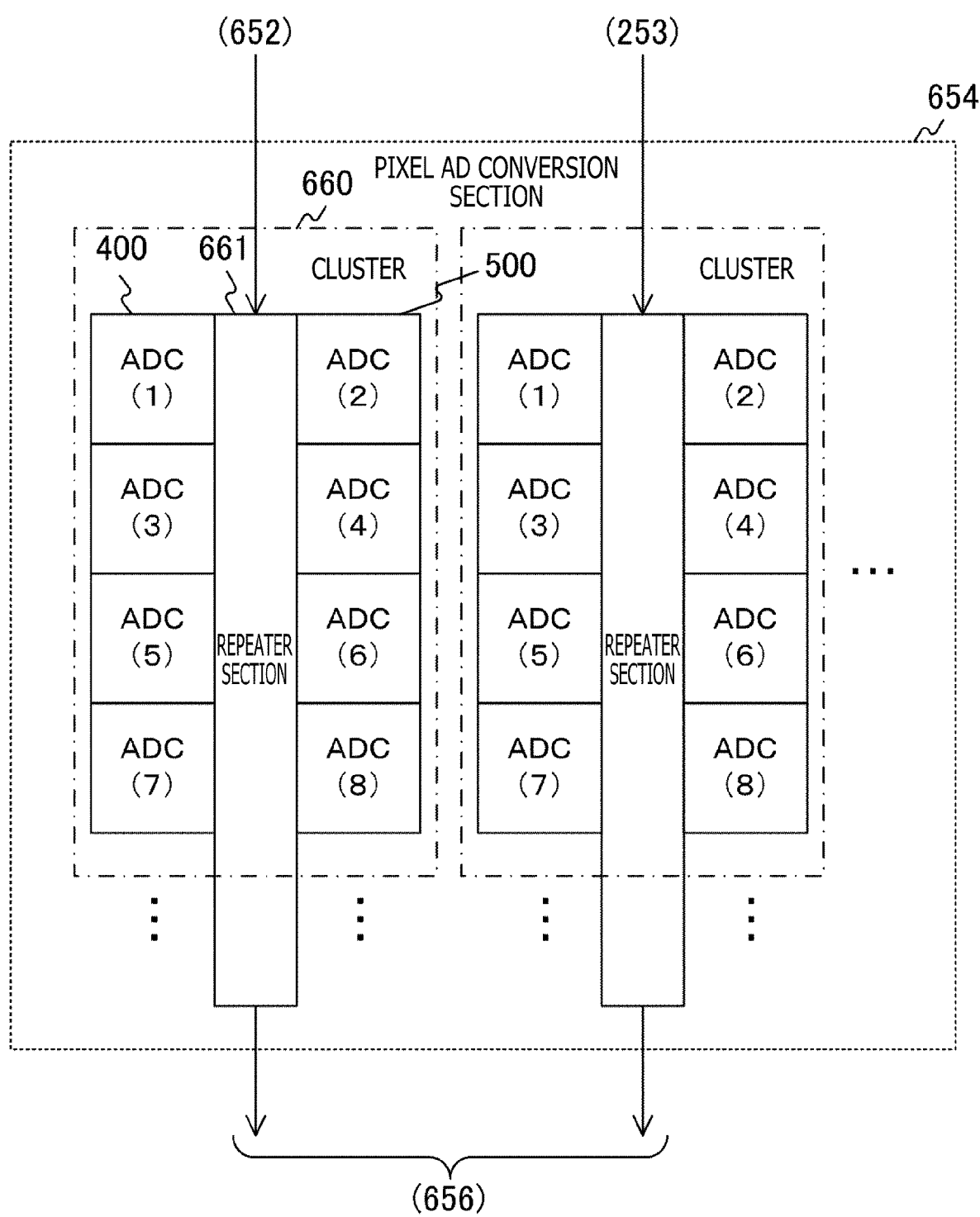
FIG. 38 is a block diagram illustrating an example configuration of a pixel AD conversion section according to the sixth embodiment of the present technology.

FIG. 38 is a block diagram illustrating an example configuration of the pixel AD conversion section 654 according to the sixth embodiment of the present technology. Each cluster 660 includes a plurality of ADCs 400 and a plurality of ADCs 500. Each of the ADCs is provided for a separate one of the pixels 612. For example, the ADCs 400 are arranged in one of two columns in the cluster 660, while the ADCs 500 are arranged in the other column.

In addition, in the pixel AD conversion section 654, a repeater section 661 is disposed for each of columns of the clusters 660. The repeater section 661 transfers, to each of the ADCs 400 and 500, the time code from the time code generation section 652, and transfers, to the image processing circuit 656, pixel data from each of the ADCs 400 and 500. Note that the edge determination circuit 384 is omitted in the figure.

Figure 39:
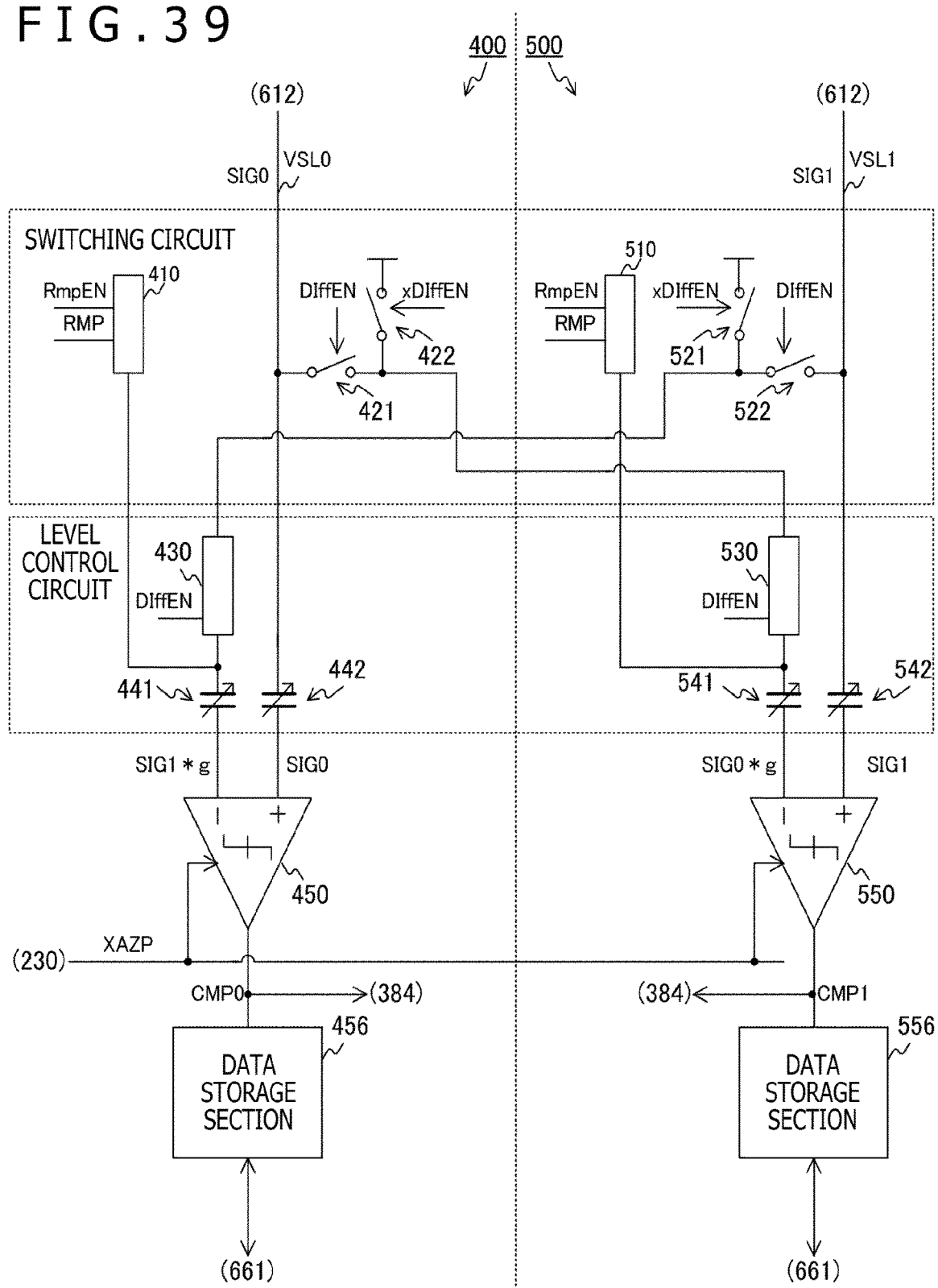
FIG. 39 is a circuit diagram illustrating example configurations of ADCs according to the sixth embodiment of the present technology.

FIG. 39 is a circuit diagram illustrating example configurations of the ADCs 400 and 500 according to the sixth embodiment of the present technology. The ADCs 400 and 500 according to this sixth embodiment are different from those according to the second embodiment in that data storage sections 456 and 556 are provided in place of the counters 451 and 551.

The data storage section 456 fetches time data from the repeater section 661 at a timing at which the comparison result CMP from the comparator 450 has been inverted, and holds the time data. In addition, the data storage section 456 supplies, as pixel data, the held time data to the repeater section 661. The data storage section 556 fetches time data from the repeater section 661 at a timing at which the comparison result CMP from the comparator 550 has been inverted, and holds the time data. In addition, the data storage section 556 supplies, as pixel data, the held time data to the repeater section 661.

Owing to the above-described configuration, the AD conversion for all the pixels can be simultaneously performed with the ADCs disposed for the respective pixels 612. Thus, a shorter read time can be achieved than in the case where a separate ADC is disposed for each column.

Note that the fourth embodiment or the fifth embodiment can also be applied to the sixth embodiment.

As described above, in the sixth embodiment of the present technology, the solid-state imaging device 200 is capable of simultaneously performing the AD conversion for all the pixels since a separate ADC is disposed for each pixel. Thus, a shorter read time can be achieved than in the case where a separate ADC is disposed for each column.

7. Examples of Application to Mobile Bodies

The technology according to the present disclosure (i.e., the present technology) is applicable to various products. For example, the technology according to the present disclosure may be implemented as a device installed on any of various types of mobile bodies, such as automobiles, electric vehicles, hybrid electric vehicles, motorcycles, bicycles, personal mobility vehicles, airplanes, drones, ships, and robots.

Figure 40:
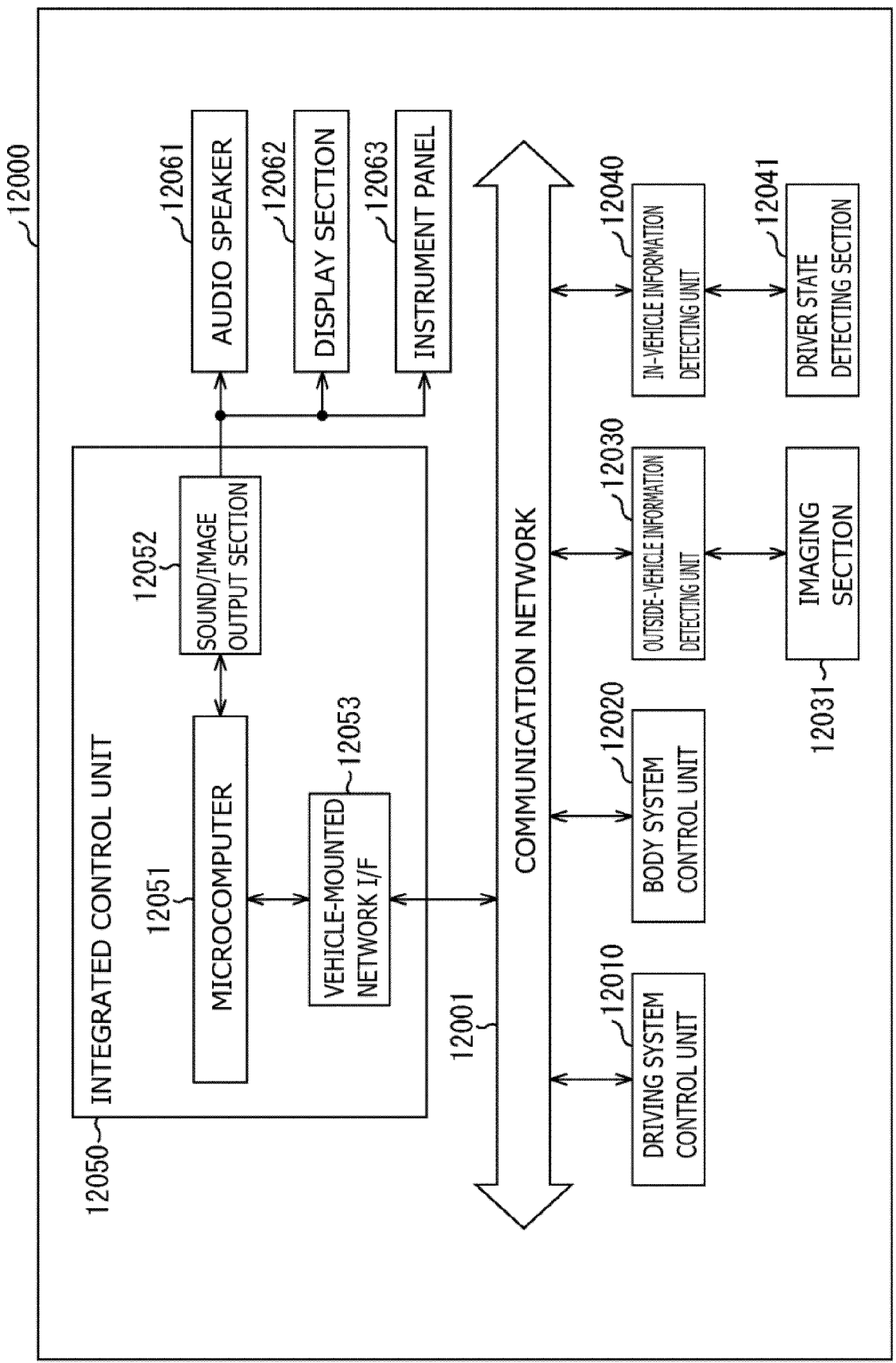
FIG. 40 is a block diagram depicting an example of schematic configuration of a vehicle control system.

FIG. 40 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 40, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 40, an audio speaker 12061, a display section 12062, and an instrument panel 12063 are illustrated as the output device. The display section 12062 may, for example, include at least one of an on-board display and a head-up display.

Figure 41:
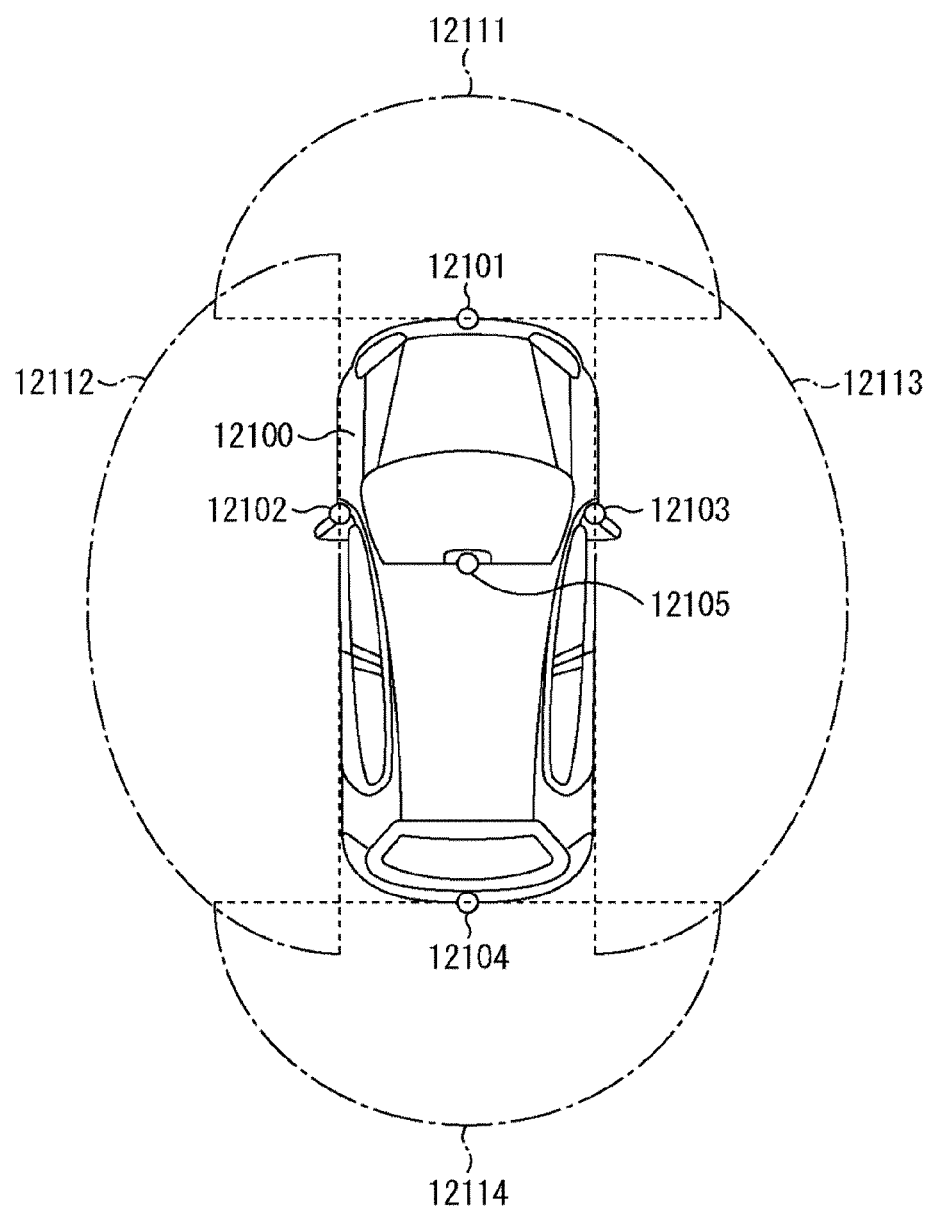
FIG. 41 is a diagram of assistance in explaining an example of installation positions of an outside-vehicle information detecting section and an imaging section.

FIG. 41 is a diagram depicting an example of the installation position of the imaging section 12031.

In FIG. 41, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 41 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of vehicle control systems to which the technology according to the present disclosure can be applied has been described above. The technology according to the present disclosure is applicable to the imaging section 12031 among the components described above. Specifically, the imaging apparatus 100 of FIG. 1 is applicable to the imaging section 12031. Application of the technology according to the present disclosure to the imaging section 12031 leads to an increase in the accuracy in the detection of an edge and an improvement in image recognition accuracy, which in turn leads to improved reliability of the vehicle control system.

Note that the above-described embodiments have been described to present example embodiments of the present technology, and that features of the embodiments and invention-specifying features recited in the appended claims have correspondence relations therebetween. Similarly, invention-specifying features recited in the appended claims and features of the embodiments of the present technology which are assigned the same names as those of the invention-specifying features have correspondence relations therebetween. However, the present technology is not limited to the embodiments, and can be embodied by making various modifications to the embodiments without departing from the gist thereof.

It is to be understood that advantageous effects mentioned in the present specification are merely illustrative and not restrictive, and there may be other advantageous effects.

Note that embodiments of the present technology may also have the following configurations.

(1) A sensing device including:

a level control circuit that amplifies or attenuates a signal level of one of a pair of pixel signals by a predetermined gain;

a comparison circuit that compares the pair of pixel signals with the signal level of the one pixel signal amplified or attenuated with each other, and outputs a result of the comparison; and an edge determination circuit that determines whether an edge is present or absent in reference to the comparison result.

(2) The sensing device described in (1) above, in which the level control circuit includes a first gain circuit that amplifies or attenuates the signal level of the one pixel signal by the gain, and outputs the resulting pixel signal together with another one of the pair of pixel signals, and a second gain circuit that amplifies or attenuates the signal level of the other pixel signal by the gain, and outputs the resulting pixel signal together with the one pixel signal, and the comparison circuit includes
a first comparator that compares the pair of pixel signals outputted by the first gain circuit with each other, and outputs a first comparison result to the edge determination circuit, and
a second comparator that compares the pair of pixel signals outputted by the second gain circuit with each other, and outputs a second comparison result to the edge determination circuit.

(3) The sensing device described in (2) above, in which
the first gain circuit and the first comparator are disposed in a first analog-to-digital converter that converts the other pixel signal to a digital signal, and
the second gain circuit and the second comparator are disposed in a second analog-to-digital converter that converts the one pixel signal to a digital signal.

(4) The sensing device described in (3) above, further including:
a first counter that counts a counter value in reference to the first comparison result; and
a second counter that counts a counter value in reference to the second comparison result, in which
the first comparator and the first counter are disposed in the first analog-to-digital converter that converts the other pixel signal to a digital signal, and
the second comparator and the second counter are disposed in the second analog-to-digital converter that converts the one pixel signal to a digital signal.

(5) The sensing device described in (3) or (4) above, further including:
a switching circuit that supplies the pair of pixel signals to each of the first and second gain circuits in a case where a predetermined edge detection mode is set, and supplies a predetermined reference signal and one of the pair of pixel signals to each of the first and second gain circuits in a case where the edge detection mode is not set.

(6) The sensing device described in (3) above, further including:
a first digital-to-analog converter that supplies a first reference signal;
a second digital-to-analog converter that supplies a second reference signal;
a first successive-approximation logic circuit that causes the first reference signal to be updated in reference to the first comparison result; and
a second successive-approximation logic circuit that causes the second reference signal to be updated in reference to the second comparison result, in which
the first gain circuit, the first comparator, the first digital-to-analog converter, and the first successive-approximation logic circuit are disposed in the first analog-to-digital converter, and
the second gain circuit, the second comparator, the second digital-to-analog converter, and the second successive-approximation logic circuit are disposed in the second analog-to-digital converter.

(7) The sensing device described in any one of (3) to (6) above, in which
each of the first and second comparators includes
a pair of differential transistors,
a first transistor that initializes one of the pair of differential transistors according to a first auto zero signal, and
a second transistor that initializes another one of the pair of differential transistors according to a second auto zero signal, and input timing of the first auto zero signal is different from that of the second auto zero signal.

(8) The sensing device described in any one of (3) to (7) above, in which
the level control circuit further includes
a first sample and hold circuit that holds one of the pixel signals amplified or attenuated,
a second sample and hold circuit that holds the other pixel signal,
a third sample and hold circuit that holds another one of the pixel signals amplified or attenuated, and
a fourth sample and hold circuit that holds the one pixel signal.

(9) The sensing device described in (8) above, in which
one of the pair of pixel signals is a signal in a given frame, while another one of the pair of pixel signals is a signal in a frame different from the given frame.

(10) The sensing device described in any one of (1) to (9) above, further including:
a pixel array section including a plurality of pixels arranged in a two-dimensional grid pattern; and
a pixel analog-to-digital conversion section including analog-to-digital conversion circuits each of which is disposed for a separate one of the plurality of pixels, in which
the level control circuit and the comparison circuit are disposed in a corresponding one of the analog-to-digital conversion circuits.

(11) The sensing device described in any one of (1) to (10) above, in which
the level control circuit includes a source follower circuit that amplifies or attenuates the signal level.

(12) The sensing device described in any one of (1) to (12) above, in which
the level control circuit includes an amplifier circuit that amplifies the signal level by a gain corresponding to a control signal.

(13) A sensing device including:
a first pixel that outputs a first signal;
a second pixel that outputs a second signal;
a first signal line connected to the first pixel;
a second signal line connected to the second pixel;
a first gain circuit that is connected to the first signal line and that amplifies or attenuates the first signal;
a second gain circuit that is connected to the second signal line and that amplifies or attenuates the second signal;
a first comparator that compares the first signal with the second signal amplified or attenuated by the second gain circuit; and
a second comparator that compares the second signal with the first signal amplified or attenuated by the first gain circuit.

(14) The sensing device described in claim 13, further including:
a first counter that counts a counter value in reference to the first comparison result; and
a second counter that counts a counter value in reference to the second comparison result.

(15) The sensing device described in (13) or (14) above, in which
the first gain circuit further amplifies or attenuates the second signal by a gain different from a gain used for the first signal, and outputs the resulting signal to the second comparator, and
the second gain circuit further amplifies or attenuates the first signal by the gain different from the gain used for the second signal, and outputs the resulting signal to the first comparator.

(16) The sensing device described in any one of (13) to (15) above, further including:

a switching circuit that supplies the pair of pixel signals to each of the first and second gain circuits in a case where a predetermined edge detection mode is set, and supplies a predetermined reference signal and one of the pair of pixel signals to each of the first and second gain circuits in a case where the edge detection mode is not set.

(17) The sensing device described in (13) above, further including:

a first digital-to-analog converter that supplies a first reference signal;

a second digital-to-analog converter that supplies a second reference signal;

a first successive-approximation logic circuit that causes the first reference signal to be updated in reference to the first comparison result; and a second successive-approximation logic circuit that causes the second reference signal to be updated in reference to the second comparison result, in which the second gain circuit, the first comparator, the first digital-to-analog converter, and the first successive-approximation logic circuit are disposed in the first analog-to-digital converter, and the first gain circuit, the second comparator, the second digital-to-analog converter, and the second successive-approximation logic circuit are disposed in the second analog-to-digital converter.

(18) The sensing device described in any one of (13) to (17) above, in which each of the first and second comparators includes a pair of differential transistors, a first transistor that initializes one of the pair of differential transistors according to a first auto zero signal, and a second transistor that initializes another one of the pair of differential transistors according to a second auto zero signal, and input timing of the first auto zero signal is different from that of the second auto zero signal.

(19) An electronic apparatus including:

a level control circuit that amplifies or attenuates a signal level of one of a pair of pixel signals by a predetermined gain;

a comparison circuit that compares the pair of pixel signals with the signal level of the one pixel signal amplified or attenuated with each other, and outputs a result of the comparison;

an edge determination circuit that determines whether an edge is present or absent in reference to the comparison result, and outputs a result of the determination; and a digital signal processing circuit that subjects the determination result to processing.

(20) A method for controlling a sensing device, the method including:

a level control step of amplifying or attenuating a signal level of one of a pair of pixel signals by a predetermined gain;

a comparison step of comparing the pair of pixel signals with the signal level of the one pixel signal amplified or attenuated with each other, and outputting a result of the comparison; and an edge determination step of determining whether an edge is present or absent in reference to the comparison result.

REFERENCE SIGNS LIST

100: Imaging apparatus
110: Optical section
120: DSP circuit
130: Display section
140: Operation section
150: Bus
160: Frame memory
170: Storage section
180: Power supply section
200: Solid-state imaging device
201: Light-receiving chip
202: Circuit chip
210, 655: Vertical scanning circuit
220, 460, 560, 651: DAC
230: Timing control circuit
240, 610: Pixel array section
250, 612: Pixel
251: Photoelectric conversion element
252: Transfer transistor
253: Reset transistor
254: Floating diffusion layer
255: Amplification transistor
256: Selection transistor
260: Horizontal scanning circuit
271: Dummy pixel
272: Dummy connection switch
300: Column signal processing circuit
310: Constant current source
320, 400, 500: ADC
330: Edge detection section
340: Switching circuit
341-344: Switch
350: Level control circuit
351, 352: Gain circuit
360, 371 to 373, 430, 530: Source follower circuit
361-363, 411 to 413, 431, 432, 471 to 475: pMOS transistor
374 to 377, 441, 442, 541, 542: Variable capacitor
381: Comparison circuit
382, 383, 450, 470, 550, 570: Comparator
384: Edge determination circuit
390, 397 to 399: Amplifier circuit
391, 394, 396, 462, 481 to 483, 486: Capacitor
392: Amplifier
393: Auto zero switch
395: Control switch
410, 510: Ramp input switch
421, 422, 424, 521, 522, 524: Enable switch
423, 461, 523: Selector
451, 551: Counter
453, 553: Horizontally-connecting switch
454, 554: Successive-approximation logic circuit
455, 555: Register
456, 556: Data storage section
476 to 480: nMOS transistor
484, 487, 584, 587: Sample and hold circuit
485: Sample switch
488, 588: Short-circuiting switch
611: Pixel block
652: Time code generation section
653: Pixel drive circuit
654: Pixel AD conversion section
656: Image processing circuit
657: Output circuit
658: Control circuit
660: Cluster
661: Repeater section
12031: Imaging section

The invention claimed is:

1. A sensing device comprising:
a level control circuit that amplifies or attenuates a signal level of one of a pair of pixel signals by a predetermined gain;
a comparison circuit that compares the pair of pixel signals with the signal level of the one pixel signal amplified or attenuated with each other, and outputs a result of the comparison; and
an edge determination circuit that determines whether an edge is present or absent in reference to the comparison result.

2. The sensing device according to claim 1, wherein the level control circuit includes
a first gain circuit that amplifies or attenuates the signal level of the one pixel signal by the gain, and outputs the resulting pixel signal together with another one of the pair of pixel signals, and
a second gain circuit that amplifies or attenuates the signal level of the other pixel signal by the gain, and outputs the resulting pixel signal together with the one pixel signal, and
the comparison circuit includes
a first comparator that compares the pair of pixel signals outputted by the first gain circuit with each other, and outputs a first comparison result to the edge determination circuit, and
a second comparator that compares the pair of pixel signals outputted by the second gain circuit with each other, and outputs a second comparison result to the edge determination circuit.

3. The sensing device according to claim 2, wherein the first gain circuit and the first comparator are disposed in a first analog-to-digital converter that converts the other pixel signal to a digital signal, and
the second gain circuit and the second comparator are disposed in a second analog-to-digital converter that converts the one pixel signal to a digital signal.

4. The sensing device according to claim 3, further comprising:
a first counter that counts a counter value in reference to the first comparison result; and
a second counter that counts a counter value in reference to the second comparison result, wherein
the first comparator and the first counter are disposed in the first analog-to-digital converter that converts the other pixel signal to a digital signal, and
the second comparator and the second counter are disposed in the second analog-to-digital converter that converts the one pixel signal to a digital signal.

5. The sensing device according to claim 3, further comprising:
a switching circuit that supplies the pair of pixel signals to each of the first and second gain circuits in a case where a predetermined edge detection mode is set, and supplies a predetermined reference signal and one of the pair of pixel signals to each of the first and second gain circuits in a case where the edge detection mode is not set.

6. The sensing device according to claim 3, further comprising:
a first digital-to-analog converter that supplies a first reference signal;
a second digital-to-analog converter that supplies a second reference signal;
a first successive-approximation logic circuit that causes the first reference signal to be updated in reference to the first comparison result; and
a second successive-approximation logic circuit that causes the second reference signal to be updated in reference to the second comparison result, wherein
the first gain circuit, the first comparator, the first digital-to-analog converter, and the first successive-approximation logic circuit are disposed in the first analog-to-digital converter, and
the second gain circuit, the second comparator, the second digital-to-analog converter, and the second successive-approximation logic circuit are disposed in the second analog-to-digital converter.

7. The sensing device according to claim 3, wherein each of the first and second comparators includes
a pair of differential transistors,
a first transistor that initializes one of the pair of differential transistors according to a first auto zero signal, and
a second transistor that initializes another one of the pair of differential transistors according to a second auto zero signal, and
input timing of the first auto zero signal is different from that of the second auto zero signal.

8. The sensing device according to claim 3, wherein the level control circuit further includes
a first sample and hold circuit that holds one of the pixel signals amplified or attenuated,
a second sample and hold circuit that holds the other pixel signal,
a third sample and hold circuit that holds another one of the pixel signals amplified or attenuated, and
a fourth sample and hold circuit that holds the one pixel signal.

9. The sensing device according to claim 8, wherein one of the pair of pixel signals is a signal in a given frame, while another one of the pair of pixel signals is a signal in a frame different from the given frame.

10. The sensing device according to claim 1, further comprising:
a pixel array section including a plurality of pixels arranged in a two-dimensional grid pattern; and
a pixel analog-to-digital conversion section including analog-to-digital converters each of which is disposed for a separate one of the plurality of pixels, wherein
the level control circuit and the comparison circuit are disposed in a corresponding one of the analog-to-digital converters.

11. The sensing device according to claim 1, wherein the level control circuit includes a source follower circuit that amplifies or attenuates the signal level.

12. The sensing device according to claim 1, wherein the level control circuit includes an amplifier circuit that amplifies the signal level by a gain corresponding to a control signal.

13. A sensing device comprising:
a first pixel that outputs a first signal;
a second pixel that outputs a second signal;
a first signal line connected to the first pixel;
a second signal line connected to the second pixel;
a first gain circuit that is connected to the first signal line and that amplifies or attenuates the first signal;
a second gain circuit that is connected to the second signal line and that amplifies or attenuates the second signal;

a first comparator that compares the first signal with the second signal amplified or attenuated by the second gain circuit; and a second comparator that compares the second signal with the first signal amplified or attenuated by the first gain circuit.

14. The sensing device according to claim 13, further comprising:

a first counter that counts a counter value in reference to the first comparison result; and a second counter that counts a counter value in reference to the second comparison result.

15. The sensing device according to claim 13, wherein the first gain circuit further amplifies or attenuates the second signal by a gain different from a gain used for the first signal, and outputs the resulting signal to the second comparator, and the second gain circuit further amplifies or attenuates the first signal by the gain different from the gain used for the second signal, and outputs the resulting signal to the first comparator.

16. The sensing device according to claim 13, further comprising:

a switching circuit that supplies the pair of pixel signals to each of the first and second gain circuits in a case where a predetermined edge detection mode is set, and supplies a predetermined reference signal and one of the pair of pixel signals to each of the first and second gain circuits in a case where the edge detection mode is not set.

17. The sensing device according to claim 13, further comprising:

a first digital-to-analog converter that supplies a first reference signal;

a second digital-to-analog converter that supplies a second reference signal;

a first successive-approximation logic circuit that causes the first reference signal to be updated in reference to the first comparison result; and a second successive-approximation logic circuit that causes the second reference signal to be updated in reference to the second comparison result, wherein the second gain circuit, the first comparator, the first digital-to-analog converter, and the first successive-approximation logic circuit are disposed in the first analog-to-digital converter, and the first gain circuit, the second comparator, the second digital-to-analog converter, and the second successive-approximation logic circuit are disposed in the second analog-to-digital converter.

18. The sensing device according to claim 13, wherein each of the first and second comparators includes a pair of differential transistors, a first transistor that initializes one of the pair of differential transistors according to a first auto zero signal, and a second transistor that initializes another one of the pair of differential transistors according to a second auto zero signal, and input timing of the first auto zero signal is different from that of the second auto zero signal.

19. An electronic apparatus comprising:

a level control circuit that amplifies or attenuates a signal level of one of a pair of pixel signals by a predetermined gain;

a comparison circuit that compares the pair of pixel signals with the signal level of the one pixel signal amplified or attenuated with each other, and outputs a result of the comparison;

an edge determination circuit that determines whether an edge is present or absent in reference to the comparison result, and outputs a result of the determination; and a digital signal processing circuit that subjects the determination result to processing.

20. A method for controlling a sensing device, the method comprising:

a level control step of amplifying or attenuating a signal level of one of a pair of pixel signals by a predetermined gain;

a comparison step of comparing the pair of pixel signals with the signal level of the one pixel signal amplified or attenuated with each other, and outputting a result of the comparison; and an edge determination step of determining whether an edge is present or absent in reference to the comparison result.

* * * * *